US012792799B1

(12) United States Patent
Aviles-Olivera

(10) Patent No.: US 12,792,799 B1
(45) Date of Patent: Nov. 10, 2026

(54) SYSTEMS AND METHODS FOR DESIGN AND MANUFACTURE OF CUSTOM SHOE INSOLES

(71) Applicant: David Aviles-Olivera, Terrassa (ES)

(72) Inventor: David Aviles-Olivera, Terrassa (ES)

(73) Assignee: Davol Feet SLU, Barcelona (ES)

( * ) Notice: Subject to any disclaimer, the term of this patent is extended or adjusted under 35 U.S.C. 154(b) by 0 days.

(21) Appl. No.: 19/551,411

(22) Filed: Feb. 26, 2026

(51) Int. Cl.

| | |
|---|---|
| ***G06F 30/27*** | (2020.01) |
| ***G05B 19/418*** | (2006.01) |
| *B33Y 30/00* | (2015.01) |
| *G06F 119/18* | (2020.01) |

(52) U.S. Cl.
CPC ....... *G06F 30/27* (2020.01); *G05B 19/41885* (2013.01); *A43D 2200/60* (2013.01); *B33Y 30/00* (2014.12); *G06F 2119/18* (2020.01)

(58) Field of Classification Search
CPC .......... G06F 2119/18; G05B 19/41885; B33Y 30/00
USPC ................................................................ 703/1
See application file for complete search history.

(56) References Cited

U.S. PATENT DOCUMENTS

| | | | | |
|---|---|---|---|---|
| 2015/0351493 | A1 * | 12/2015 | Ashcroft ................ | A43B 13/18 36/132 |
| 2020/0315287 | A1 * | 10/2020 | Benincasa ................ | A43B 7/28 |
| 2023/0248110 | A1 * | 8/2023 | Levine .................. | B33Y 80/00 36/43 |

* cited by examiner

*Primary Examiner* — Andre Pierre Louis
(74) *Attorney, Agent, or Firm* — Key Kesan Dallmann PLLC

(57) ABSTRACT

A system for creating custom shoe insoles includes a processor that executes machine instructions in a non-transitory, computer-readable storage medium to implement a three-dimensional modeler, a podiatrist treatment module, a recommendation system, and a generative artificial intelligence algorithm. The three-dimensional modeler creates a three-dimensional model of the patient's foot from images of the foot. The generative artificial intelligence algorithm generates similarity scores indicating a similarity between patient responses and insole template descriptions. The recommendation system recommends an insole template based upon the similarity scores. The podiatrist treatment module sets custom insole parameters that adjust the recommended insole template. An augmented reality application can be used to assess the fit of the recommended insole template to the three-dimensional model of the foot for applying updates to the custom insole parameters. A factory system receives the recommended insole template and the custom insole parameters and manufactures a custom insole.

29 Claims, 28 Drawing Sheets

411

```
{
    "index": "insoles_v1",
    "dimension": "768",
    "metric": "cosine",
    "namespaces": ["tenant_a", "tenant_b"],
    "record": {
            "id": "abc123",
            "vector": [0.013, -0.442, ... ],
            "metadata": {
                    "patient_id": P001,
                    "foot": "left",
                    "zone": "arch",
                    "material": "TPU",
                    "created_at": 2025-08-20100:00:002"
                    }
            }
}
```

FIG. 4C

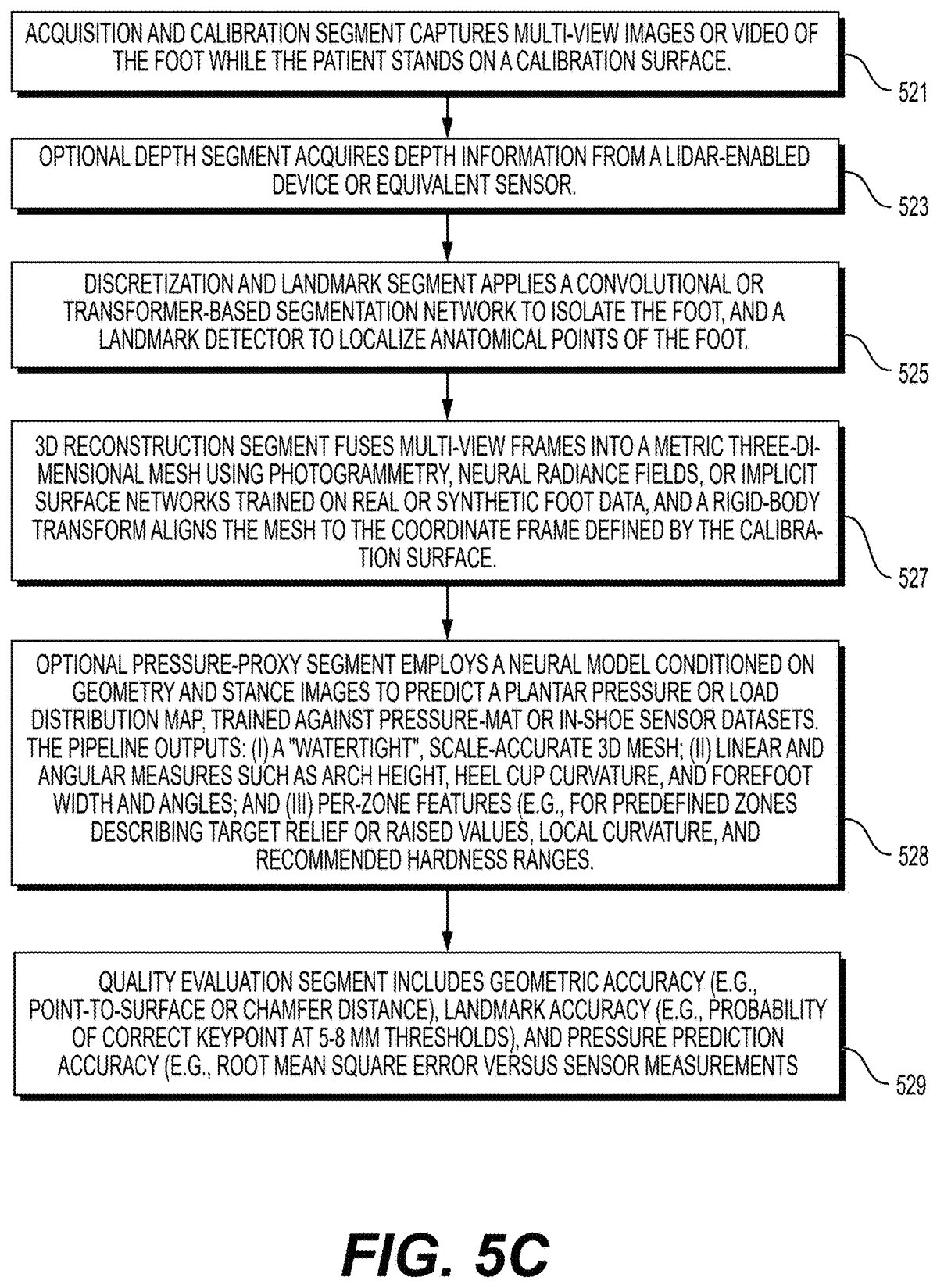

ACQUISITION AND CALIBRATION SEGMENT CAPTURES MULTI-VIEW IMAGES OR VIDEO OF THE FOOT WHILE THE PATIENT STANDS ON A CALIBRATION SURFACE. 521

OPTIONAL DEPTH SEGMENT ACQUIRES DEPTH INFORMATION FROM A LIDAR-ENABLED DEVICE OR EQUIVALENT SENSOR. 523

DISCRETIZATION AND LANDMARK SEGMENT APPLIES A CONVOLUTIONAL OR TRANSFORMER-BASED SEGMENTATION NETWORK TO ISOLATE THE FOOT, AND A LANDMARK DETECTOR TO LOCALIZE ANATOMICAL POINTS OF THE FOOT. 525

3D RECONSTRUCTION SEGMENT FUSES MULTI-VIEW FRAMES INTO A METRIC THREE-DIMENSIONAL MESH USING PHOTOGRAMMETRY, NEURAL RADIANCE FIELDS, OR IMPLICIT SURFACE NETWORKS TRAINED ON REAL OR SYNTHETIC FOOT DATA, AND A RIGID-BODY TRANSFORM ALIGNS THE MESH TO THE COORDINATE FRAME DEFINED BY THE CALIBRATION SURFACE. 527

OPTIONAL PRESSURE-PROXY SEGMENT EMPLOYS A NEURAL MODEL CONDITIONED ON GEOMETRY AND STANCE IMAGES TO PREDICT A PLANTAR PRESSURE OR LOAD DISTRIBUTION MAP, TRAINED AGAINST PRESSURE-MAT OR IN-SHOE SENSOR DATASETS. THE PIPELINE OUTPUTS: (I) A "WATERTIGHT", SCALE-ACCURATE 3D MESH; (II) LINEAR AND ANGULAR MEASURES SUCH AS ARCH HEIGHT, HEEL CUP CURVATURE, AND FOREFOOT WIDTH AND ANGLES; AND (III) PER-ZONE FEATURES (E.G., FOR PREDEFINED ZONES DESCRIBING TARGET RELIEF OR RAISED VALUES, LOCAL CURVATURE, AND RECOMMENDED HARDNESS RANGES. 528

QUALITY EVALUATION SEGMENT INCLUDES GEOMETRIC ACCURACY (E.G., POINT-TO-SURFACE OR CHAMFER DISTANCE), LANDMARK ACCURACY (E.G., PROBABILITY OF CORRECT KEYPOINT AT 5-8 MM THRESHOLDS), AND PRESSURE PREDICTION ACCURACY (E.G., ROOT MEAN SQUARE ERROR VERSUS SENSOR MEASUREMENTS 529

*FIG. 5C*

568

568A

{
."zones" :- [
.... {"id" :· 1,. "raise_mm" :- 2.0, "relief_mm" :· 0.0, "posting_deg" :- 0.0,· "shoreA" :· 30,-
"confidence" :- 0.86},
.{"id" :. 2, "raise_mm": 0.5,- "relief_mm": 0.0, "posting_deg" :· 1.5, "shoreA" :- 28,-
"confidence" :- 0.81}
.. ].
."heel_cup_depth_mml: 16.0,
.. "arch_height_delta_mm": 3.5,
.. "met_pad": ("present": true, "center_xyz_mm" :- [32.1,-18.7,-3.0]}
}
Vector-DB.record-(template):

568B

{
·"template_id":"T-AL-arch-mid",
.. "text" :. "Mid-arch-support-orthosis-with-medial-posting.for-pronation ;- heel.cup.16-18·mm;
forefoot.neutral."
."numeric" :- {"heel_cup_depth_mm" :- [16,18],·"posting_deg": [2,4]},
.. "embedding":[ ..... ],
.. "metadata": {"source":"internal_rule_v3.2","updated" :. "2025-06-30"}
}

FIG. 5H

1750

```
{
"manifest_id": " ... ",
"timestamp": "UTC ISO8601",
"producer": { "service": "calibration@v1.4.2", "node": "clinic-nyc-03"},
"inputs": [
{"repo":"archival","id":"sha256:ABCD ... "},
{"repo":"working","id":"wrkg:case123:embed:7"]
]
"outputs": [
{"repo":"working","id":"wrkg:case123:mesh:12"}
],
"parameters": { "model":"ViT@2025.06","cfg_hash":"sha256:CFG ... "},
"checksums": { "mesh":sha256:MESH ... " },
"signatures": [{ "kid":"HSM-key-01", "sig":" ... " }],
"policy": { "retention":"7y", "pii_ref":"phi://vault/ ... " }

}
```

FIG. 17B

SYSTEMS AND METHODS FOR DESIGN AND MANUFACTURE OF CUSTOM SHOE INSOLES

BACKGROUND

Shoe insoles are inserts placed in shoes to address pain relating to one or more of feet, joints, ankles, legs, hips, and the back. Shoe insoles can provide a variety of benefits including improved cushioning, improved posture and weight distribution, and reduced pain. Most shoes are sold with insoles that have a generic shape and thickness. It is common to enhance or replace the generic insole with a custom insole. Custom insoles may be designed to address a particular problem, such as a high arch or plantar fasciitis. However, given the unique shape and features of a foot, it is challenging to create a custom insole that corresponds accurately to a foot's unique shape and features.

SUMMARY

A computer-implemented method for designing and producing a custom shoe insole includes a processor receiving foot images and survey responses of a patient; the processor generating, using a convolutional neural network, a three-dimensional model of the patient's foot from the foot images; embedding the three-dimensional model and the survey responses into a multimodal vector representation; retrieving, from a vector database, insole template embeddings; generating, using a generative artificial intelligence model, similarity scores between the multimodal vector representation and the insole template embeddings; selecting an insole template based on the similarity scores; adjusting the insole template within predefined customization zones using podiatrist inputs to form custom insole parameters; generating, with a factory three-dimensional modeler, a computer-aided design (CAD) model of a custom insole from the custom insole parameters and the three-dimensional model of the foot; and manufacturing, with an additive manufacturing system, the custom insole in accordance with the CAD model, in which generating the three-dimensional model includes correcting lens distortion and segmenting anatomical landmarks using a convolutional neural network, in which the multimodal vector representation fuses geometry embeddings, survey response embeddings, and insole template embeddings into a shared latent space, in which manufacturing includes producing a variable-density lattice structure matched to the custom insole parameters.

A computing system for designing and producing custom insoles includes a processor system in communication with a factory system. The processor system includes a processor, a memory, and a data store storing a vector database configured to store embeddings of insole templates and patient data; and a non-transient computer-readable storage medium having encoded thereon, programs of machine instructions executable by the processor. The programs of machine instructions include a patient application transferrable to a computing device of a patient, a three-dimensional modeler executable by the processor and configured to generate a three-dimensional model of a patient's foot from received foot images, a survey module executable by the processor to present survey questions to a patient via a graphical user interface and to receive patient responses, a generative artificial intelligence model executable by the processor and configured to compute similarity scores between multimodal vector representations of the patient data and the insole template embeddings, a recommendation engine executable by the processor and configured to select an insole template based on the similarity scores, and a podiatrist treatment module executable by the processor and configured to display the selected insole template, receive podiatrist inputs within predefined customization zones, and generate custom insole parameters. The factory includes a factory processor, and a factory data store storing a non-transitory computer-readable storage medium having encoded thereon programs of machine instructions executable by the factory processor. The programs of machine instructions include a factory three-dimensional modeler executable by a processor and configured to generate a computer-aided design (CAD) model of a custom insole from the custom insole parameters and the three-dimensional model of the patient's foot. The computing system further includes an additive manufacturing system configured to produce the custom insole in accordance with the CAD model.

A system for producing a custom shoe insole for a patient includes a processor executing machine instructions stored on a non-transitory computer readable storage medium, the non-transitory computer readable storage medium comprising a database of insole templates, the processor configured to receive patient foot image data and patient survey responses, control a three dimensional modeler to produce a three-dimensional model of the patient's foot from the foot images, and control a recommendation engine configured to select an insole template based on a comparison between the three-dimensional model, the survey responses, and the insole templates; a customization interface configured to receive podiatrist inputs adjusting the selected insole template to produce custom insole parameters; and a manufacturing system configured to generate a computer-aided design (CAD) model from the custom insole parameters and to produce the custom shoe insole from the CAD model.

BRIEF DESCRIPTION OF THE DRAWINGS

The accompanying drawings illustrate example systems and methods for creating custom shoe insoles.

FIG. 4C illustrates an example machine-readable configuration for a vector together with a representative record that conforms to the configuration.

FIG. 5C illustrates an example neural-network vision pipeline.

FIG. 5H illustrates an example data schema with a per-zone output.

FIG. 17B is an example manifest used in the example file and data management architecture of FIG. 17A.

DETAILED DESCRIPTION

Figure 1:
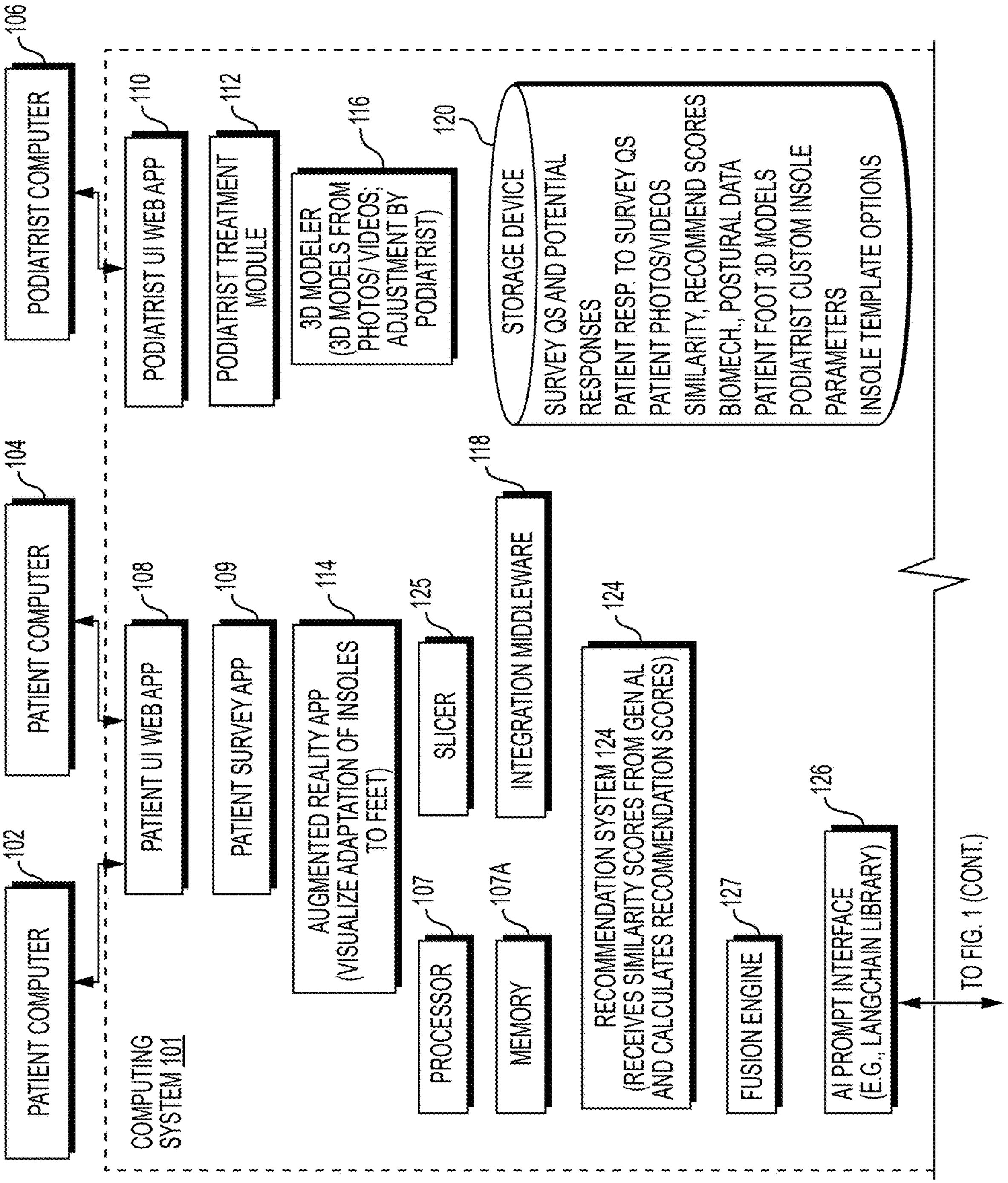
FIG. 1 illustrates an example system for creating custom insoles.
Figure 1:
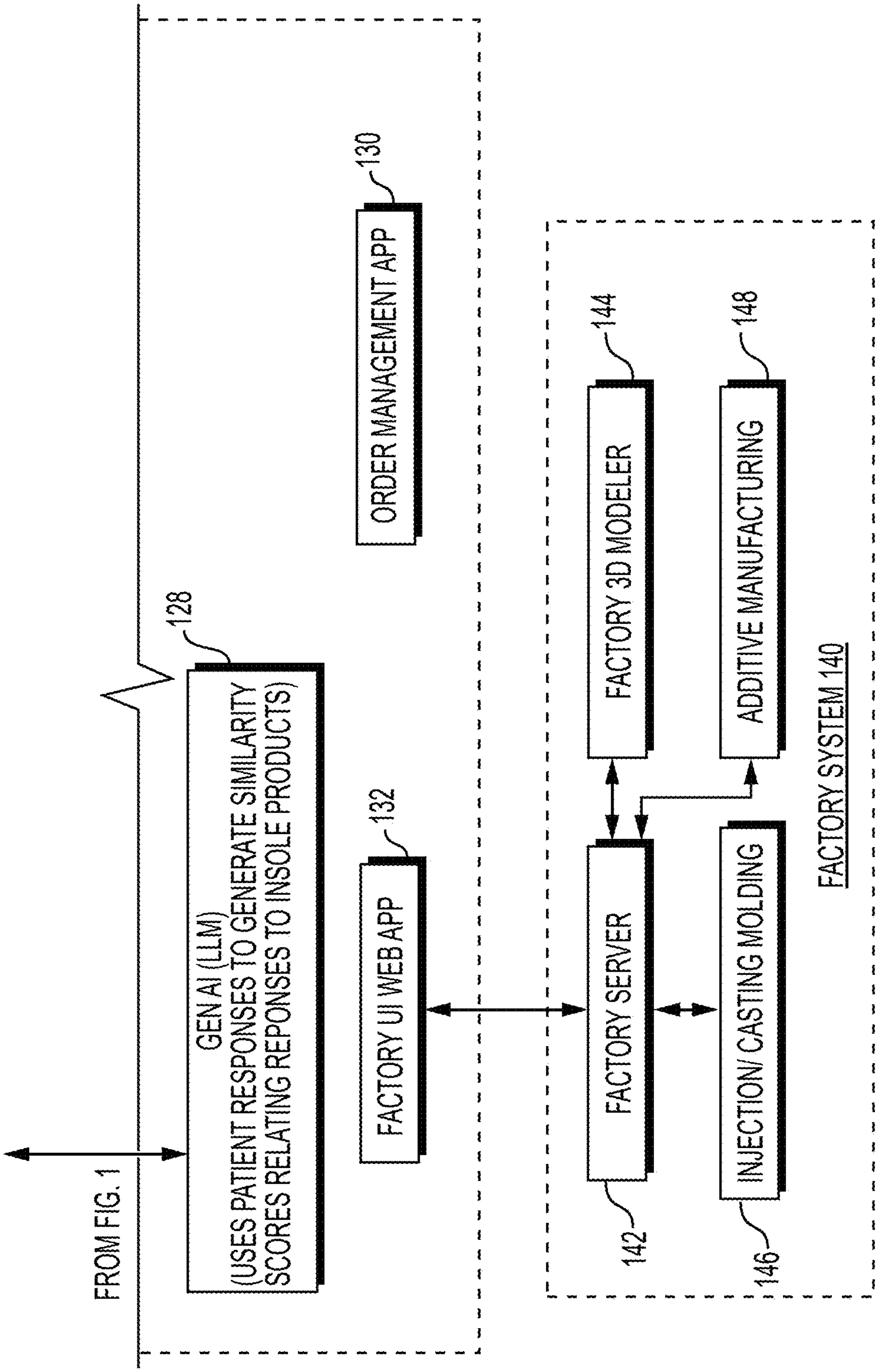

Clinical studies and systematic reviews in the podiatry field demonstrate that custom foot orthoses can reduce pain, improve gait biomechanics, and prevent injury when designed to match an individual's foot morphology and functional needs. Published research, including best-practice guidelines for management of plantar heel pain and systematic reviews of podiatry interventions for falls prevention, report that orthoses tailored to patient-specific parameters achieve better outcomes than prefabricated orthoses. Additionally, advances in imaging, computer-aided design (CAD), and three-dimensional (3D) printing are available to translate anatomical and biomechanical data into manufacturable orthoses.

Custom insole design has advanced significantly over the past two decades, moving from purely manual plaster casting and foam impression methods toward digital workflows. Today, many clinics use 3D foot scanning technologies (structured light, laser scanning, or photogrammetry) to capture patient morphology. These scans are combined with pressure plate or gait analysis systems that map plantar pressure distribution during standing and walking. The resulting data are fed into specialized CAD software that allows podiatrists or orthotists to design custom orthoses tailored to individual needs. Once finalized, insoles are manufactured using subtractive CNC milling from EVA blocks, thermoforming over pre-cut blanks, or increasingly, 3D printing (additive manufacturing), which enables variable stiffness and complex geometries. Some commercial systems (e.g., Phits, Digitsole, FeetMe, Podoactiva) integrate a degree of data analytics, primarily to streamline gait interpretation and improve repeatability. Some solutions offer cloud-based platforms for remote clinics to upload scans and order custom orthoses, allowing centralized fabrication centers to produce and ship insoles within days. Despite these efforts, current systems suffer from many technical deficiencies, including: (1) Fragmented Data Sources: Foot morphology, plantar pressure, and gait dynamics are often captured with different devices, stored in different formats, and manually aligned. This introduces registration errors and hinders integration into a unified patient-specific model. (2) Limited Biomechanical Simulation: Most systems rely on static impressions or averaged pressure maps, without modeling dynamic load transfer across gait cycles or tissue deformation under variable conditions (running, prolonged standing). Current tools typically do not simulate foot-insole interaction beyond static fitting checks. (3) Subjectivity in Design Decisions: Even with CAD and digital scanning, final adjustments (posting angles, pad placement, material layering) remain heavily dependent on clinician experience, lacking quantitative predictive support. This subjectivity often leads to inconsistent outcomes and requires post-delivery modifications. (4) Poor Feedback Loops: Once an insole is fabricated, limited mechanisms are available to verify real-world biomechanical efficacy without separate follow-up pressure testing. Current workflows rarely provide closed-loop validation linking predicted corrections to observed patient outcomes. (5) Manufacturing Constraints: CNC milling and thermoforming restrict designs to relatively uniform-density materials. 3D printing, while promising, often fails to fully exploit material gradients, embedded sensors, or adaptive geometries due to cost, lack of validated materials, or limited CAD toolchains. (6) Limited Use of Advance Analytics: While artificial intelligence sometimes is mentioned in marketing, most systems employ simple rule-based analysis or basic statistical comparisons. True machine learning models for predictive biomechanics or augmented reality visualization of foot-insole fit remain undeveloped. These deficiencies collectively result in orthoses that may fit but do not always function optimally. For example, some patients may report discomfort, lack of improvement, or new pain symptoms, requiring costly and time-consuming remakes. The lack of integrated simulation and predictive design means biomechanical performance is not evaluated until after delivery, creating inefficiency and undermining clinical confidence. Moreover, the inability to incorporate real-time feedback or advanced material science limits the potential for insoles to adapt to different activities and long-term patient needs.

However, even with these advances, current systems and methods for custom insole design and production have failed to consistently produce well-designed orthoses. While Neural Networks for image processing and Large Language Models (LLMs) (with vector embeddings) for text-semantic retrieval are both prevalent in isolation, their integration for manufacturing workflows (especially in medical/orthotic customization) is not understood or implemented. For example, many current orthoses systems (e.g., some orthotics platforms) are limited to using scanning tools plus databases of templates.

To overcome these technological challenges and corresponding technological deficiencies, disclosed herein are systems and methods that use multimodal data processing to optimize insole design and production. Such multimodal data processing may use scanning tools plus databases of templates, but with the addition of retrieval-augmented generation from extensive embeddings of both patient-specific data and external clinical literature (an example of which is the PubMed database of technical papers including papers directed to foot-related treatments), followed, for example, by convolutional neural network (CNN)-based geometry extraction and AR-driven adjustments. Advanced CNNs may be used for high-precision 3D modeling from images, and Large Language Models (LLMs), or other similar models, in conjunction with vector databases for fusion of patient responses and clinical literature for improved template recommendations with the 3D model data. In addition, confirmation of an optimum fit may be verified by augmented reality (AR) simulation, and explicit shoe geometry-aware design. Finally, the systems and methods are configured for asymmetry handling—treating left/right feet independently without assuming chirality.

Thus, the examples disclosed herein are directed to systems and methods for creating custom shoe insoles. As explained above, creating custom shoe insoles that accurately fit a patient's feet is challenging due to the unique shapes and features of people's feet. The examples described herein overcome this challenge by using a generative artificial intelligence algorithm to match a patient's responses to questions with various features of an insole. Furthermore, certain examples described herein use an augmented reality algorithm to evaluate an insole's acclimation to the patient's foot to make adjustments to the insole. These and other improvements will be described further below in connection with the example examples of this disclosure. For simplicity, the examples below will refer to a single foot of a patient and the design of a custom insole for the patient's foot. However, it is typical to design a pair of custom insoles for a patient and, therefore, it should be understood that the examples below can be repeated for designing a second custom insole to form a pair of custom insoles for the patient. However, in many cases, it is typical to design a pair of custom insoles for a patient, but because most people's feet are not exact chiral constructs, the system may process the left and right feet independently to account for anatomical asymmetry. Measurements, three-dimensional models, and biomechanical data may be obtained separately for each foot, and the generative artificial intelligence algorithm may produce separate similarity scores, recommended templates, and custom insole parameters for each side. This avoids reliance on mirrored geometries and enables accommodation of differences such as length, width, arch height, and forefoot alignment between feet. In some cases, shoe geometry data may also differ between the left and right shoes, and the system can adjust each insole independently to optimize fit within the corresponding shoe.

In an aspect, the herein disclosed systems and methods for design and manufacture of custom insoles consider at least the following data types: 1) visual data of a patient's foot or feet; 2) pressure data related to the weight borne by the patient's foot or feet when standing stationary and when in motion; 3) foot type data; 4) biomechanical data associated with standing, walking, and running; 5) text and numerical data provided by a patient in response to a survey regarding the patient's foot conditions and related problems; 6) podiatrist-provided data regarding feet problems and insole designs to address those problems; and 7) external database articles addressing foot and feet problems. The data types and their significance in the design of a properly-fitted insole are discussed throughout this disclosure, and are briefly mentioned as follows.

Visual Data of a Patient's Foot or Feet: Visual data, including two-dimensional photographs, three-dimensional scans, or video sequences, provides essential information about the external morphology of the foot. High-resolution 3D scanning captures geometric detail of the plantar surface, medial and lateral arches, toe alignment, and heel contour, which are critical in generating an anatomically accurate digital model of the foot. These data enable measurement of length, width, girth, arch height, and angular deformities such as hallux valgus. When combined with calibration surfaces or fiducial markers, visual data ensures scale accuracy and alignment across multiple imaging modalities. By incorporating visual data, the system creates the geometric foundation upon which further biomechanical and functional analyses are overlaid.

Foot Type Data: Foot type classification incorporates structural and functional categories, such as flatfoot (pes planus), high arch (pes cavus), neutral arch, overpronated, or supinated postures, as well as morphological forefoot shapes (Egyptian, Greek, Square). Identifying foot type allows the system to predict biomechanical tendencies, such as excessive pronation in flatfoot or lateral instability in cavus foot. Accurate foot type identification directly informs insole prescription by determining where to add posting, arch support, or lateral reinforcement. Including foot type as an explicit data input ensures that insoles are not designed solely for comfort, but also for long-term biomechanical correction and injury prevention.

Text and Numerical Data from Patient Surveys: These data include patient-reported outcomes collected through structured questionnaires (surveys) provide critical context that complements objective measurements. Numerical ratings (e.g., pain on a visual analogue scale) and categorical responses (e.g., difficulty standing for prolonged periods, history of plantar fasciitis) identify subjective experiences that raw geometry and pressure maps cannot capture. Surveys also document activity level, occupational demands, and footwear preferences, ensuring that the insole is tailored not only to the patient's anatomy but also to lifestyle requirements. By incorporating this patient-provided data, the system integrates patient-specific goals into the automated design pipeline, ensuring both compliance and satisfaction.

Podiatrist-Provided Data Regarding Foot Problems and Insole Designs: Expert annotations and prescriptions from podiatrists serve as ground truth for training supervised models and refining automated design decisions. Podiatrists may identify subtle pathologies such as neuromas, tendon dysfunction, or diabetic neuropathic changes that are not fully captured in geometric or pressure data. They also provide corrective design specifications such as medial heel posting, metatarsal pads, or heel cup depth. By incorporating podiatrist-provided data, the system benefits from clinical expertise, enabling human-in-the-loop validation and continuous improvement of automated insole design recommendations. This feedback loop also ensures regulatory compliance by maintaining clinician oversight in medical decision-making.

Pressure Data During Standing and Motion: These data include pressure data obtained from plantar pressure mats, smart insoles, or instrumented treadmills quantifies load distribution across the foot during static and dynamic activities. These data also may be estimated by using a simulation module. Standing pressure maps reveal weight-bearing patterns at the heel, midfoot, and forefoot, while dynamic gait analysis highlights abnormal pressure trajectories, timing of ground contact, and asymmetry between feet. These data help identify risk zones for ulceration, callus formation, or overuse injuries. By integrating pressure data, the system not only validates geometric findings but also tailors insole design to redistribute forces, reduce peak pressures, and improve shock absorption during walking or running.

Biomechanical Data Associated with Standing, Walking, and Running: Biomechanical data extends beyond static geometry and pressure mapping to include kinematic and kinetic measurements of foot and lower-limb motion. Using inertial measurement units (IMUs), motion capture, or treadmill gait analysis, the system can quantify stride length, cadence, ground reaction forces, joint angles, and timing of pronation-supination cycles. These data reveal compensatory movements and abnormal gait mechanics that are not visible in static scans. For example, a patient with normal static foot geometry may demonstrate excessive tibial internal rotation during walking, leading to medial knee pain. Incorporating biomechanical data allows the insole design to correct dynamic functional issues by modifying posting, cushioning, and energy return zones.

External Database Articles Addressing Foot Problems: External sources, include peer-reviewed clinical literature, design rule repositories, and best-practice guidelines, provide a knowledge base that complements patient-specific data. For example, literature may suggest optimal arch support heights for flatfoot patients or material hardness recommendations for diabetic foot care. By retrieving and embedding relevant knowledge snippets into the design pipeline, the system leverages collective clinical expertise to augment decision-making. This ensures that insoles are designed not only according to individual data inputs but also in line with current medical evidence and professional standards of care. A well-known external database is PubMed.

Footwear Geometry Data: In some examples, the computing system 101 acquires and incorporates footwear geometry data to ensure that the custom insole design conforms to the internal volume and shape of the patient's shoe. The footwear geometry data may be obtained using structured light scanning, stereo vision, LiDAR scanning, or mechanical measurement devices, as described above in connection with the shoe geometry acquisition device 578. By aligning the patient's foot geometry and insole model with the interior geometry of the shoe, the system verifies that the fabricated insole will seat properly without excessive compression, misalignment, or slippage. This integration reduces the risk of patient discomfort and improves adherence by ensuring that the insole functions as intended in the patient's preferred footwear.

Material Performance Data: In some examples, the computing system 101 also considers material performance data in connection with the design of the custom insole. Material performance data may include, for example, measures of compression set, fatigue resistance, rebound energy, or wear rate associated with different polymer foams, elastomers, or composites. The system may draw from a material property database or prior usage records to predict how candidate materials will perform under the patient's weight, gait cycle, and activity level. By incorporating material performance data, the system can recommend materials that balance cushioning, support, and durability, and may further optimize the expected lifespan of the insole. In some cases, the system selects different materials for different insole zones or layers to provide both short-term comfort and long-term resilience.

Medical History and Comorbidity Data: In some examples, the disclosed systems and methods incorporate patient medical history and comorbidity data relevant to foot health and insole prescription. For example, a diagnosis of diabetes, peripheral neuropathy, or vascular disease may indicate increased risk of ulceration and therefore require softer materials and redistribution of plantar pressures. A history of arthritis, tendon dysfunction, or prior orthopedic surgery may necessitate corrective posting or targeted stabilization. The computing system 101 may integrate such medical history data, obtained from electronic health records, clinician input, or patient questionnaires, into the insole design pipeline. By considering medical comorbidities in addition to geometric and biomechanical data, the system ensures that custom insoles are designed not only for fit and function but also for clinical safety and long-term therapeutic benefit.

In the following paragraphs, particular examples will be described in further detail by way of example with reference to the drawings. In the description, well-known components, methods, and/or processing techniques are omitted or briefly described. Furthermore, reference to various feature(s) of the examples is not to suggest that all examples must include the referenced feature(s).

FIG. 1 Illustrates an example system for producing custom insoles. Among other aspects, the system of FIG. 1 includes a computing system 101 and a factory system 140 that are used to create custom shoe insoles for a patient. The arrangement of the computing system 101 and the factory system 140 of FIG. 1 are illustrative examples and do not limit the scope of this disclosure. In alternate examples, the components of the computing system 101 and the factory system 140 may be configured differently, may be distributed differently, and may include other system components. The computing system 101 may include other systems, sub-systems, modules, components, and devices than those shown in FIG. 1. The computing system 101 may communicate with systems, sub-systems, modules, components, and devices that are external to computing system 101. Examples of such additional systems, sub-systems, modules, components, and devices are illustrated in FIGS. 2-5L.

As a skilled person may appreciate, the computing system 101 and the corresponding factory system 140 may be implemented as cloud-based constructs. Thus, in an example, the computing system 101 and associated factory system 140 may be instantiated on one or more virtualized compute instances provisioned through a public cloud platform such as Amazon Web Services (AWS). For example, embedding generation and neural network inference may execute on elastic compute instances (e.g., EC2), vector database storage may utilize object storage (e.g., S3) together with an index service such as OpenSearch configured for nearest-neighbor retrieval, and event-driven microservices (e.g., AWS Lambda functions) may orchestrate data ingestion, similarity search, and retrieval workflows. In alternative examples, the system may be deployed on equivalent public or private cloud infrastructure, or on local on-premises servers, thereby ensuring scalability, low-latency response, and distributed fault tolerance without limiting the inventive concepts to any specific vendor implementation.

Although FIG. 1, and its description herein, illustrates the computing system 101 and the corresponding factory system 140 as being commonly hosted, the computing system 101 and the factory system 140 may be separately hosted and operated.

The computing system 101 may include typical components used to implement computing systems, such as processors, memory, input/output interfaces, and storage devices. The components of the computing system 101 may be implemented as software modules or applications stored and executing on one or more computing devices and/or they can be implemented as computing services available from a distributed or cloud computing system. Patients may interact with the computing system 101 via personal computing devices, such as patient computers 102 and 104. Using a patient computer, a patient may submit information to and receive information from computing system 101 to enable the patient to be fitted for and to receive custom shoe insoles. As examples, and as described further below, a patient may submit images of the patient's feet in the form of still images and/or video. The patient also may provide, in the form of responses to survey questions, details about the patient's feet including symptoms that assist with a diagnosis and the design of custom insoles. One or more podiatrists also may interact with the computing system 101 via a computing device, such as podiatrist computer 106. Using podiatrist computer 106, a podiatrist may review images of the patient's feet and the patient's responses to survey questions as part of a process to design custom insoles for the patient.

The computing system 101 may include a patient user interface web application 108 that allows communication between a patient computer and components of the computing system 101 via, for example, a web browser. Similarly, a podiatrist user interface web application 110 may allow communication between a podiatrist computer and components of the computing system 101 via, for example, a web browser. Computing system 101 also includes integration middleware 118, which is a software layer that supports communication of data among the components of the computing system 101, including communications via the web, communications with applications, and communications with databases, including databases external to the computing system 101. As an example, the integration middleware 118 may communicate with the application programming interfaces of the applications and software modules of computing system 101. A representative storage device 120 also is illustrated in the example computing system 101. The storage device 120 provides persistent storage for data relating to patients and the insoles used to treat the patients. The storage device 120 may be implemented as a database or other distributed storage configurations.

In an aspect, a patient may operate the patient computer 102 to access a foot imaging application (not shown in FIG. 1) hosted on the computing system 101, that cooperates with a camera affixed to the patient computer 102 to capture structured imaging data, including still photos, depth images, video sequences, or photogrammetry-derived point clouds. As disclosed herein, in an example, these image data may be preprocessed and encoded by a convolutional neural network (CNN) to extract three-dimensional geometric descriptors of the patient's foot, including curvature, arch profile, and pronation characteristics. In an aspect, the imaging data may be supplemented by pressure map data obtained from a plantar pressure plate or in-shoe sensor, which provides quantitative load distribution information during stance and gait.

In an example, a patient captures a single plantar photograph of a foot using a consumer camera and a calibration mat bearing fiducial markers and known dimensions. Three-dimensional (3D) modeler 116 preprocesses the image by correcting lens distortion and perspective using the detected fiducials and computes a pixel-to-metric scale. A segmentation network isolates the plantar region and identifies anatomical landmarks including heel center, first and fifth metatarsal heads, and hallux tip (see FIG. 11). From the segmented contour and landmarks the system derives metric measurements (length, region-wise widths, forefoot angle) and zone masks, and in certain examples infers a plantar pressure proxy heatmap using a trained regression model. The resulting two-dimensional outline and zone features parameterize a baseline insole model that is subsequently refined as additional data become available.

In an example, the 3D modeler 116 applies a monocular depth estimation network to the single plantar image to obtain a relative depth map that is converted to metric scale using the calibration mat. The depth map is unprojected to a three-dimensional point cloud representing the plantar surface of the patient's foot. Confidence values associated with the depth estimation may be computed, and when below thresholds, the computing system 101, or components thereof, flags the case for podiatrist review or requests additional images.

In another example, the computing system 101 employs a multi-view photogrammetry (MVP) program, in which a 3D reconstruction technique is applied to a series of overlapping 2D plantar images, taken from different viewpoints, and reconstructs a scaled 3D model of the patient's foot. In more detail, the reconstruction begins by identifying common feature points across the multiple images, estimates the camera positions that produced each image, and triangulates the 3D coordinates of those positions. The result is a point cloud or mesh that represents the foot's geometry and topography of the plantar surface. The output point cloud may be used in, for example, a CAD pipeline as part of the process to design and produce a custom insole.

In some examples, the podiatrist captures the images. In other examples, the patient captures the images (or a short video) while moving the camera about the foot positioned on a calibration mat. A structure-from-motion and multi-view stereo pipeline reconstructs a scaled 3D point cloud the patient's foot. The reconstruction may be aligned to a canonical coordinate frame using fiducials and anatomical landmarks.

In another example, a patient-operated device, or clinic device includes a depth sensor (e.g., a RGB-D or LiDAR camera). The device acquires depth and color frames that are fused to generate a 3D point cloud of the plantar surface; the fusion reduces noise and fills occlusions. The fused point cloud is meshed and normalized for downstream CAD and AR evaluation.

The 3D modeler 116 converts a two-dimensional outline and/or a three-dimensional point cloud into a parametric representation of an insole, applying per-zone thickness, curvature, and hardness parameters derived from patient data, a recommended template, and podiatrist inputs. The CAD model may be exported in a manufacturing format and provided to a slicer or mold-tool generator as described herein.

To enable the above operations, the computing system 101 may include, or may access specific hardware devices such as a smartphone camera (available in iOS/Android platforms). Current smartphones have sufficient resolution (≥12 MP) and metadata (EXIF focal length) to support such photogrammetry. In addition, a patient-facing application (e.g., user interface web application 108) can guide the patient's selection of angle, distance, and coverage. In a clinical setting, in lieu of a smartphone, a podiatrist may employ a DSLR or a mirrorless camera to archive higher resolution and optics control.

The 3D modeler 116 is a software application or program implemented with the computing system 101. As discussed above, the 3D modeler 116 is executed by processor 107 to create a three-dimensional model (e.g., a point cloud) of a patient's foot from still photos and/or video of the foot that the patient submitted, or from images obtained by a podiatrist. In some examples, a convolutional neural network (CNN) or hybrid CNN-transformer model is employed within the 3D modeler 116 to segment the foot from the background, detect anatomical landmarks, and extract three-dimensional geometric features with high precision. Example architectures include U-Net, DeepLab, HRNet, or Vision Transformers, trained on annotated foot image datasets. These architectures may operate on RGB images, depth maps, or both, and can output "watertight" meshes, curvature profiles, and per-zone measurement vectors used in downstream processing for insole parameterization. In an aspect, the 3D modeler 116 also refines the patient's foot geometry by integrating CNN-extracted features from the photogrammetry output with load-zone information derived from the pressure map, when pressure map data are available. This integration produces a more anatomically accurate "digital twin" of the patient's foot, expressed as a triangulated mesh (e.g., STL/OBJ) suitable for downstream CAD operation. A variety of three-dimensional modelers are available commercially and can be implemented with the computing system 101. Examples of three-dimensional modelers include the photogrammetry and three-dimensional modeling software applications offered by Polycam.

As a working example, a podiatrist using the computing system 101 may prompt the 3D modeler 116 to retrieve, from storage device 120, photographs and/or videos of a patient's foot that the patient previously provided to the computing system 101. Upon receiving the photographs and/or videos from the storage device 120, the 3D modeler 116 may be used to create a three-dimensional model of the patient's foot. As discussed below, the podiatrist, using, for example, augmented reality application 114, then may view and study the three-dimensional model of the patient's foot to identify pathologies and determine a treatment strategy with a custom insole.

In addition to providing foot images, the patient may provide responses to survey questions that elaborate on the patient's foot and that assist the podiatrist in developing a treatment strategy. Using a patient computer 102, the patient may interact with patient survey application 109. The patient survey application 109 can retrieve a patient survey from the storage device 120 for sharing with the patient computer 102. The patient survey may include detailed questions about the patient's foot and symptoms as well as potential responses for the patient to select. Once the patient completes the patient survey, the patient survey application 109 stores the patient's responses in storage device 120 for subsequent use by the podiatrist in developing a treatment strategy that includes production of a customized insole.

In an aspect, the computing system 101 further accounts for the geometry and internal dimensions of the shoe in which the custom insole will be placed. Shoe parameters may be obtained in several ways, including: selecting a shoe make, model, and size from a database of footwear specifications; scanning the internal volume of the shoe using a three-dimensional scanner, structured-light device, or photogrammetry; or capturing measurements manually and inputting them into the podiatrist treatment module. Shoe geometry data may include internal length, width, heel-to-toe drop, toe box volume, heel cup depth, and arch position relative to the shoe's midline. The podiatrist treatment module 112 or factory 3D modeler 144 may adjust the insole design to ensure proper seating within the shoe, avoid interference with shoe seams or inserts, and maintain intended biomechanical function. The computing system 101 may further simulate the combined foot-insole-shoe assembly in the augmented reality application 114 to verify fit and clearance before manufacturing the insole.

In an example, the augmented reality application 114 is executed through an augmented reality (AR) hardware device (see FIG. 2) configured to render the patient's foot model and an insole model in a shared coordinate system for clinical verification, such as a head-mounted display (e.g., Microsoft HoloLens, Magic Leap, or similar devices) or a handheld mobile device (e.g., smartphone or tablet) equipped with an RGB-D or LiDAR camera.

Figure 2:
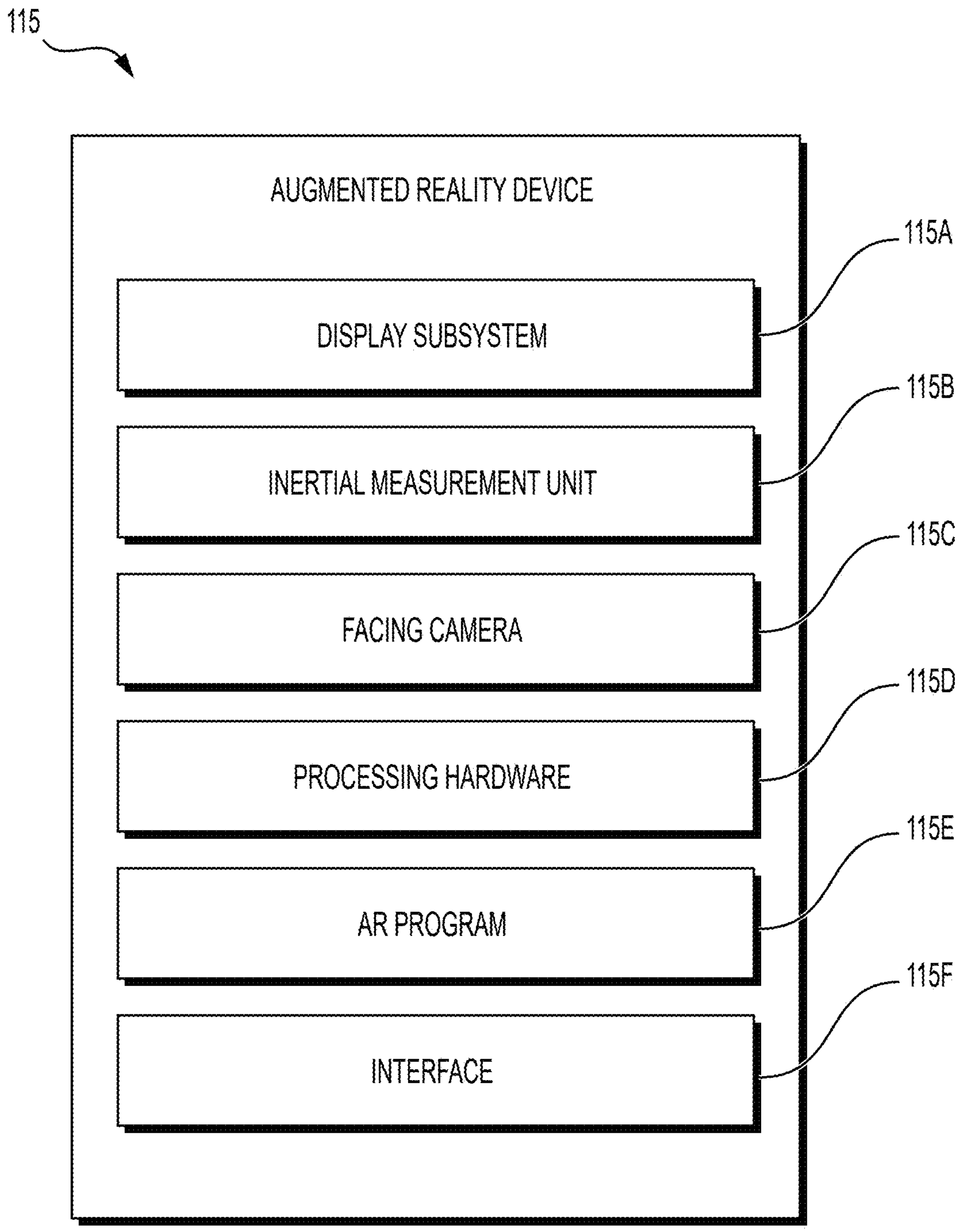
FIG. 2 illustrates an example augmented reality (AR) device useable with the system of FIG. 1.

FIG. 2 illustrates an example AR device 115, which may be in communication with augmented reality application 114. AR device 115 includes a display subsystem 115A, an inertial measurement unit (IMU) 115B, an outward-facing camera system 115C for environment mapping, onboard processing hardware 115D and AR program 115E, and interface 115F. Program 115E controls the AR device to receive, for example, three-dimensional foot and insole models, registers the models to real-world spatial coordinates, and overlays the models onto the patient's physical foot as perceived through the display. Finally, interface 115F allows a podiatrist to view, for example, fit of a candidate insole template to a patient's foot data, and to communicate with components of the computing system 101 to alter or to validate the candidate insole template. Alternatively, the AR device 115 may reside on or may be implemented as a handheld mobile device executing software libraries such as ARKit or ARCore to perform similar functions. The AR device 115 may be configured to render and overlay the three-dimensional model of the patient's foot and the three-dimensional model of the custom insole within a shared coordinate system. Coordinate alignment may be achieved by detecting and registering anatomical landmarks of the foot, such as the heel center, first metatarsal head, and fifth metatarsal head, to corresponding reference points on the insole model. Once aligned, the AR device 115 enables a podiatrist to visualize the combined foot-insole assembly from multiple viewpoints in real time. In an example, the AR device 115 is configured to simulate quasi-static phases of gait, including heel strike, mid-stance, and toe-off, by applying estimated load distributions derived from the patient's biomechanical data to the custom insole model. AR simulation (see FIG. 5D and accompanying description) may employ a physics or finite element analysis engine to predict deformation, contact pressure, and potential areas of excessive loading. By providing this visualization, the AR device 115 enables the podiatrist to validate the fit and biomechanical function of the custom insole prior to manufacture and to make targeted parameter adjustments if required The computing system 101 uses a generative artificial intelligence algorithm 128 to analyze the patient's responses to the survey questions and provide more useful information to the podiatrist for designing the patient's custom insole. In an aspect, the generative artificial intelligence algorithm 128 retrieves patient vectors and insole template vectors from a vector database in which each vector is an embedding representing the respective data. Patient vectors may be formed by concatenating or projecting embeddings of survey responses with normalized numerical features derived from the three-dimensional foot model. Insole template vectors may be formed from textual descriptions, dimensional specifications, and material attributes of candidate templates. The vector database may also store external knowledge, such as literature abstracts from podiatry research or clinical guidelines, to support retrieval-augmented generation. To account for these data types. in an aspect, the generative artificial intelligence algorithm 128 is a multimodal algorithm that considers data of different types, as noted above. The generative artificial intelligence algorithm 128 is particularly useful because there are numerous parameters, and therefore, numerous combinations of parameters associated with designing a custom insole. As described further below, the generative artificial intelligence algorithm 128 can generate similarity scores that associate the patient's responses to particular types and features of insole templates. In this respect, the generative artificial intelligence algorithm 128 may use a large language model (LLM) for the analysis of the patient's responses. In certain instances, the LLM may be trained on data relating to podiatry to improve the usefulness of the outputs from the generative artificial intelligence algorithm 128. Additionally, an artificial intelligence prompt interface 126 may be used in conjunction with the generative artificial intelligence algorithm 128. The prompt interface 126 may be a framework used to structure the input data and to improve the performance of the generative artificial intelligence algorithm 128. The prompt interface 126 may be used to develop chatbots, summarizers, and artificial intelligence agents that sequence and streamline tasks for the generative artificial intelligence algorithm 128. One example of a commercially available artificial intelligence prompt interface is LangChain. The operation of the artificial intelligence prompt interface 126 and the generative artificial intelligence algorithm 128 are described further below.

In an aspect, rather than an LLM, the generative artificial intelligence algorithm 128 may employ a small language model (SLM). An SLM is characterized by a smaller parameter count (for example, in the millions to low billions of parameters), which allows the SLM to operate efficiently on local hardware without requiring high-performance cloud infrastructure. The SLM may be specifically trained or fine-tuned on domain-specific corpora, such as podiatry literature, clinical survey data, and historical insole treatment records. Because of its constrained training scope, an SLM exhibits a reduction in the generation of inaccurate or supported outputs (colloquially termed hallucination) as compared to a LLM, and improved reliability in the specialized context of insole design.

The SLM may receive as input patient survey responses, clinician notes, and structured metadata (e.g., patient age, weight, gait characteristics). The SLM processes such textual data to generate a structured representation, for example, a set of parameter vectors or weighted attribute scores that correspond to biomechanical and clinical features relevant to custom insole design.

In an example, the SLM (as would an LLM) operates as one component of a multimodal AI system. The multimodal AI system further may include a convolutional neural network (CNN) or other geometric encoder to process three-dimensional point cloud data derived from a scan or photogrammetry reconstruction of the patient's foot, and optionally a pressure map encoder to process plantar pressure sensor data (when available). The SLM output (text-derived vectors), the CNN output (geometry embeddings), and the pressure map output (force distribution embeddings) are concatenated or fused in a multimodal integration layer. The multimodal integration layer may apply similarity search, attention-based fusion, or matrix-to-vector projection to combine the heterogeneous data sources. The resulting unified embedding is then passed to a recommendation module (e.g., recommendation system 124) and/or a slicer engine 125. The recommendation module generates a parametric insole design, represented as a computer-aided design (CAD) model. The slicer engine 125 subsequently converts the CAD model into machine code (e.g., G-code) for execution by a three-dimensional printer (e.g., additive manufacturing system 148). The slicer engine 125 is software that converts a 3D model (usually in STL, OBJ, or 3MF format) into a set of machine instructions (commonly G-code) that a 3D printer (e.g., the additive manufacturing system 148) can understand. As used herein, the term G-code refers to the RS-274 numerical control programming language, comprising a set of standardized machine instructions beginning with the letter G (e.g., G01) and related codes, generated by CAM or slicing software to direct the movements, operations, and material deposition of a CNC or additive manufacturing device (e.g., a 3D printer). The term "slicer" derives from the fact that the slicer engine 125 "slices" the 3D model into thin horizontal layers (much like computed tomography), and then calculates toolpaths for each layer, including where the print head moves, how fast the print head moves, how much material to extrude, and what temperature/cooling settings to apply. In the herein disclosed systems, G-code is derived as follows: for CNC milling/turning, CAD software produces a part design, CAM (computer-aided manufacturing) software translates that design into toolpaths, and the toolpaths are post-processed into machine-readable G-code specific to the target machine. For 3D printing (additive manufacturing): A CAD model (often STL or AMF format) is imported into slicing engine (e.g., software such as Cura and PrusaSlicer). The slicer converts the 3D model into layers and then, as noted above, computes extrusion paths, infill patterns, speeds, and temperatures, for example. These paths, functions, parameters, and controls are then encoded as G-code instructions (G01 X10 Y20 E0.25 that are used to move a print head while extruding foam). Thus, the G-code and related codes are derived algorithmically by CAM or slicing software, starting from a CAD model.

Substitution of an SLM for an LLM may reduce computational cost, may make feasible local deployment for compliance with privacy regulations, and may provide higher clinical reliability due to domain-specific training using curated, domain specific data such as podiatry articles, biomechanical studies, foot anatomy reports, and prior custom insole case data. As noted above, a SLM is characterized by a smaller parameter count (for example, in the millions to low billions of parameters), which allows the SLM to operate efficiently on local hardware without requiring high-performance cloud infrastructure. However, the disclosure herein contemplates either an LLM or an SLM, with an SLM being particularly suited for medical, clinical, and industrial environments where efficiency and traceability are important.

The similarity scores generated by the generative artificial intelligence algorithm 128 may be used by recommendation system 124 to provide recommended insole templates for treating a patient. In an aspect, the recommendation system 124 operates in conjunction with a multimodal AI fusion engine 127. The multimodal fusion engine 127 concatenates or cross-attends as many as three embeddings: CNN-based geometry embeddings, CNN-based pressure embeddings (i.e., when available), and LLM- or SLM-based text embeddings. The fused representation resides in a shared latent space from which similarity scores and recommendation scores are computed. These scores map patient data to an insole design parameter set that balances structural fit, cushioning zones, and support requirements among other features. In an aspect, the recommendation system 124 may apply a relevance weighting to the survey questions and the patient's survey responses to improve the usefulness of the data and to generate recommendation scores for the insole templates. As an example, at query time, each row of a similarity score matrix M corresponds to a patient vector and each column corresponds to an insole template vector. The entry Mi may be computed using cosine similarity, dot product, or other vector similarity measures applied to the corresponding embeddings retrieved from the vector database. The matrix M is computed on demand and may be cached, while the underlying vectors persist in the database for reuse. The similarity scores and recommendation scores are stored in the storage device 120 for the podiatrist's subsequent use.

Figure 3:
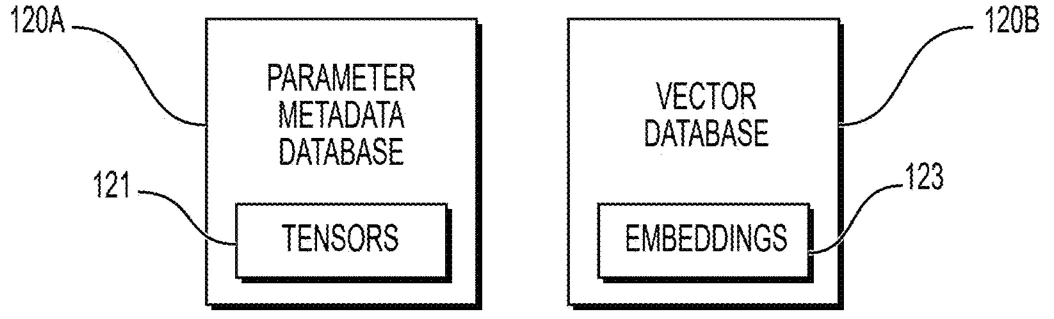
FIG. 3 illustrates example database structures useable with the system of FIG. 1.

FIG. 3 illustrates examples of distinct database structures to store various data used by or generated by the computing system 101. A first database structure 120A stores parameters 121 used by the LLM/SLM, and the parameters are stored as tensors (multidimensional arrays). The parameters represent learned weights, rather than structured, queryable data. A second database structure is an embeddings database 120B that stores embeddings 123 that in turn are used by the computing system 101 for similarity searches such as nearest neighbor searches. The embeddings database 120B may be implemented as a vector database, a commercial example of which is Pinecone. Each entry in the embeddings database 120B is a high-dimensional array. More specifically, each embedding corresponds to a high-dimensional representation derived from one of the patient's input modalities (e.g., survey text, pressure map, 3D image scan). The embeddings database 120B stores the embeddings together with associated metadata, such as patient identifiers, timestamps, and clinical annotations. The embeddings database 120B is configured to perform similarity search, examples of which include k-nearest neighbor (KNN) retrieval, approximate nearest neighbor (ANN) retrieval, and cosine similarity retrieval, enabling the computing system 101 to compare a new patient's multimodal profile with archived data.

Returning to FIG. 1, when a podiatrist wishes to design a treatment strategy with a custom insole for a patient, the podiatrist may access a podiatrist treatment module 112. The podiatrist treatment module 112 may be implemented as one or more software applications accessible with the podiatrist computer 106. The podiatrist treatment module 112 may be used to retrieve from the storage device 120 a three-dimensional model of the patient's feet, images of the patient's feet, the patient's responses to the survey questions, similarity and recommendation scores, and the recommended insole template. If the podiatrist has collected biomechanical and/or postural data from an examination of the patient, the podiatrist also may use that data in the podiatrist treatment module 112 and store that data in the storage device 120. As will be described further below, the podiatrist uses the podiatrist treatment module 112 to review the foregoing information and develop a treatment strategy for the patient. The podiatrist also uses the podiatrist treatment module 112 to verify that the recommended insole template is optimal and to make adjustments to the recommended insole template so that it accurately fits the patient. In an aspect, and as is disclosed in more detail herein, the podiatrist may employ augmented reality application 114 to perform this verification. If the podiatrist believes a different insole template would provide better treatment for the patient, the podiatrist can select a different insole template as the recommended insole template. The podiatrist's recommended insole template selection and adjustments are stored as custom insole parameters in the storage device 120 for subsequent use in the manufacture of the custom insole. The recommended insole template and the custom insole parameters may be stored as a structured text file, such as a JSON file, to facilitate use with the manufacturing systems. In an aspect, the podiatrist treatment module 112 may further obtain shoe geometry data corresponding to a shoe in which the custom insole will be placed. Shoe parameters may be obtained by selecting a make, model, and size from a footwear database; scanning the internal shoe cavity using a three-dimensional scanner or photogrammetry; or manually measuring and inputting internal dimensions such as length, width, heel-to-toe drop, toe box volume, heel cup depth, and arch location. The podiatrist treatment module 112 or factory 3D modeler 144 may adjust the custom insole parameters based on the shoe geometry data to ensure proper fit and function within the shoe.

After selecting the optimum recommended insole template and custom insole parameters, the podiatrist may initiate the manufacture of the custom insole by placing an order with the order management application 130. The order management application 130 may assign a patient identifier to the order and send the order to the factory system 140 via a factory user interface web application 132. Factory user interface (U/I) web application 132 allows communication between components of the computing system 101 and components of the factory system 140 via, for example, a web browser.

The factory system 140 may include a computer server implemented as factory server 142. The factory server 142 includes software modules for managing the manufacture of the insole and for communications with other factory system 140 components. The factory system 140 includes factory 3D modeler 144, which is configured to generate a three-dimensional model of the custom insole. When the factory server 142 receives an order for an insole, the factory server 142 also may receive from the storage device 120 the three-dimensional model of the patient's feet as well as the recommended insole template, the custom insole parameters set by the podiatrist and, in an aspect, the shoe geometry data. The factory 3D modeler 144 uses the three-dimensional model of the patient's feet, the recommended insole template, and the custom insole parameters and the shoe geometry data to generate the three-dimensional model of the custom insole. The three-dimensional model of the custom insole may include both an insole base and an insole foam component that would be joined to form the custom insole.

Before proceeding with manufacturing the custom insole, the factory server 142 may return the three-dimensional model of the custom insole to the podiatrist treatment module 112 for final approval. In connection with the final approval, the podiatrist may use an augmented reality application 114 to evaluate how the custom insole fits and how it will acclimate to the patient's feet. The augmented reality application 114 can overlay the three-dimensional model of the patient's feet onto the three-dimensional (3D) models of the custom insoles for the evaluation. The augmented reality application 114 can allow the podiatrist to observe the two 3D models from different perspectives. The augmented reality application 114 also may simulate applying the patient's weight and biomechanical movements to the custom insole to evaluate the performance of the custom insole. In an aspect, the AR evaluation may further simulate the combined foot-insole-shoe assembly using acquired shoe geometry data to verify that the insole will seat properly in the shoe without interference and will maintain intended biomechanical function. If appropriate based upon the evaluation with the augmented reality application 114, the podiatrist can use the podiatrist treatment module 112 to update the custom insole parameters. The podiatrist treatment module 112 then associates the updated custom insole parameters with the patient's order and returns the updated custom insole parameters to the factory system 140 for completing the manufacture of the custom insole.

In an aspect, the augmented reality application 114 may include an AR fit evaluation and coordinate alignment module. When the augmented reality application 114 renders the 3D foot mesh over the parametric insole model for fit assessment, to assist in this rendering, coordinate systems are aligned via three or more non-collinear landmarks (e.g., heel center, first and fifth met heads). Simulated loading may apply quasi-static phases of gait (heel strike, mid-stance, toe-off). When contact and penetration are detected and/or if penetration or excess pressure is predicted in any zone, the coordinate alignment module may propose parameter adjustments (within pre-set bounds).

After the podiatrist completes the final approval, the factory server 142 receives the approved order and, if updates were made, the updated custom insole parameters. If the podiatrist updated the custom insole parameters, the factory 3D modeler 144 adjusts the three-dimensional model of the custom insole accordingly. Lastly, the factory server 142 provides the three-dimensional model of the custom insole to a manufacturing system for completing the manufacture. The two example manufacturing systems illustrated in the example factory system 140 are an additive manufacturing system 148 and an injection/casting molding system 146.

As used herein, "additive manufacturing" refers to a three-dimensional fabrication process in which a printer or equivalent device produces a part or article by depositing, curing, fusing, or otherwise solidifying material in successive layers, voxels, or regions, in which different layers or zones may include different base materials, such as polymers, elastomers, photopolymers, composites, or resins, and/or different layers or zones may include the same base material processed with varying parameters, such as density, porosity, infill geometry, or hardness. Multi-material additive manufacturing encompasses examples in which a printer switches among cartridges, reservoirs, or channels that contain different materials, the printer varies deposition or curing parameters of a single material to achieve different compositions, stiffness levels, or elasticities, and/or the printer assigns distinct material properties on a voxel-by-voxel basis within a layer to create continuous or discrete gradients of compliance. In certain examples, multi-material additive manufacturing includes, but is not limited to, fused deposition modeling (FDM), stereolithography (SLA), selective laser sintering (SLS), PolyJet printing, digital light processing (DLP), binder jetting, or multi-jet fusion. Multi-modal or multi-material additive manufacturing includes a three-dimensional fabrication process in which a printer or equivalent device produces a part or article by depositing, curing, fusing, or otherwise solidifying material in successive layers, voxels, or regions, with different layers or zones including different base materials, such as polymers, elastomers, photopolymers, composites, or resins, and/or different layers or zones including the same base material processed with varying parameters, such as density, porosity, infill geometry, or hardness. Multi-material additive manufacturing encompasses examples in which a 3D printer switches among cartridges, reservoirs, or channels that contain different materials, the 3D printer varies deposition or curing parameters of a single material to achieve different compositions, stiffness levels, or elasticities, and the 3D printer assigns distinct material properties on a voxel-by-voxel basis within a layer to create continuous or discrete gradients of compliance.

FIGS. 4A-4E and 5A-5L illustrate additional example hardware devices and software components that may be included in, or used in conjunction with operation of, the computing system 101 and the accompanying factory system 140.

Figure 4A:
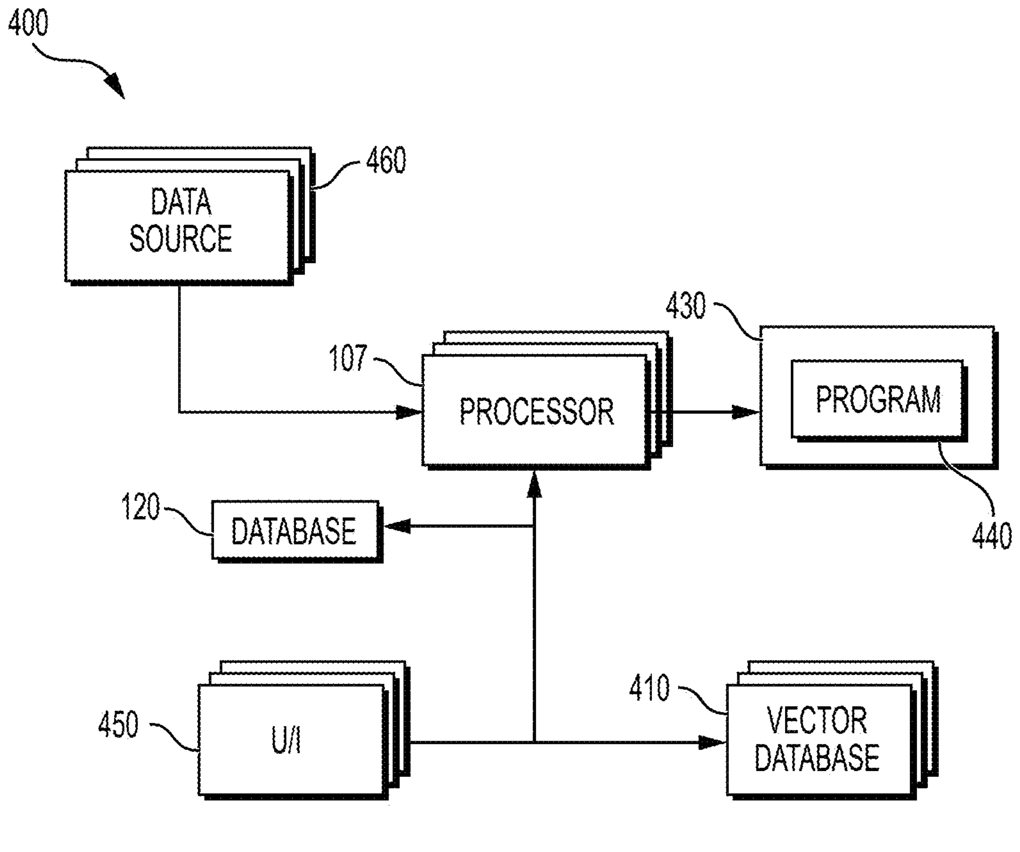
FIG. 4A illustrates an example processing system operable in and with the system of FIG. 1.

In some examples, patient- and template-related information is stored in a vector database. FIGS. 4A-4E illustrate an example vector database node, vector database, and vector database node components useable with the computing system 101 and the factory system 140 of FIG. 1. In FIG. 4A, vector database node 400 configured to support one or more vector databases 410 for storage and retrieval of embeddings. Besides vector databases 410, the vector database node 400 may include a processor platform such as processor 107 of FIG. 1, and the processor platform in turn includes volatile memory such as the volatile memory 107A of FIG. 1. The processor platform may access non-volatile storage device (database) 120, non-transitory, computer-readable storage medium 430 storing, inter alia, program 440, and user interfaces 450. The vector database node 400 connects to data sources 460, including data sources external to the computing system 101 and the factory system 140. Connection to external data sources may be via a high-throughput network interface (not shown). The vector database 410 supports specialized software, such as FAISS, Milvus, or Pinecone, optimized for similarity search of high-dimensional embedding vectors. The embedding vectors (or just embeddings) correspond to three-dimensional foot models, patient survey responses, and candidate insole templates (examples of data sources 460), as well data from the external data sources.

In an example, patient- and template-related data are stored in a vector database 410 as embeddings. An embedding is a fixed-length array of numbers (for example, 768 floating-point values) that encodes the meaning or geometry of an object so that similar objects are close together in a numeric space. The vector database 410 organizes embeddings into a collection (also called an index) that declares the embedding dimension (length of the vector) and a distance metric (for example, cosine distance, dot product, or Euclidean/L2) used to measure similarity. Each stored item (vector) includes: a unique identifier (e.g., a UUID), the vector (the embedding itself), and metadata (key-value fields such as {patient_id, foot=left, zone=arch, material=TPU, timestamp}) that can be used for filtering. In an example, a namespace or tenant label provides isolation so that data from different podiatrists or studies do not commingle, even if the podiatrists/studies share the same physical infrastructure.

To achieve fast similarity search at scale, the index maintains one or more approximate nearest neighbor (ANN) indexes. ANN indexes trade a small amount of accuracy for large gains in speed and memory efficiency. Representative structures include HNSW (hierarchical navigable small-world) graph that routes a query to close neighbors quickly) and inverted file (IVF) with product quantization (IVF-PQ), which first coarsely clusters the space into "inverted lists" and then compresses vectors with learned codebooks to reduce memory. Thus, IVF-PQ serves as the approximate-nearest-neighbor index in the vector database that ranks prior insole templates against a patient's multimodal embedding. The IVF stage limits search to a few relevant clusters, and the PQ stage enables fast distance estimation and compact storage so the system can hold large template libraries and return top-K matches with clinical latency targets. A flat index (exhaustive scan) can also be maintained for exact re-ranking when the candidate set is small. Index parameters (e.g., graph connectivity in HNSW or list/count and PQ code size in IVF-PQ) are chosen to meet target latency and recall@k requirements that serve as an indication of clinical recommendation quality. (Recall@k measures how many of the relevant items in the vector database, the database system placed in the top-k results). This metric is important because in approximate nearest-neighbor searches (e.g., IVF-PQ or HNSW), recall@k shows how closely the approximate index matches an exact search. Higher recall@k indicates the index is retrieving most of the "relevant" candidates in its top-k, which is important for later operations (e.g., re-ranking or CAD rule evaluation).) At query time, components of the vector database node 400 (i.e., program 440) execute to compute a query embedding from input data (for example, a fused representation of a patient's 3D foot model and survey text). The vector database node 400 first applies any metadata filters (e.g., foot='left', shoe_model='X') to restrict the search domain, and then probes the ANN index to retrieve top-K candidates by a configurable distance metric. An optional exact re-rank recomputes precise distances on the small candidate set to improve quality. In an aspect, optional hybrid search combines a dense vector score with a sparse (keyword/BM25) score; the vector database 410 stores an optional sparse posting list per item and computes a weighted sum so that clinically important keywords (e.g., "plantar fasciitis") influence the final ranking alongside geometric similarity.

On a write path, new items are inserted or updated atomically. The program 440 executes to record the operation in a write-ahead log (WAL) (not shown) for durability, persists the vector and metadata to object/KV storage, and schedules background indexing so that ANN structures remain up to date without blocking writes. For scale and availability, a data collection may be split into shards (partitions of the vector space) with replicas (copies) across nodes; a router sends queries to relevant shards and merges partial results. Periodic snapshots provide point-in-time backups, and compaction routines of the program 440 recycle outdated segments when items are updated or deleted. Version fields in metadata (e.g., specification_version, model_version) support auditability and reproducibility of clinical recommendations.

In the example of computing system 101 of FIG. 1, embeddings may represent geometry features extracted from a patient's point cloud (e.g., arch height, curvature, widths by region), survey-derived symptom embeddings, insole template embeddings describing dimensions, materials, and support profiles, and technical document abstracts from external medical databases such as PubMed. Each stored record in the vector database 410 thus corresponds to a patient case or a template and includes metadata such as patient_id, zone (e.g., heel, arch, forefoot), activity (standing, running), and material_hardness. A query embedding built from a new patient's fused data may be matched against template embeddings; K-nearest neighbors yield candidate templates whose parameters are then fed to a CAD/slicer pipeline. Because the vector database 410 supports strict metadata filters, the program 440 executes to constrain template retrieval to the correct shoe size range, activity profile, or other parameters before similarity is computed, improving both speed and clinical relevance.

Operational reliability may be enhanced by storing normalized vectors (i.e., vectors of unit length) when using cosine distance to make scores comparable across items; selecting the embedding dimension based on the upstream encoder to balance fidelity and memory; and training PQ codebooks on representative samples to minimize quantization error if IVF-PQ is used. Typical configuration targets can be stated explicitly (e.g., median latency<50 ms at K=20 with recall@20≥0.95 for filtered searches over N≈10^7 items), allowing a database manager to size shard counts, replica factors, and index parameters accordingly. These practices ensure that a retrieval layer deterministically supplies high-quality candidates to the downstream recommendation and manufacturing stages, tying algorithmic similarity directly to the generation of physical insoles.

Figure 4B:
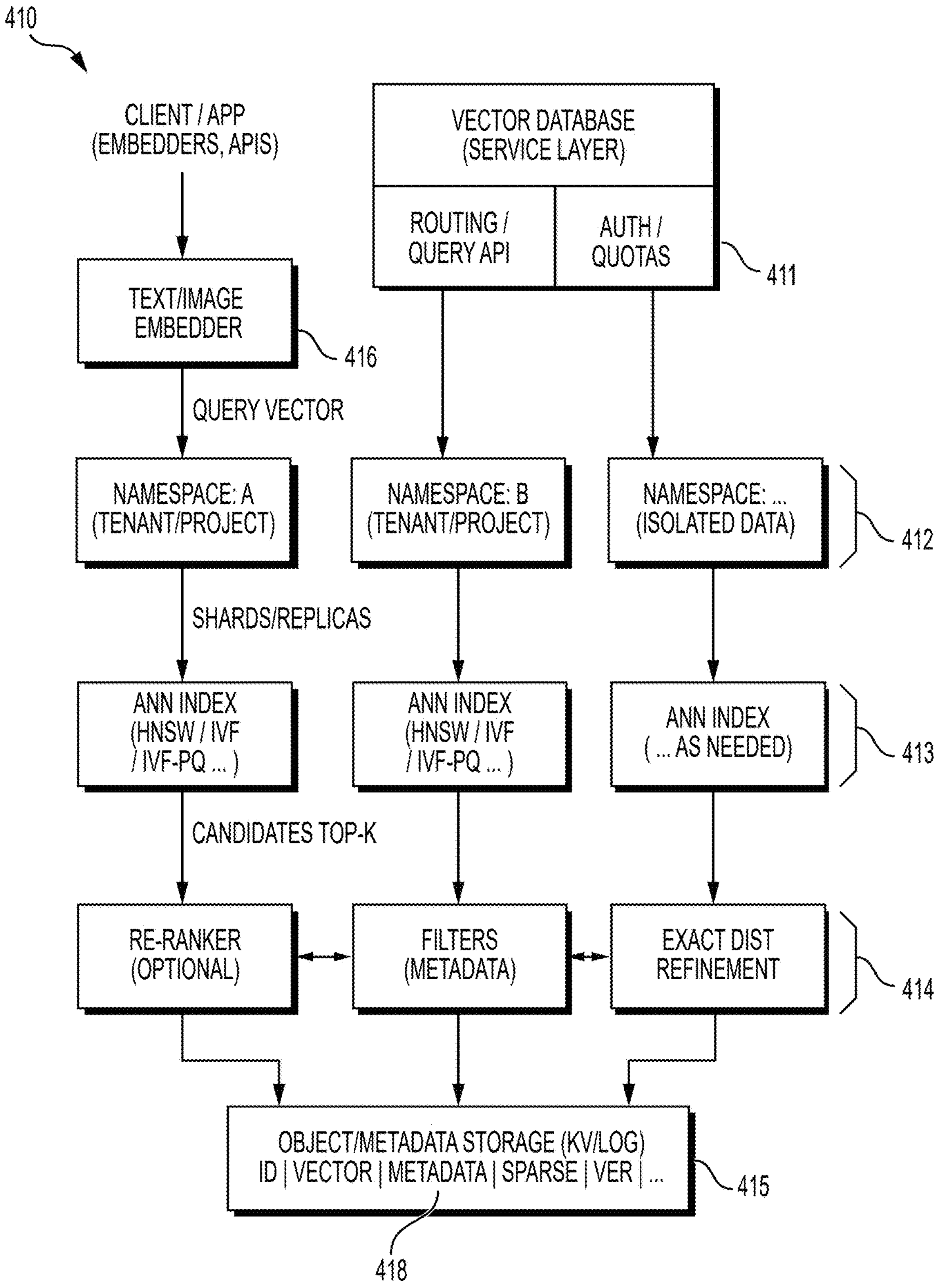
FIG. 4B illustrates an example vector database accessed by the processing system of FIG. 4B.

FIG. 4B illustrates the structure of example vector database 410 as expressed in a conceptual block diagram. As shown in FIG. 4B vector database 410 is configured to store, index, and retrieve embedding vectors generated from raw data. At an input stage (service layer 412), raw data objects, such as text, images, and other multimodal content, are processed through a text/images embedder module 416 (also see embedding model 443A of FIG. 4D) that converts the data into high-dimensional numerical representations ("embeddings" or "embedding vectors"). The embeddings are ingested into the vector database 410, where a storage layer 415 organizes the embeddings within a memory structure optimized for similarity search. An indexing module of retrieval layer 413 applies algorithms such as approximate nearest neighbor (ANN) indexing, hierarchical navigable small world (HNSW) graphs, k-d trees, or product quantization to accelerate retrieval. The vector database 410 further includes a metadata store 418 that associates each embedding with corresponding identifiers, labels, or contextual attributes, thereby enabling hybrid queries that combine vector similarity with Boolean, keyword, or attribute-based filters. At query time, the vector database 410 accepts (416) a user query or probe embedding, and an associated algorithm computes similarity scores between the query embedding and stored embeddings, and ranks candidate results according to distance metrics such as cosine similarity, Euclidean distance, or dot product. The retrieval layer 413 outputs, for example, the top-K results together with their associated metadata, thereby providing both vector-proximal and contextually relevant records. Refinement layer 414 may re-rank results, filter metadata, or refine results based on a distance parameter value.

FIG. 4C illustrates a machine-readable configuration 411 for vector database 410 together with a representative record that conforms to the configuration. The configuration declares an index identifier that selects a collection for persistence, a dimensionality value that fixes the required length of every numeric embedding vector, a similarity metric that defines the comparison function applied during search, and a set of namespaces that partitions stored records by tenant or project. These declarations establish naming, vector length enforcement, comparison behavior, and tenancy boundaries for a vector-based retrieval service used during custom insole design and manufacturing.

FIG. 4C further illustrates a compliant record bound to the declared index and a selected namespace. The record carries a unique identifier for deterministic addressing, a numeric vector whose length equals the declared dimensionality, and a metadata map that records application attributes such as patient code, laterality, anatomical zone, material selection, and creation timestamp. The configuration and the record operate together to achieve automated retrieval of prior cases, templates, and parameter sets relevant to a requested insole. The similarity metric compares the query embedding against stored vectors to return nearest neighbors, while namespace declarations preserve clinic or laboratory isolation, and metadata keys act as deterministic predicates during filtering. This arrangement enables selection of matched exemplars and associated manufacturing directives for an orthosis, supports traceable provenance for quality management, and produces reproducible retrieval outcomes that drive downstream toolpath generation and material assignment for the custom insole.

Figure 4D:
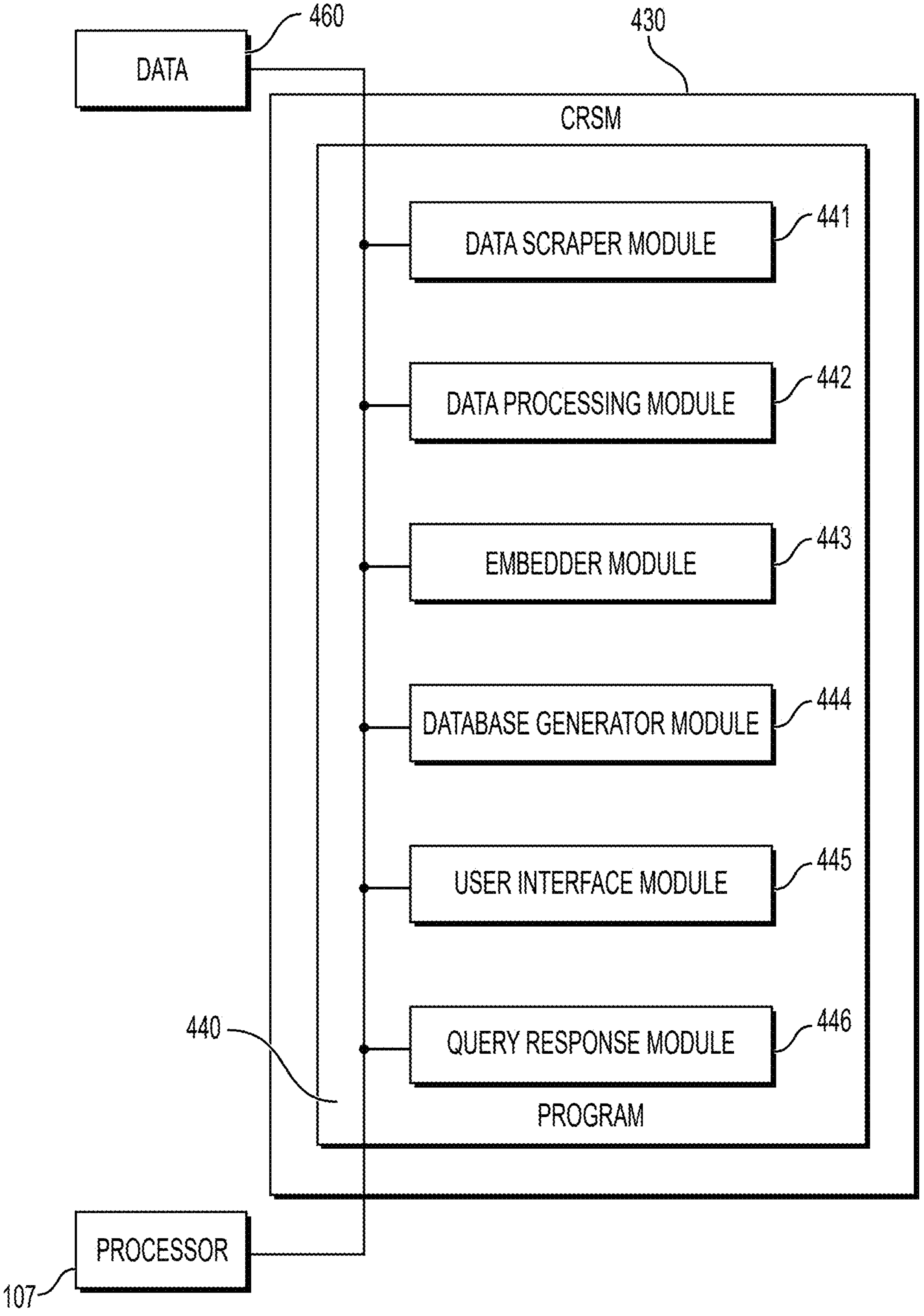
FIG. 4D illustrates an example computer program executed by the processing system of FIG. 4A.

FIG. 4D illustrates an example of a computer program. Referring to FIG. 1 and FIG. 4D, computer program 440, which may be stored on non-transitory computer-readable storage medium 430, includes data acquisition module 441, data processing module 442, embedder module 443, database generator module 444, user interface module 445, and query response module 446. One or more of the processors 107 may access the program 440, upload all or portions of the program 440 to memory 107A (see FIG. 1), and execute machine instructions or scripts associated with the uploaded computer program 440. In an example, the modules are written using Python scripts, which then are invoked to execute the herein disclosed methods. The modules work together to retrieve, process, and analyze data retrieved or accessed from data sources 460. In an example, the data sources 460 provide PubMed articles related to foot care research. The processors 107 may use various libraries such as os, json, pathlib, time, requests, lxml, csv, pandas, pinecone, dotenv, openai, embedding, and more. In an aspect, one or more of the above-disclosed modules may be included in the computing system 101. That is, the computing system 101 encompasses, but is not limited to, the program 440. Furthermore, some modules of program 440 may exist outside the computing system 101. Thus, a processor 107 executes the program 440, and such execution is shown in an example workflow routine of FIG. 4E, and in the non-inclusive process flowcharts of FIGS. 6-10.

Figure 4E:
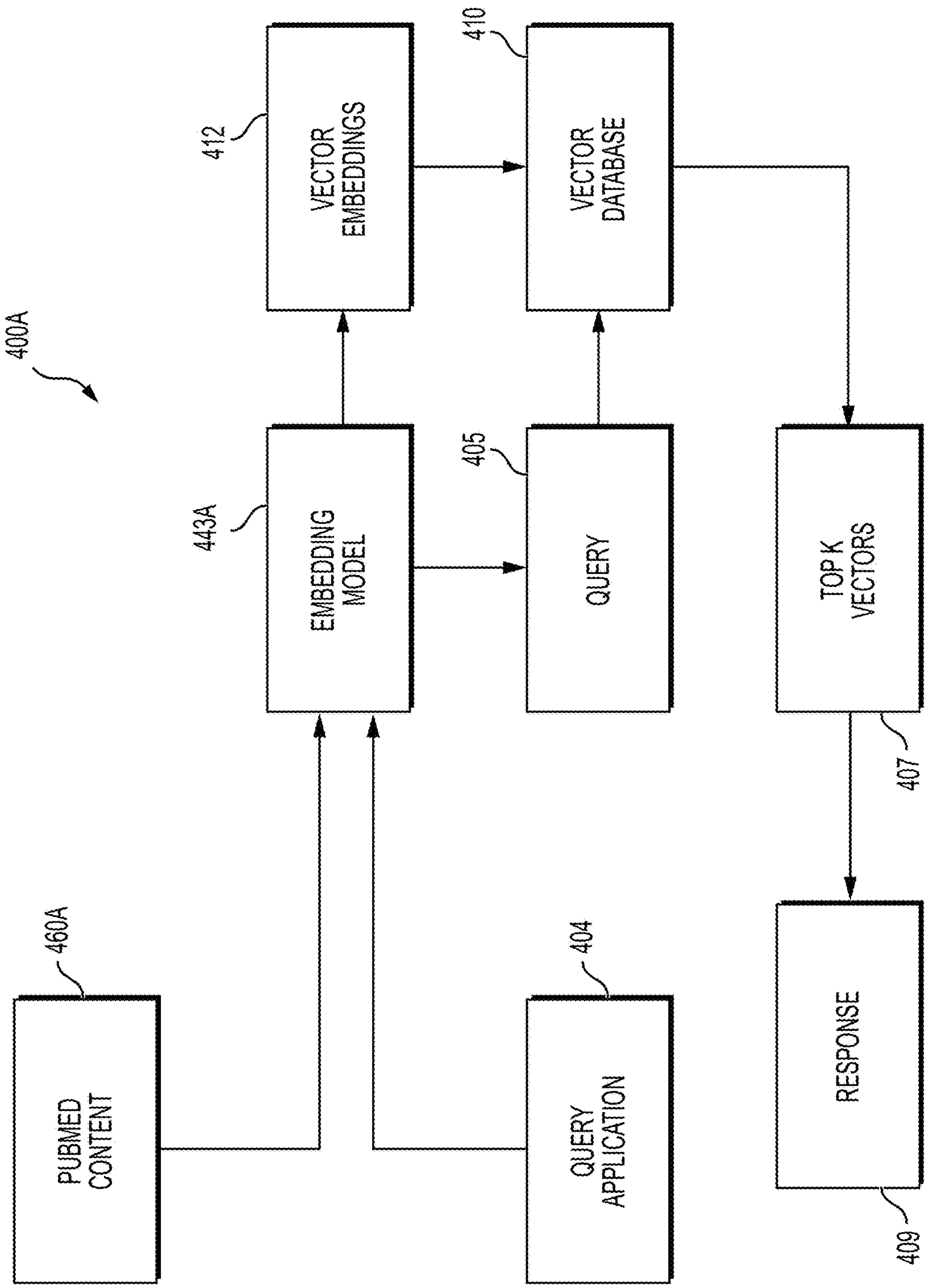
FIG. 4E illustrate an example workflow routine of the vector database node of FIG. 4B.

FIG. 4E illustrates an example workflow routine 400A of the vector database 410. Such routines include a vector database generator routine, which executes to enable a vector database construction operation, and a query intake and response generator routine, which executes to enable a query intake, query refinement, and response generation and display. FIG. 4E illustrates an example of the later routine. In FIG. 4E, PubMed content 460A or data (i.e., articles) are acquired by one or more of the processors 107. The PubMed content 460A then are provided to an embedding model 443A, which generates vector embeddings for the PubMed content 460A. The vector embeddings are stored, 412, in vector database 410, and may include a reference to the original PubMed content (for example, by use of a PMID). Subsequently, a query application 404 generates a specific query 405, and the same embedding model 443A generates an embedding for the query 405. The query embedding then is used to query the vector database 410, and through a similarity function, to identify similar embeddings. The similarity function may be a nearest neighbor function. Possible nearest neighbor functions include cosine similarity, Euclidean distance, and dot product. Cosine similarity measures the cosine of the angle between two vectors in a vector space. The cosine ranges from −1 to 1, where 1 represents identical vectors, 0 represents orthogonal vectors, and −1 represents vectors that are diametrically opposed. The top K vectors are returned, 407 and with prompts to generate a query response 409.

Figure 4F:
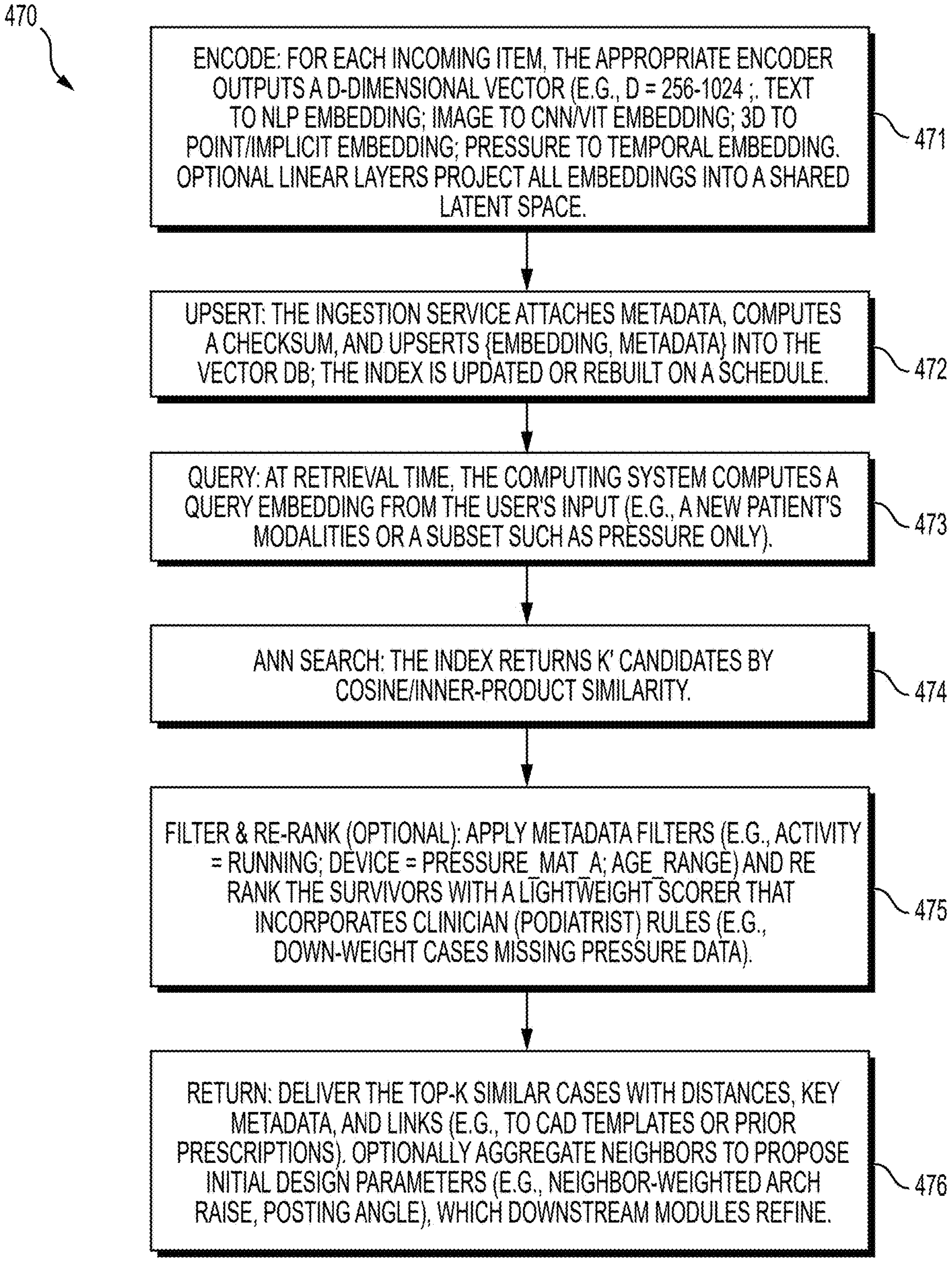
FIG. 4F is a block diagram illustrating an example operation of components of the vector database of FIG. 4B.

FIG. 4F is a block diagram illustrating an example operation 470 of components of the vector database node 400. Operation 470 beings in Encode Block 471, where, for each incoming item, processor 107 (see FIG. 1) executes the appropriate encoder to output a D-dimensional vector (e.g., D=256-1024) (as examples: Text→NLP embedding; image→CNN/VIT embedding; 3D→point/implicit embedding; pressure→temporal embedding). Optionally, the processor 107 projects embeddings into a shared latent space. In Upsert Block 472, the processor 107 executes database generator module 444 to attach metadata, compute a checksum, and upsert {embedding, metadata} into the vector database 410. The processor 107 then updates the vector database index. In Query Block 473, at retrieval time, the processor 107 computes a query embedding from a podiatrist's input (e.g., a new patient's modalities or a subset such as a patient survey response only). In ANN Search Block 474 the processor 107 executes user interface module to return k' candidate vectors by, for example, cosine or dot-product similarity. In Filter and Re-rank Block 475, the processor 107 applies metadata filters (e.g., activity=running; device=pressure_mat_A; age_range) and re-ranks the candidate vectors with a lightweight scorer that can incorporate clinician (podiatrist) rules (e.g., down-weight cases missing pressure data). In Return Block 476, the processor 107 executes query response module 446 to deliver the top-k similar vectors with distances, key metadata, and links (e.g., to CAD templates or prior prescriptions). Optionally, the processor 107 aggregates neighboring vectors to propose initial design parameters (e.g., neighbor-weighted arch raise, posting angle), which downstream modules then may refine.

The computing system 101 and the factory system 140 shown in FIG. 1 include a number of systems, sub-systems, applications, modules, models, and other components. However, the computing system 101 and the factory system 140 may include other systems, sub-systems, applications, modules, models, and components not explicitly illustrated in FIG. 1. FIGS. 5A-5L illustrate additional, and in some examples, optional, hardware and software that may be implemented in, or in communication with the FIG. 1 computing system 101 and its corresponding factory system 140.

Figure 5A:
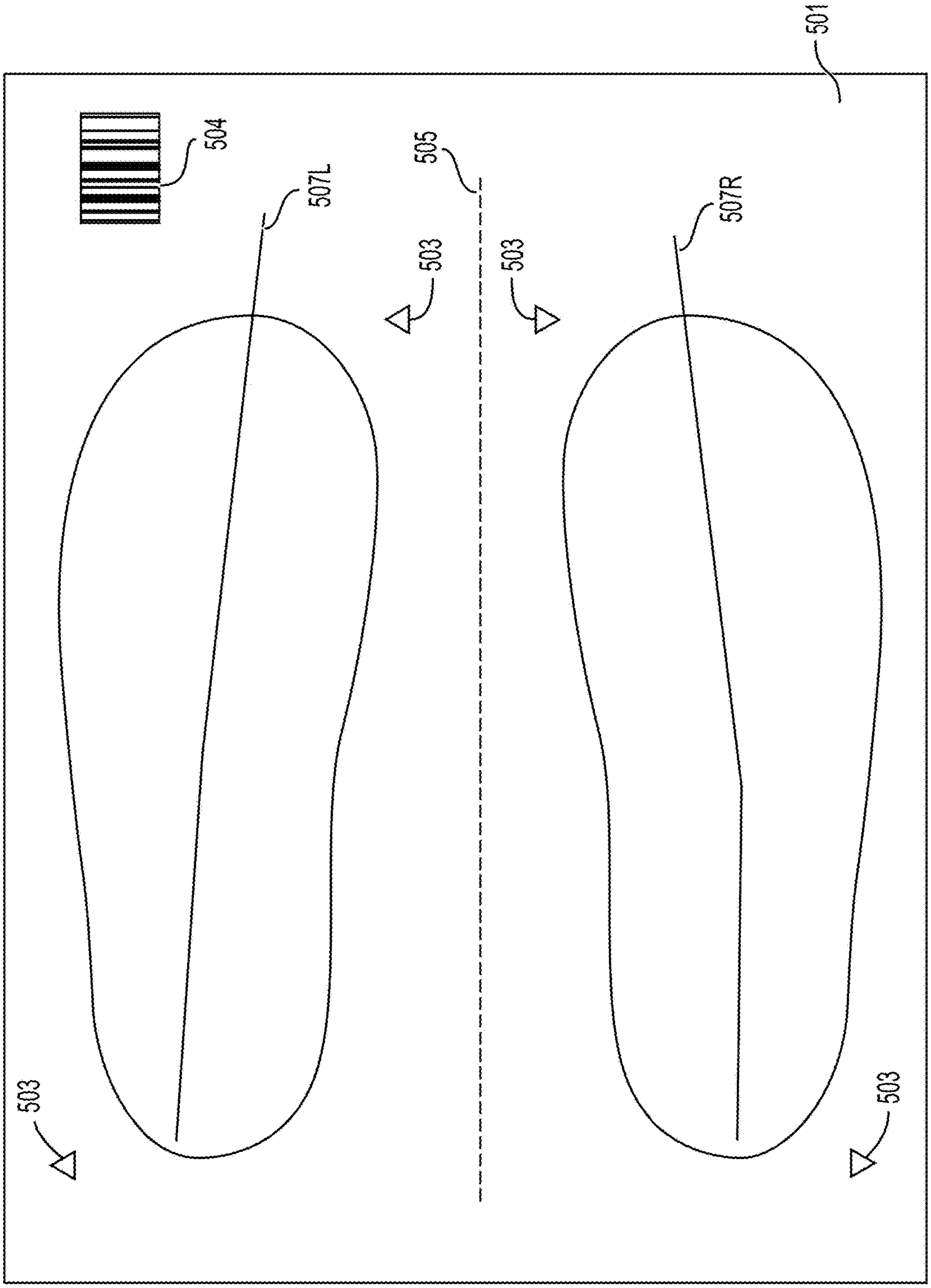
FIG. 5A illustrates an example calibration mat that may be incorporated into or accessed by the example system of FIG. 1

FIG. 5A illustrates a calibration mat 501 (i.e., a calibration surface) that includes fiducial markers 503 arranged in a predefined geometric pattern. The calibration mat 501 is intended to be placed beneath the patient's foot during imaging and provides a reference coordinate system for scaling and rectifying the captured images. The calibration mat 501 may include a center reference 505 located between left and right foot pads, and each foot pad may include a central reference line, such as left reference line 507L and right reference line 507R, respectively. Finally, the calibration mat may include a machine-readable code 504 that serves to identify the calibration mat 501. The fiducial markers may include checkerboard patterns, QR codes, or ArUco/AprilTag symbols detectable by computer vision algorithms implemented by the computing system 101, or by an imaging device in communication with the computing system 101. Software executing on the computing system 101 identifies the fiducial markers 503 in the captured image, establishes spatial scale, and corrects lens distortion, thereby enabling accurate derivation of three-dimensional foot geometry from two-dimensional images.

More specifically, and as used herein, the fiducial markers 503 refer to visually distinctive, machine-detectable patterns of known geometry and scale that are disposed within an imaging field to provide reference features for computer-vision calibration, metric scaling, pose estimation, and image rectification. The fiducial markers 503 may include high-contrast checkerboards, dot grids, or other calibrated patterns with precisely specified dimensions and relative spacing, enabling a processing system to locate repeatable key points (e.g., corners, centroids), correct lens distortion and perspective warping, establish a world or mat-fixed coordinate frame with known orientation and origin, and convert pixel measurements to real-world units. A subset of fiducial markers further may encode machine-readable identifiers (IDs) in a structured, typically binary, layout, examples include QR codes, ArUco markers, and AprilTags, which permit unambiguous marker identification, robustness to partial occlusion or view angle changes, and recovery of full six-degree-of-freedom pose (rotation and translation) of each of the fiducial markers 503 relative to the imaging device or calibration surface. In certain examples, a calibration mat 501 bearing an array of fiducial markers 503 with known inter-marker spacing provides redundant constraints that improve detection confidence, reject spurious matches, and increase accuracy of derived three-dimensional geometry from one or more two-dimensional images; suitable markers may incorporate error-correction coding, fixed border widths, and standardized contrast thresholds to ensure reliable detection under variable lighting, sensor noise, or surface reflectance.

Figure 5B:
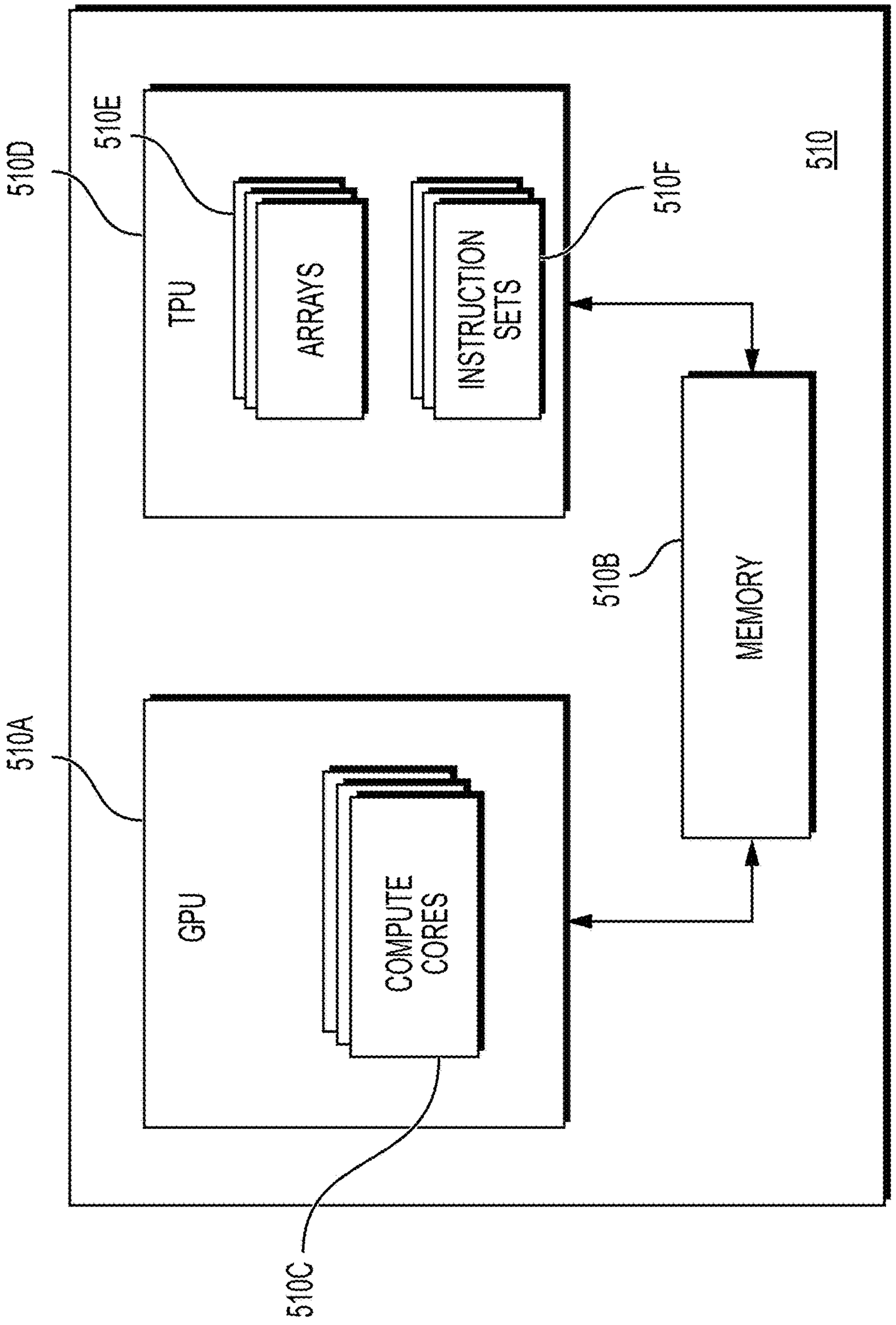
FIG. 5B illustrates example hardware devices configured to improve image processing speed and fidelity.

FIG. 5B illustrates example hardware devices configured to improve image processing speed and fidelity. In an example, the computing system 101 may include, or may access, one or more hardware accelerators 510, such as graphics processing units (GPUs) or tensor processing units (TPUs). The hardware accelerators 510 are configured to execute neural network workloads including convolutional neural networks, generative models, and multimodal embedding operations. A GPU 510A includes a number of programmable parallel compute cores 510C to provide high-throughput computing, including matrix multiplication and vectorized operations common to deep learning. A TPU 510D, by contrast, is an application-specific integrated circuit (ASIC) optimized for tensor operations, such as matrix multiplication and accumulation, that dominate training and inference of neural networks. TPUs employ specialized architectures, such as systolic arrays 510E and custom instruction sets 510F, to achieve high computational efficiency and low energy consumption for deep learning workloads. Thus, GPUs provide broader programmability and are effective for a wide variety of algorithms beyond neural networks, including image processing, scientific simulation, and cryptographic functions, whereas TPUs offer higher efficiency and throughput for deep learning tasks at the expense of reduced general-purpose flexibility. Accordingly, in certain examples, the computing system 101 may include either or both GPUs and TPUs, to obtain the generality of GPUs together with the performance and efficiency of TPUs for clinical image analysis, neural network inference, and multimodal data embedding. In an aspect, a system memory 510B may store a machine learning framework, such as TensorFlow or PyTorch, configured to deploy trained neural networks onto the hardware accelerators 510. By incorporating such hardware acceleration, the computing system 101 can process high-resolution patient images and associated survey data in real time, thereby improving the clinical workflows disclosed herein.

Figure 11:
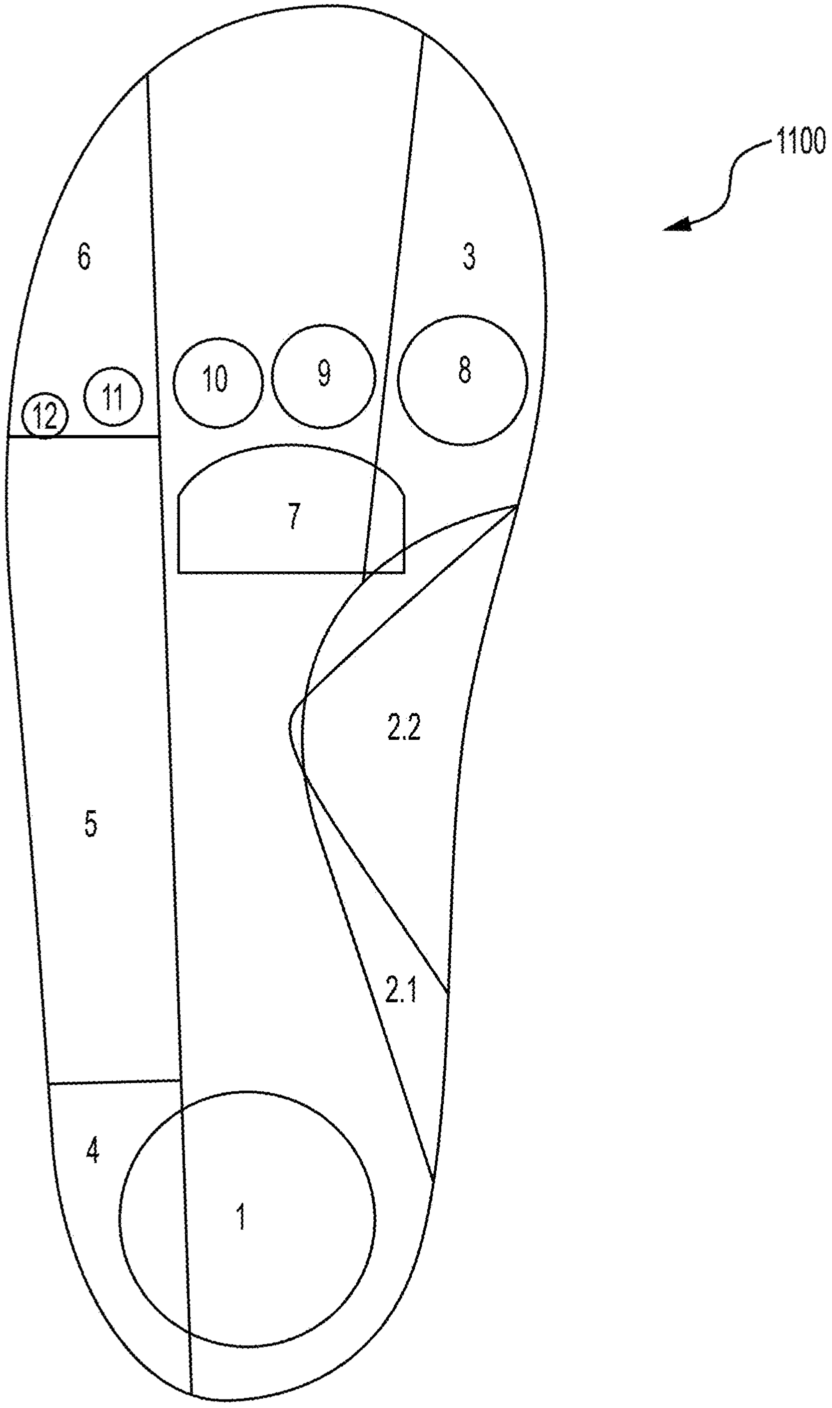
FIG. 11 illustrates an example insole template with numbered zones of adjustment for customization.

FIG. 5C illustrates an example neural-network vision pipeline that enables determination of patient foot geometry and optionally provides a proxy for plantar pressure distribution. In an example, image data of a patient's feet are processed by the neural-network vision pipeline to generate measurement-accurate geometry and zone-wise features useful for insole design. An acquisition and calibration segment 521 captures multi-view images or video of the foot while the patient stands on a calibration surface (e.g., calibration mat 501) that includes fiducial markers 502 to establish scale and pose. An optional depth segment 523 acquires depth information from a LiDAR-enabled device or equivalent sensor. A discretization and landmark segment 525 applies a convolutional or transformer-based segmentation network (e.g., U-Net, DeepLab, or a vision transformer) to isolate the foot, and a landmark detector (e.g., HRNet or stacked hourglass network) to localize anatomical points such as heel center, first and fifth metatarsal heads, navicular, hallux tip, and lateral malleolus. A 3D reconstruction segment 527 fuses multi-view frames into a metric three-dimensional mesh using photogrammetry, neural radiance fields, or implicit surface networks trained on real or synthetic foot data, and a rigid-body transform aligns the mesh to the coordinate frame defined by the calibration mat 501. An optional pressure-proxy segment 529 employs a neural model conditioned on geometry and stance images to predict a plantar pressure or load distribution map, trained against pressure-mat or in-shoe sensor datasets. The neural-network vision pipeline 520 outputs: a watertight, scale-accurate 3D mesh (i.e., a closed manifold mesh without gaps suitable for measurement and fabrication); linear and angular measures such as arch height, heel cup curvature, and forefoot width and angles; and per-zone features (e.g., for predefined zones such as shown in FIG. 11) describing target relief or raised values, local curvature, and recommended hardness ranges. A quality evaluation segment may include geometric accuracy (e.g., point-to-surface or Chamfer distance), landmark accuracy (e.g., probability of correct key point at 5-8 mm thresholds), and pressure prediction accuracy (e.g., root mean square error versus sensor measurements).

Figures 5D, 5E:
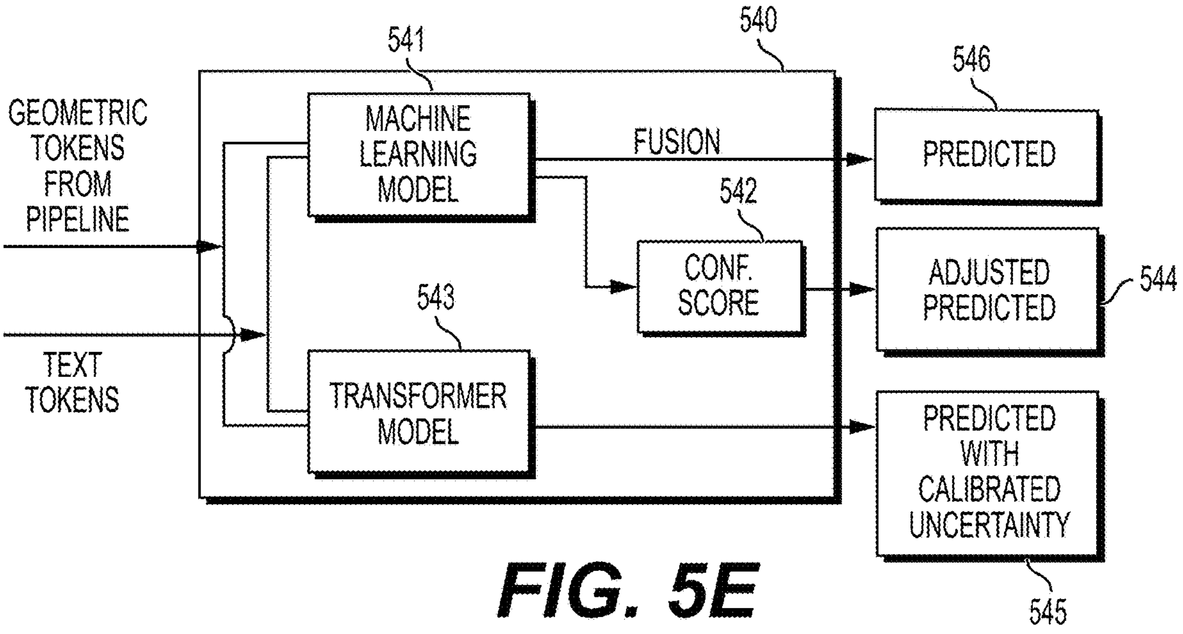
FIG. 5D illustrates an example physics simulation module.
FIG. 5E illustrates an example multimodal fusion module.

FIG. 5D illustrates an example physics simulation module 530 that may be implemented in the computing system 101. In an example, the augmented reality application 114 (see FIG. 1) may incorporate or interface with the physics simulation module 530 to approximate the biomechanical loading of a patient's foot on a custom insole. The physics simulation module 530 may receive as inputs 531 the three-dimensional model of the patient's foot, a computer-aided design (CAD) model of the custom insole, patient-specific biomechanical parameters, and material property definitions for the insole components. The physics simulation module 530 may employ finite element analysis (FEA) component 532, rigid body dynamics component 533, and contact mechanics component 534 to simulate stress, strain, and deformation under various loading scenarios, such as standing, walking, or running. A controller submodule 535 (which may include hardware and software components) may define boundary conditions, apply patient-specific weight and motion vectors, and manage simulation time steps. A solver submodule 536 may compute contact forces, pressure distributions, and material deflections, and generate numerical outputs that are transformed into simulation results 537 including, for example, visual overlays such as heatmaps, animated deformations, and biomechanical performance metrics. The simulation results 537 may be transmitted to and rendered by the augmented reality application 114, thereby allowing the podiatrist to observe predicted pressure zones, evaluate support effectiveness, and validate the suitability of the custom insole prior to manufacture.

FIG. 5E illustrates an example multimodal fusion module 540 that functions to generate per-zone insole adjustment parameters. In an example, the multimodal fusion module 540 receives as inputs geometric tokens or features derived from the neural-network vision pipeline 520 and text tokens or features retrieved from a vector database containing patient symptom descriptions, design rules, and literature-derived knowledge. In a baseline late-fusion approach, a machine learning model 541 such as a gradient-boosted decision tree or a multilayer perceptron (MLP) processes concatenated geometric features and retrieved text features to generate predicted 546 per-zone adjustments, including, for example, height values (mm), posting angles (deg), heel cup depth (mm), metatarsal pad location, and local material hardness (e.g., Shore A scale). Outputs may further include confidence scores 542, which can be clipped or constrained to podiatrist-defined safe operating ranges and to produce corresponding adjusted predictions 544. In an alternative example employing cross-attention fusion, a lightweight transformer model 543 applies cross-attention between zone-specific feature vectors ("zone tokens") and retrieved text tokens to produce the same class of predicted outputs with calibrated uncertainty 545. In situations where uncertainty values exceed predetermined thresholds, the multimodal fusion module 540 may automatically flag the case for podiatrist review, thereby ensuring clinical oversight and safety.

The multimodal fusion module 540 employs confidence scores with clipping/constraining to safe ranges. The confidence score is a numerical value output by a machine learning model that indicates how certain the model is about a prediction, typically between 0 and 1 (or 0-100%). Clipping/constraining are employed to limit the model's predicted adjustments so the adjustment stay within clinically safe limits set by the podiatrist. In an example, if the model predicts a 10° posting angle with 95% confidence, but the clinician-defined safe range is ±6°, the output is clipped to 6°. If the model predicts raising the heel cup by 25 mm with only 60% confidence, and the safe range is 0-15 mm, the multimodal fusion module 540 constrains the output to 15 mm maximum or flags the output for review by the podiatrist. These operations ensure the generative artificial intelligence algorithm 128 cannot suggest unsafe or unrealistic modifications, and clinicians retain oversight.

Figure 5F:
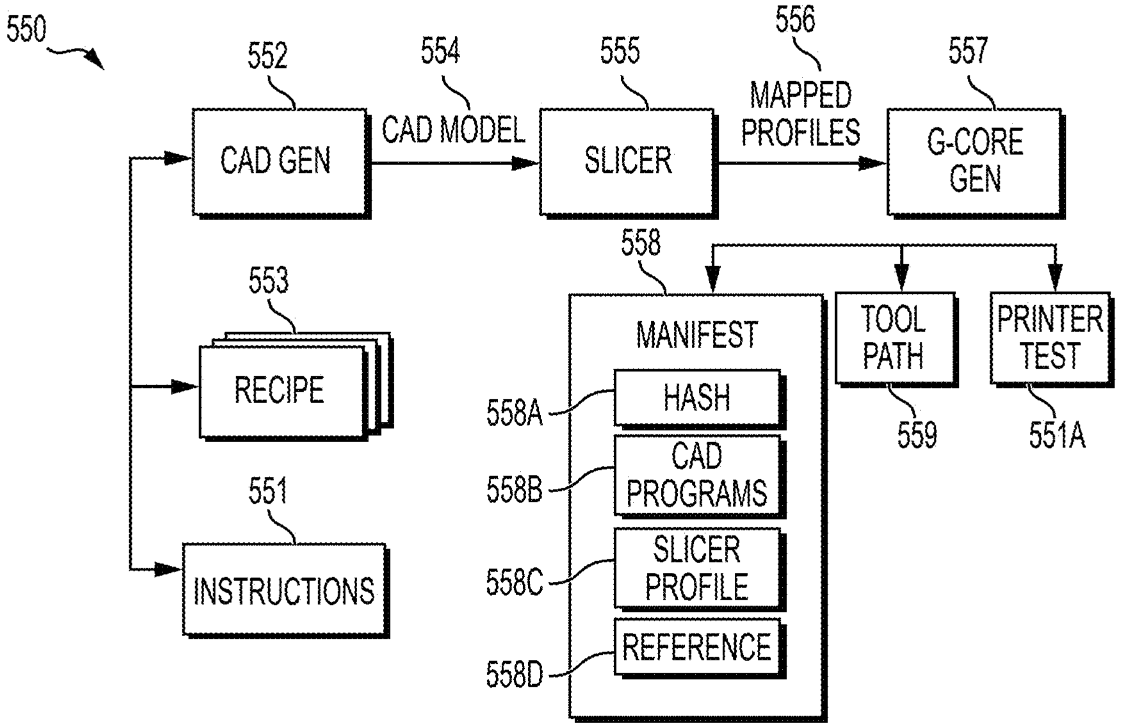
FIG. 5F illustrates an example parametric CAD/CAM and 3D printing module.

FIG. 5F illustrates an example parametric CAD/CAM and 3D printing module 550, together with corresponding instructions. In an example, a parametric CAD generator 552 (e.g., FreeCAD, OpenSCAD, Onshape® API, or an equivalent kernel) consumes per-zone recipes 553 of parameters and tolerances to deterministically produce manufacturable solid models. The recipes 553 may specify, by way of example, dimensional tolerances (e.g., length and width ±0.25 mm, arch height ±0.10 mm), minimum geometric constraints (e.g., fillet radius ≥1.0 mm at transitions), and material properties (e.g., foam hardness in the range of Shore A 15-40; a base layer formed of thermoplastic polyurethane (TPU) when produced by additive manufacturing, or polypropylene when produced by injection molding). Module 550 is further configured to generate a toolpath 559 for an additive printer. A slicer profiler 555 maps zone-specific requirements such as hardness or compliance to per-region infill or lattice parameters (e.g., pattern, cell size, density) and, in the case of multi-material printers, to different material channels. A G-code generator 557 produces machine-executable instructions (G-code 551A) together with a manifest 558 that may include: a cryptographic hash of the input specification, a CAD parameter file (e.g., JSON), slicer profile and version information, and references to retrieved design evidence, thereby ensuring traceability and reproducibility. The G-code 551A and associated manifest 558 may be stored in system memory or on a network resource and subsequently executed by the additive printer to fabricate the insole.

Figure 5G:
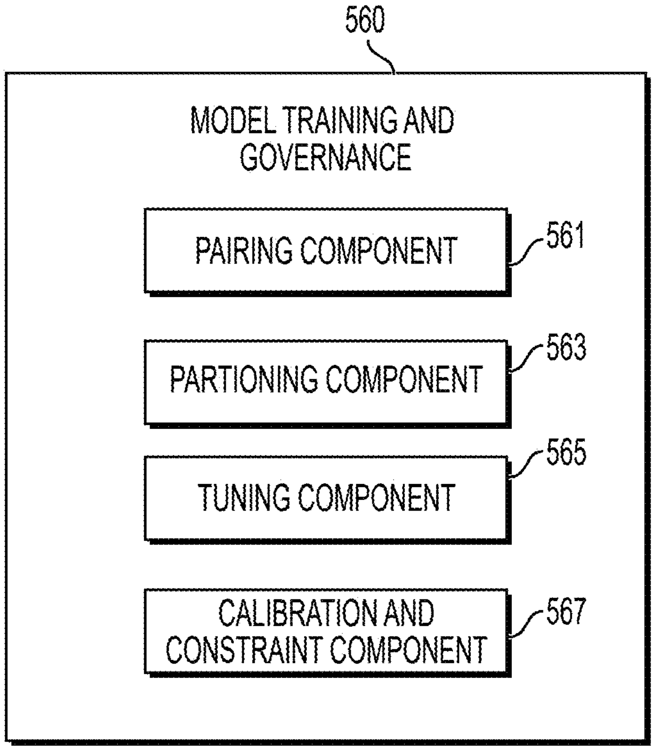
FIG. 5G illustrates an example model training and governance module.

FIG. 5G illustrates an example model training and governance module 560. In an example, the computing system 101 and, in some examples, the factory system 140 invoke model training and governance module 560 to perform supervised training by pairing (using pairing component 561) patient image data and questionnaire-derived features with podiatrist-approved insole parameters and clinical outcomes. The training process partitions (using portioning component 563) datasets on a per-patient basis to prevent data leakage across sets. Tuning component 565 tunes model hyperparameters using nested cross-validation or other suitable optimization techniques. The module 560 applies predictive uncertainty calibration (e.g., temperature scaling or equivalent methods) using calibration and constraint component 567 to improve the reliability of probability estimates. When outputs exceed dimensional, unit, or podiatrist-defined constraints, the module 560 clips the values to safe ranges or flags the case for podiatrist review, thereby ensuring that automated predictions remain clinically acceptable while retaining podiatrist oversight.

FIG. 5H illustrates an example data schema 568 with a per-zone output (JSON). The script of FIG. 5H defines a deterministic orthosis specification object and a corresponding retrieval template. Block 568A enumerates a "zones" array that encodes localized shape edits. Each zone record begins with "id" to provide a stable index for downstream control software and CAD export. Field "raise_mm" expresses a positive surface addition in millimeters applied to the identified zone. Field "relief_mm" expresses a material removal depth in millimeters, with zero indicating no excavation. Field "posting_deg" specifies the angular posting in degrees for that zone so that a controller can apply a wedge or tilt during manufacturing. Field "shoreA" declares the elastomer hardness for that region on the Shore A scale to support multi-durometer builds. Field "confidence" records a model or rules engine confidence score used for audit and decision gating. In the illustrated instance, zone 1 calls for a two-millimeter raise, no relief, zero degrees posting, Shore A thirty hardness, and a confidence of 0.86; zone 2 calls for a half-millimeter raise, no relief, one-point-five degrees posting, Shore A twenty-eight hardness, and a confidence of 0.81. The code then specifies "heel_cup_depth_mm": 16.0 to set the heel cup depth in millimeters within a permitted tolerance, and "arch_height_delta_mm": 3.5 to set the intended arch elevation relative to a neutral last or baseline geometry. The "met_pad" object asserts the presence of a metatarsal pad and supplies "center_xyz_mm": [32.1, 18.7, 3.0] as the pad center in millimeters in a plant-established coordinate frame, thereby enabling exact placement during toolpath generation and during insole inspection. Block 568B (labeled "Vector-DB-record (template)") establishes a searchable template that anchors retrieval and quality control. Field "template_id": "T-AL-arch-mid" furnishes an immutable identifier that links the template to downstream records and to build certificates. Field "text" supplies a natural-language description, namely "Mid-arch support orthosis with medial posting for pronation; heel cup 16-18 mm; forefoot neutral." so that retrieval and human review remain transparent. Field "numeric" constrains quantitative parameters as closed intervals, here "heel_cup_depth_mm": [16, 18] and "posting_deg": [2, 4], which allows validation and range-aware nearest-neighbor queries during case matching. Field "embedding": [ . . . ] holds the vector representation of the template description and salient numeric features for approximate-nearest-neighbor search. Field "metadata" records provenance with "source": "internal_rule_v3.2" and "updated": "2025 Jun. 30" to support auditability, traceability, and lifecycle management. Together, the command lines define a machine-readable prescription for an arch-support orthosis and a paired retrieval template that enforces parameter ranges, captures material and geometry directives at zone level, and preserves verifiable provenance for regulated manufacturing.

Figure 5I:
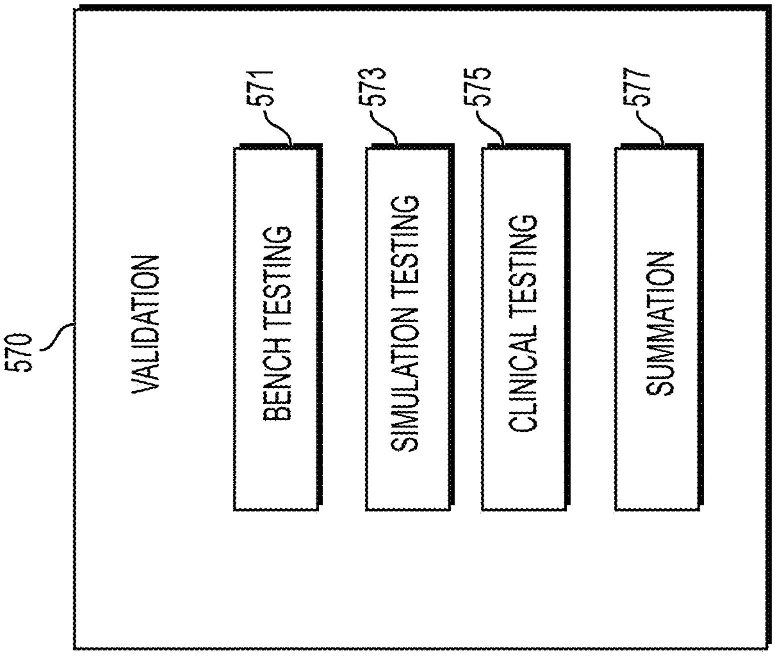
FIG. 5I illustrates example clinical and bench validation module.

FIG. 5I illustrates example clinical and bench validation module 570 that may be implemented by the computing system 101 and its corresponding factory system 140 used to evaluate system performance. In bench testing 571, the module 570 executes to compute geometric accuracy by comparing reconstructed foot meshes against a reference scanner using Chamfer distance and mean absolute error (mm). In simulation testing 573, the module 570 evaluates predicted plantar pressure distributions generated by augmented reality or finite element load cases against pressure-mat ground truth using root mean square error (RMSE). In clinical (podiatrist) testing 575, the module 570 tracks patient outcomes, including the rate of insole refitting, the time required for the patient to report comfort, changes in visual analogue scale (VAS) pain scores, and the number of days of patient adherence. These validation endpoints, which may be summarized 577 into a single result, demonstrate that the computing system 101 produces measurement-accurate geometry, biomechanically relevant predictions, and clinically meaningful improvements.

Figure 5J:
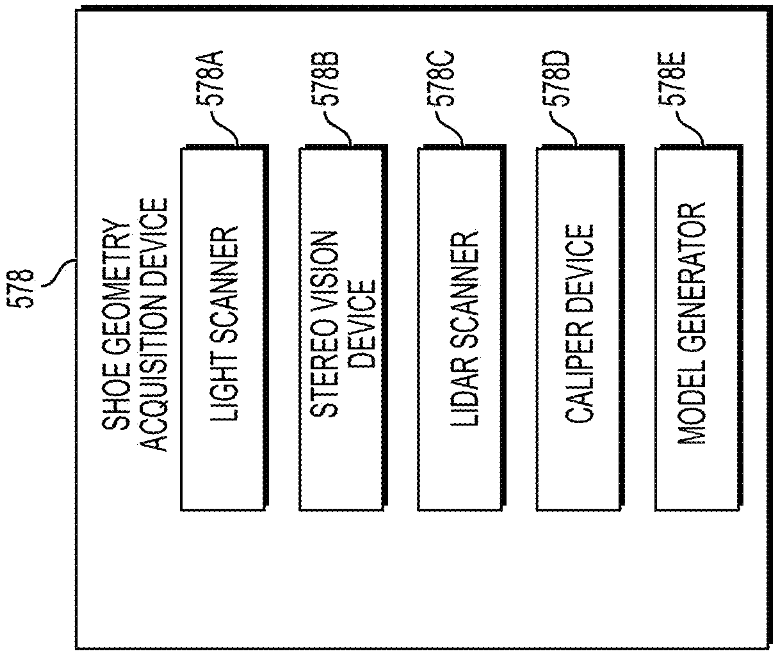
FIG. 5J illustrates an example shoe geometry acquisition device.

FIG. 5J illustrates an example shoe geometry acquisition device 578. In some examples, the computing system 101 includes, or communicates with, a shoe geometry acquisition device configured to capture the internal volume of a shoe in which the custom insole will be placed. The shoe geometry acquisition device 578 may include a structured light scanner 578A, a stereo vision system 578B, a handheld LiDAR scanner 578C, and/or a mechanical caliper system 578D. The shoe geometry acquisition device 578 is configured (model generator 578E) to output a digital model of the shoe interior, which is then aligned with the patient's custom insole model to ensure proper fit. Associated software modules correct distortions, merge multiple scan passes, and export the shoe geometry as a mesh or point cloud representation.

Figure 5K:
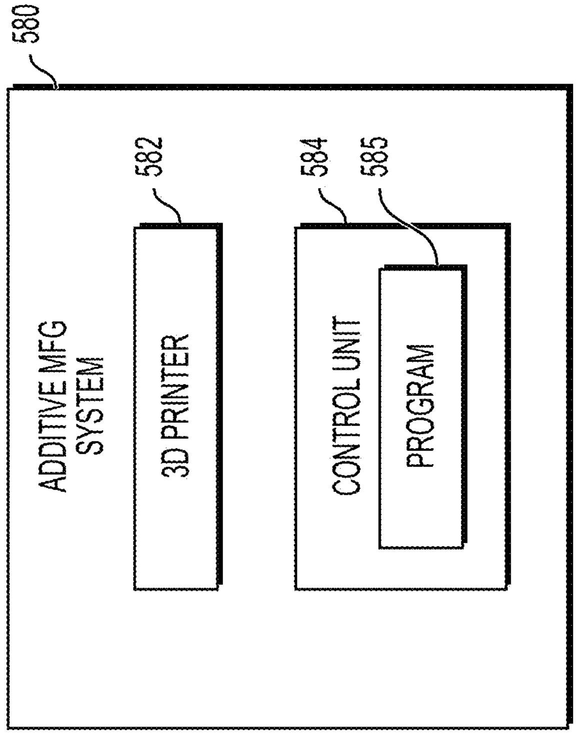
FIG. 5K illustrates an example multi-material additive manufacturing system.

FIG. 5K illustrates an example multi-material additive manufacturing system 580. In an example, the system 580 includes a three-dimensional (3D) printer 582 configured to fabricate a custom insole using two or more build materials and/or using different process parameters for a single material. The 3D printer 582 employs a print head that selectively deposits or cures materials, a build plate that supports the insole during fabrication, and one or more material cartridges, reservoirs, or channels that supply polymers, elastomers, composites, or photopolymers of differing hardness or elasticity. The system 580 may produce insoles with per-zone or per-layer variation, such that a first layer includes a relatively rigid material for structural support while a second layer includes a softer material for cushioning, or such that successive layers of the same material are fabricated at different densities, porosities, or hardness values to create graded compliance. A control unit 584 executes slicing software (part of program 585) that translates a parametric CAD model into printer control instructions, including layer-by-layer infill density, lattice architecture, and material assignment. Depending on the example, the printer 582 may implement fused deposition modeling (FDM), stereolithography (SLA), selective laser sintering (SLS), PolyJet printing, digital light processing (DLP), binder jetting, or multi-jet fusion. By employing these additive manufacturing methods, the system 580 generates insoles with continuous or discrete gradients of stiffness, either across anatomical zones or between successive layers, thereby eliminating manual assembly and enabling precise customization of support and cushioning.

Figure 5L:
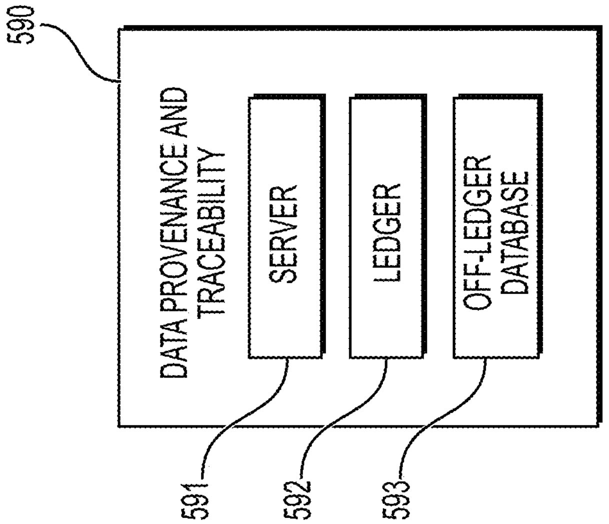
FIG. 5L illustrates an example data provenance and traceability server node.

FIG. 5L illustrates an example data provenance and traceability server node 590. The server node 590 includes a traceability server 591 and one or more databases. In some examples, the computing system 101 and the factory system 140 each include or communicate with the traceability server node 590 to store records related to insole design and production, including patient identifiers, survey responses, embeddings, insole CAD models, and manufacturing files. The traceability server node 590 includes or couples to a blockchain or distributed ledger system (blockchain 592) and records a cryptographic hash of each data object together with a patient ID or insole ID. Each block of the blockchain 592 includes a pointer or reference to an off-chain database that contains detailed records such as material sources, fabrication procedures, and machine parameters. Anchoring a hash on the blockchain 592 and storing detailed data in off-ledger (i.e., off-chain) database 593 ensures data integrity, provenance, and reproducibility without exposing sensitive patient information directly on-chain. In an example, the blockchain 592 is a non-consensus, permissioned blockchain that operates without mining or distributed consensus and instead relies on trusted participants within the podiatry clinic or factory. The traceability server 591 executes software modules that register, retrieve, and verify provenance records. Authorized users, such as a podiatrist and designated clinical or factory personnel, may access the traceability server 591 to confirm that a manufactured insole corresponds to the verified design parameters, patient data, and associated manufacturing records. Additional aspects and configuration of an alternate server node are disclosed with respect to FIG. 17A.

FIGS. 6-10 are flowcharts illustrating example processes for designing and manufacturing a custom insole will be described in further detail. The processes described in FIGS. 6-10 can be applied to the systems illustrated in FIG. 1 or to alternate implementations of computing and factory systems. In alternate examples, the operations illustrated in FIGS. 6-10 may be modified or combined with other operations.

Figure 6:
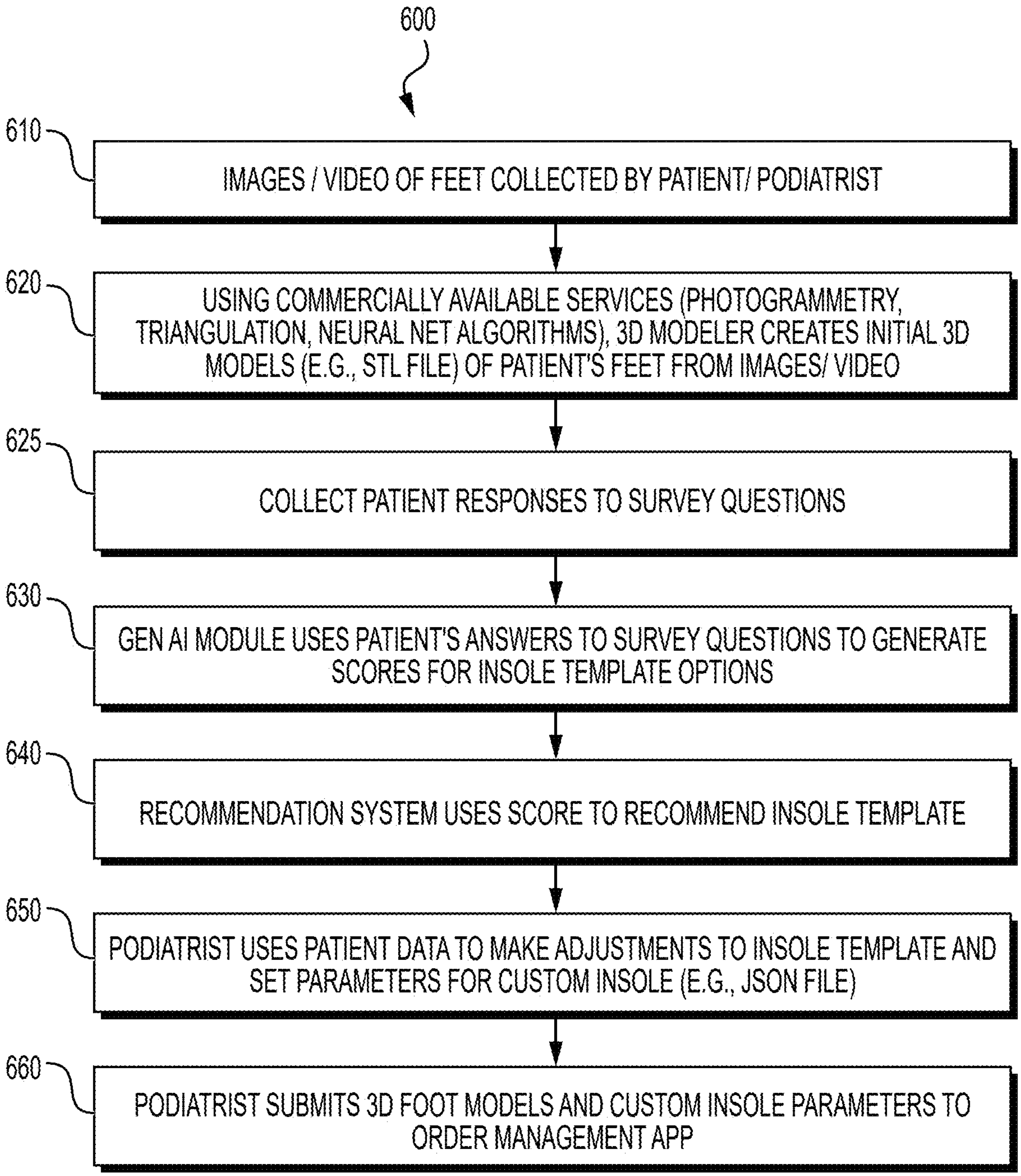
FIG. 6 illustrates an example process for generating a three-dimensional model of a person's foot or feet.

FIG. 6 illustrates an example method 600 for generating a three-dimensional model of a patient's foot and then designing a custom insole for the patient. In operation 610, images of the patient's foot are collected and stored in storage device 120. As explained previously, the images may be collected by the patient in the form of still images or video and may be communicated from the patient computer 102 to the storage device 120. Alternatively, in connection with the podiatrist's examination of the patient, the podiatrist may collect the images and communicate them from the podiatrist computer 106 to the storage device 120. In some aspects, separate image capture is performed for each foot to account for anatomical asymmetry, and shoe geometry data also may be collected for a specific shoe corresponding to each foot.

In operation 620, the 3D modeler 116 creates a three-dimensional model of the patient's foot from the images of the foot. The creation of the model may be initiated by the podiatrist via the podiatrist computer 106 and the podiatrist treatment module 112. In operation 625, a patient survey application 109 may be used to collect the patient's responses to survey questions, and store the responses in the storage device 120. In operation 630, the generative artificial intelligence algorithm 128 may generate similarity scores correlating the patient's survey responses with various options for insole templates. The similarity computation may use vectors retrieved from a vector database. Example operations of the generative artificial intelligence algorithm 128 are described further in connection with FIG. 3.

In operation 640, the recommendation system 124 uses the similarity scores generated by the generative artificial intelligence algorithm 128 to select a recommended insole template for the patient. In operation 650, the podiatrist uses patient data to make adjustments to the recommended insole template to enhance the fit of the recommended insole template to the patient. The patient data may include the images of the foot, the three-dimensional model of the foot, the patient's responses to the survey questions, and biomechanical and/or postural data describing the patient's gate, posture, and/or physical features. As illustrated in the example of FIG. 11, an insole template may have twelve zones in which the podiatrist can make adjustments such as raising or lowering a surface of the insole template or adjusting a curvature of a surface on the insole template. The recommended insole template, as verified by the podiatrist, and the podiatrist's custom insole parameters may be saved in a structured text file for use in the manufacture of the custom insole. In operation 660, the podiatrist uses the podiatrist treatment module 112 to submit the three-dimensional foot model, the recommended insole template, and the custom insole parameters to order management application 130 to initiate the manufacturing process for the custom insole.

Figure 7:
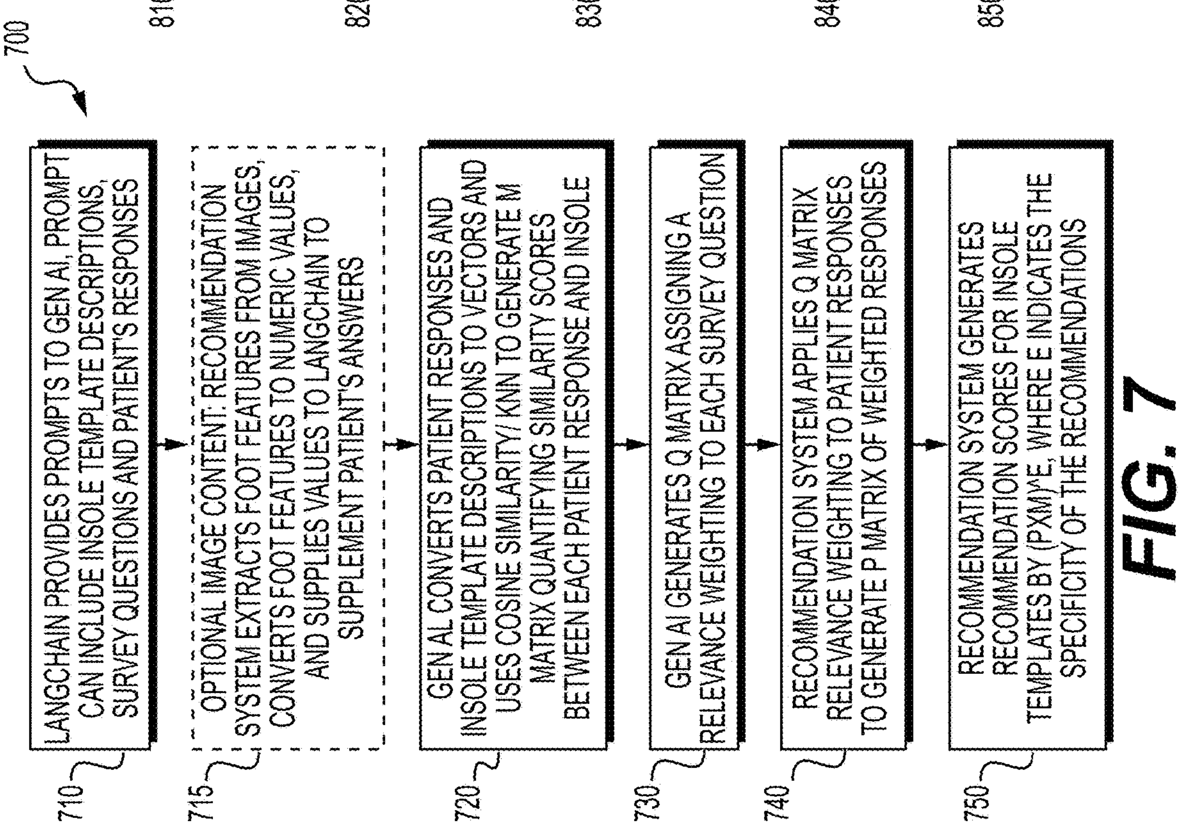
FIG. 7 illustrates an example process for using a generative artificial intelligence system to provide custom insoles.

As referenced above, FIG. 7 provides a process 700 describing the recommendation system 124 and the generative artificial intelligence algorithm 128 in greater detail. The recommendation system 124 and the generative artificial intelligence algorithm 128 are particularly helpful because the large number of adjustments that can be made to the various available insole templates presents a challenge in customizing the insole for a precise fit of the patient's foot. In operation 710, artificial intelligence prompt interface 126, an example of which is LangChain®, provides prompts to the generative artificial intelligence algorithm 128. As examples, the prompts can include a variety of information relating to insoles to improve the accuracy of the responses from the algorithm. The prompts can include information about the available insole templates, the survey questions provided to the patient, and the patient's responses to the survey. Optionally, data extracted from images of the patient's foot may also be supplied to the artificial intelligence prompt interface 126. As an example, as illustrated in operation 715, the recommendation system can extract features of the foot from the images and convert those features to numeric values for supplying to the artificial intelligence prompt interface 126. The numeric values may represent dimensions, such as length, width, and curvature, of particular portions of the foot. The artificial intelligence prompt interface 126 can provide the forgoing information to the generative artificial intelligence algorithm 128 with a request to generate similarity scores correlated to various insole template options.

In operation 720, the generative artificial intelligence algorithm 128 receives patient data, including image-derived embeddings and survey responses, together with insole template descriptions encoded as template embeddings. The generative artificial intelligence algorithm 128 converts these data into vectors and computes a similarity matrix M of scores correlating the patient data embeddings to the insole template embeddings. The similarity scores may be computed using machine-implemented similarity functions, including but not limited to cosine similarity, dot-product scoring, K-nearest neighbor (KNN) or approximate nearest neighbor (ANN) search. In operation 730, the generative artificial intelligence algorithm 128 applies an attention mechanism or feature importance scoring module implemented in software and executed by a processor, to generate a relevance matrix Q. The matrix Q assigns numerical relevance weights to survey response features or image-derived features, with higher weights assigned to features determined by the model to be more predictive of optimal insole selection. In operation 740, the recommendation system 124 receives the Q matrix and performs a matrix multiplication with the patient's feature vector to generate a weighted patient matrix P. In operation 750, the recommendation system 124 generates one or more recommendation scores for the insole templates by applying the weighted patient matrix P to the similarity matrix M according to a computational formula, such as $(P\times M)\hat{}E$, where the exponent E specifies a tunable parameter controlling the specificity of recommendations. All computations are performed by the computing system 101 and stored in the storage device 120 for subsequent use by the podiatrist.

Figure 8:
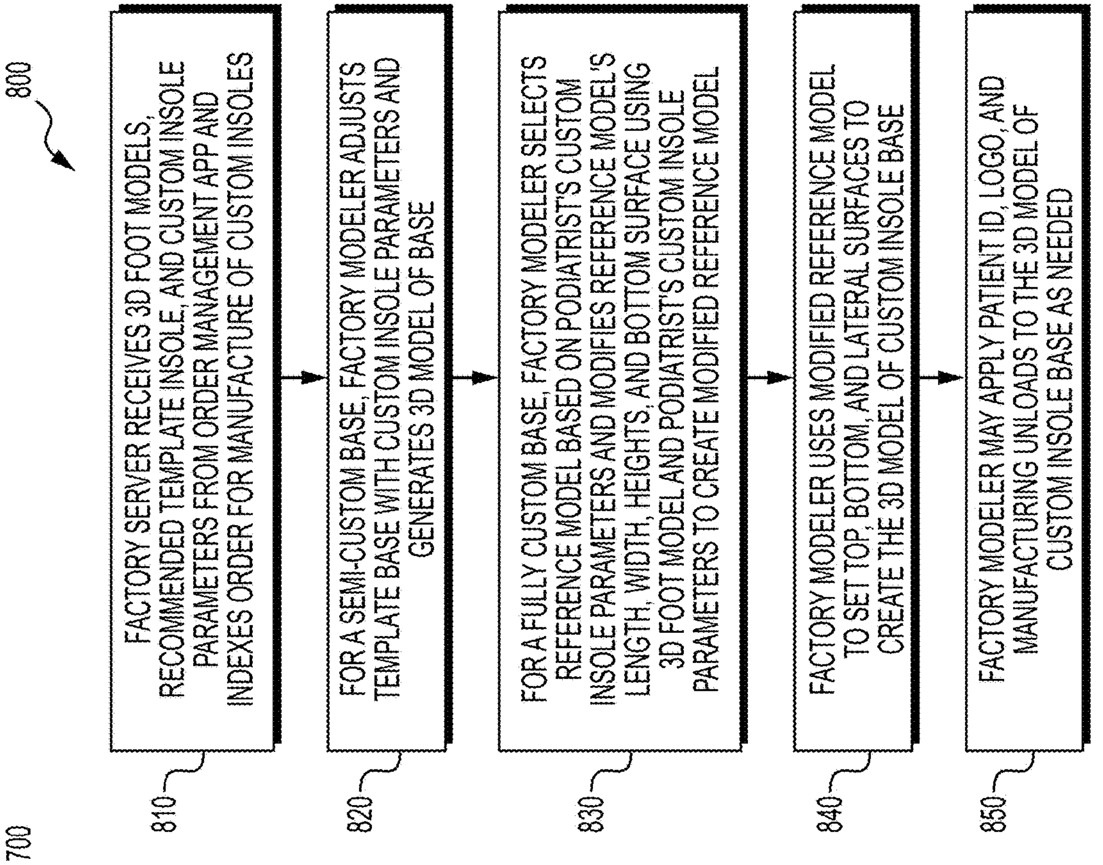
FIG. 8 illustrates an example process for generating a three-dimensional model of a custom insole base.
Figure 9:
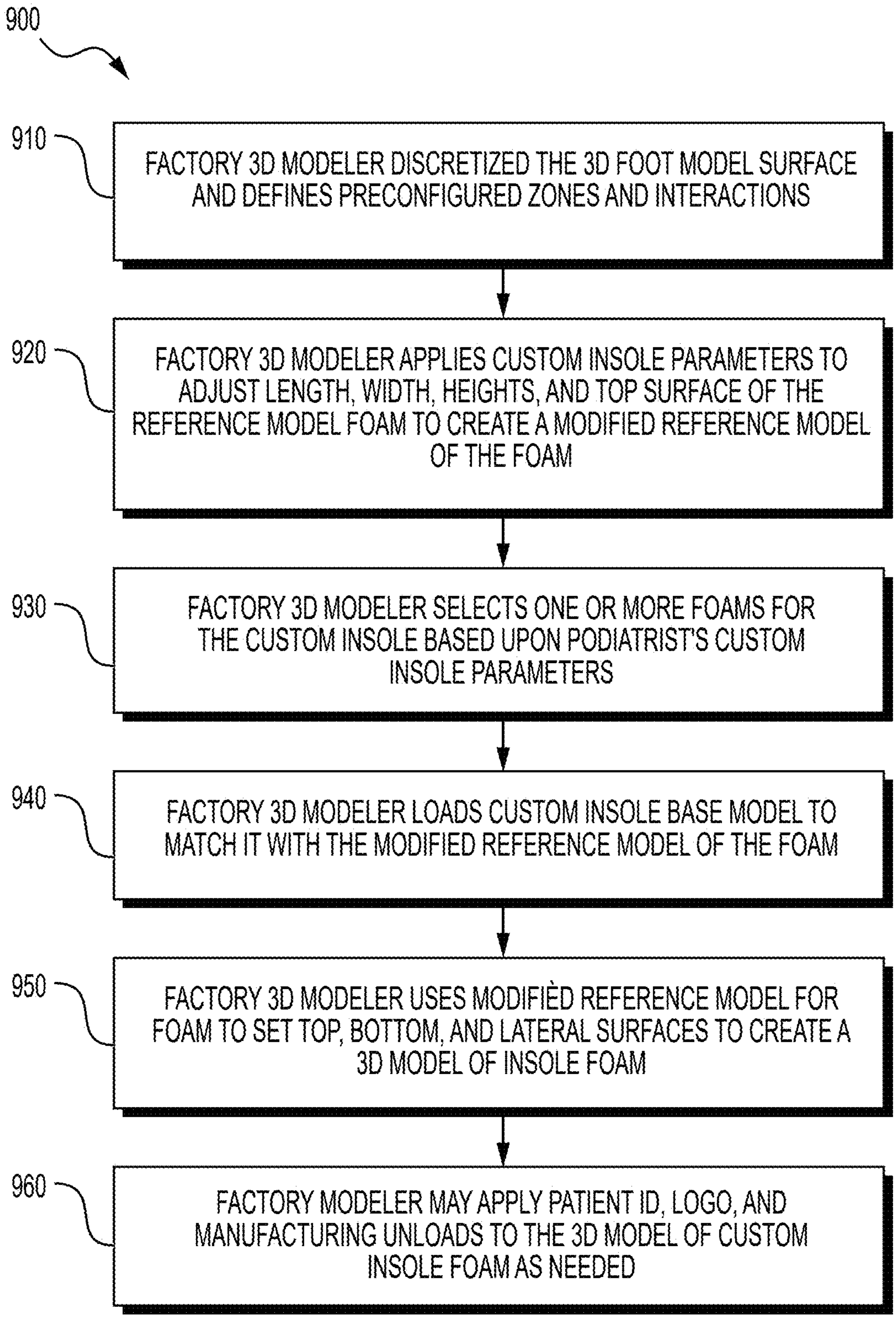
FIG. 9 illustrates an example process for generating a three-dimensional model of a custom insole foam.

FIGS. 8 and 9 illustrate example processes for generating three-dimensional models of the custom insole base and the custom insole foam. In cases where a custom insole will not include a base, the process of FIG. 8 may be omitted and operations of the factory system 140 can proceed to the process of FIG. 9.

In FIG. 8, process 800 begins with operation 810 in which the factory server 142 receives the order from order management application 130 and an associated three-dimensional foot model, a recommended insole template, and custom insole parameters set by the podiatrist. The factory server 142 assigns an index number to the order and places the order in sequence for manufacturing the custom insole. In the case of a semi-custom insole base, in operation 820 the factory 3D modeler 144 adjusts the recommended insole template with the custom insole parameters and generates a three-dimensional model of the custom insole base. As an alternative to operation 820, in the case of a fully custom insole base, in operation 830, the factory 3D modeler 144 selects a reference insole template based on the custom insole parameters and modifies the length, width, height, and bottom surface of the reference insole template using the three-dimensional model of the foot and the custom insole parameters to create a modified reference insole template. In operation 840, the factory 3D modeler 144 uses the modified reference insole template of operation 830 to generate a three-dimensional model of the custom insole base. Lastly, in operation 850, the factory 3D modeler 144 applies to the generated three-dimensional model of the custom insole base, any necessary manufacturing details, such as a patient identifier, a logo, and manufacturing unloads (e.g., positioning holes used in the manufacturing process).

FIG. 9 illustrates example process 900 for generating a three-dimensional model of the foam portion of the custom insole. In operation 910, the factory 3D modeler 144 discretizes the surface of the three-dimensional model of the patient's foot and defines preconfigured zones and interactions along the surface. The preconfigured zones and interactions are areas where the foot will contact the foam or areas that correspond to custom insole parameters. In operation 920, the factory 3D modeler 144 applies custom insole parameters to adjust the length, width, height and top surface of the recommended insole template or the reference model foam to create a modified reference model of the foam. In operation 930, the factory 3D modeler 144 selects one or more types of foam for the custom insole based upon the podiatrist's custom insole parameters.

In operation 940, the factory 3D modeler 144 loads the previously created custom insole base model to match its fit with the foam. In operation 950, the factory 3D modeler 144 uses the modified reference model for the foam to set the top, bottom, and lateral surfaces to create the three-dimensional model of the insole foam. Lastly, in operation 960, the factory 3D modeler 144 applies to the generated three-dimensional model of the custom insole foam, any necessary manufacturing details, such as a patient identifier, a logo, and manufacturing unloads (e.g., positioning holes used in the manufacturing).

Figure 10:
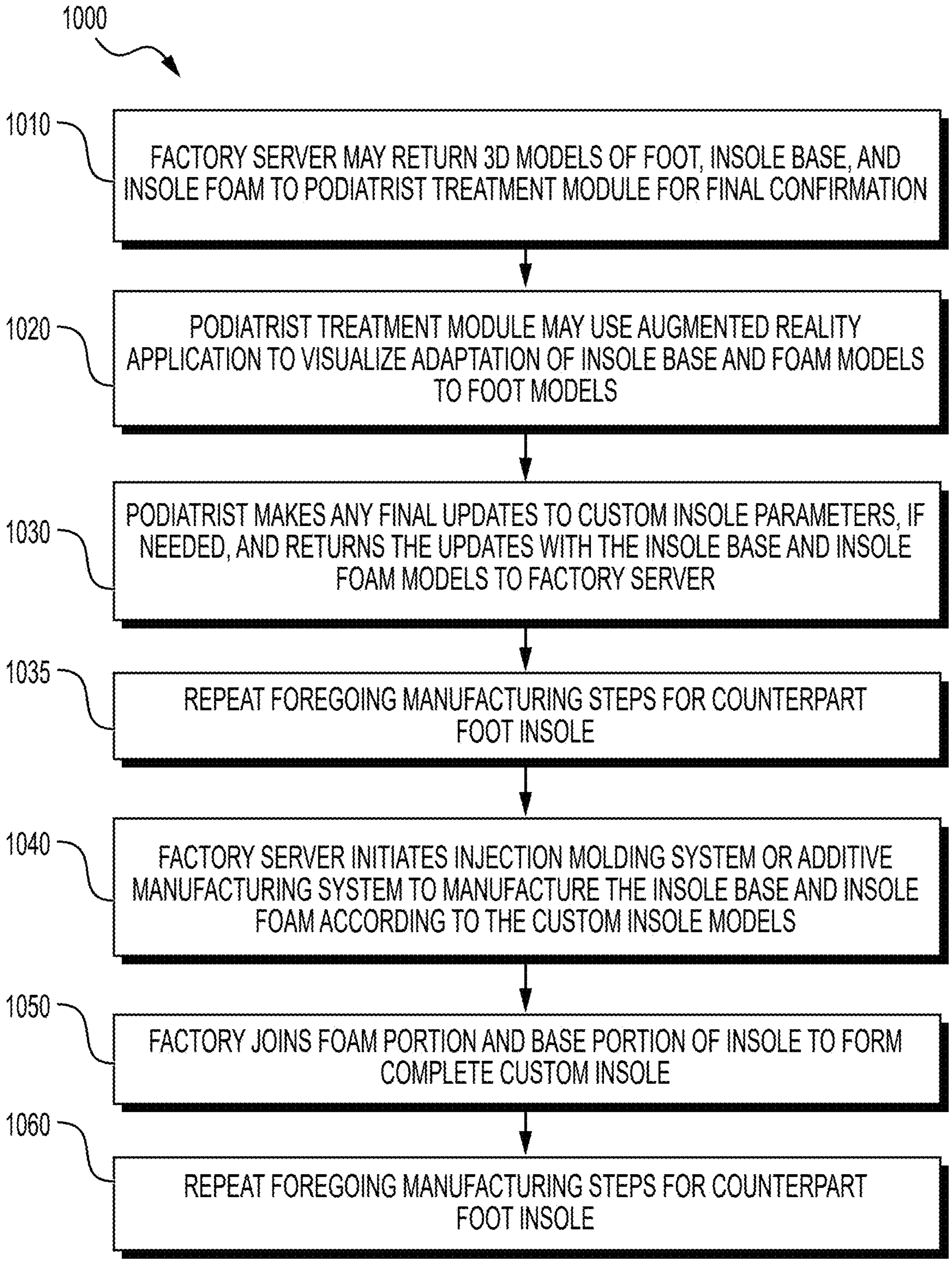
FIG. 10 illustrates an example process for manufacturing a custom insole.

FIG. 10 illustrates example process 1000 for making final corrections to the model of the custom insole and for manufacturing the custom insole. In operation 1010, the factory server 142 returns the three-dimensional models of the foot, the custom insole base, and the custom insole foam to the podiatrist treatment module 112 of the computing system 101 for final confirmation of the three-dimensional models. In operation 1020, the podiatrist treatment module 112 accesses the augmented reality application 114 to evaluate how the custom insole fits and how it will acclimate to the patient's foot. The augmented reality application 114 can overlay the three-dimensional model of the patient's foot onto the three-dimensional model of the custom insole for the evaluation. The augmented reality application 114 can allow the podiatrist to observe the three-dimensional models of the foot and the custom insole from different perspectives. The augmented reality application 114 also can simulate applying the patient's weight and biomechanical movements to the custom insole to evaluate the performance of the custom insole. In operation 1030, if appropriate based upon the evaluation with the augmented reality application 114, the podiatrist can use the podiatrist treatment module 112 to update the custom insole parameters. The podiatrist treatment module 112 can associate the updated custom insole parameters with the patient's order and return the updated custom insole parameters with the models of the foot and the custom insole to the factory system 140 for completing the manufacture of the custom insole.

In operation 1035, factory 3D modeler 144 may apply the updated custom insole parameters, if any, to the models of the custom insole base and the custom insole foam. In operation 1040, the factory server 142 can initiate the manufacture of the custom insole base and foam using the final models of the custom insole base and the custom insole foam and one of the manufacturing systems, such as the injection/casting molding system 146 or the additive manufacturing system 148. In operation 1050, the manufacturing systems can join the manufactured custom insole base and custom insole foam to complete the custom insole. As indicated in operation 1060, the processes described in FIGS. 2-7 can be repeated to produce another custom insole for the patient's other foot based on information and models for the other foot. In an aspect, the additive manufacturing system 148 may be used to produce a mold that subsequently is used by the injection/casting molding system 146 to produce the custom foam and/or the custom insole base. In another aspect, both the injection/casting molding system 146 and the additive manufacturing system 148, individually or in combination, may be used to produce a combined insole base and insole as a single structure. Moreover, in either of these two aspects, the custom insole or the combined custom base/insole may be produced with varying density in three dimensions and using varying chemical compositions in two or three dimensions such that the manufactured product has a non-homogeneous material profile.

In a specific implementation, the factory system 140 of FIG. 1 may employ either or both a Stereolithography apparatus and a Selective Laser Sintering apparatus for manufacturing custom insoles. Stereolithography (SLA) is an additive manufacturing process in which a three dimensional object is formed by selectively solidifying a liquid photopolymer resin using controlled exposure to electromagnetic radiation, typically ultraviolet light. The process operates on a layer wise basis. A build platform is positioned relative to a resin vat, and a light source selectively exposes regions of the resin according to cross sectional data derived from a digital model. Exposed regions undergo photopolymerization and solidify to form a layer of the object. The platform is then repositioned to allow formation of a subsequent layer, which bonds to the previously solidified layer. Repetition of this sequence produces a three dimensional article corresponding to the digital model. SLA is characterized by high dimensional accuracy, smooth surface finish, and the ability to form fine geometric features. Materials used in SLA are typically thermosetting photopolymer resins formulated to cure upon light exposure. Selective Laser Sintering (SLS) is an additive manufacturing process in which a three dimensional object is formed by selectively fusing particulate material using a focused energy source, typically a laser. The process operates on a layer wise basis within a powder bed. A thin layer of powder material is deposited over a build surface, and the laser selectively scans regions corresponding to a cross section of the digital model. The scanned regions absorb energy and fuse by sintering or partial melting, while unscanned powder remains unfused. After completion of a layer, a new layer of powder is applied, and the process is repeated to build the object layer by layer. Unfused powder surrounding the fused regions provides mechanical support during fabrication and may be removed after completion. SLS is commonly used with thermoplastic powders such as nylon and polypropylene and is well suited for producing mechanically robust parts with complex geometries, including parts exhibiting controlled flexibility and internal structures. Other manufacturing processes and techniques may be used by the factory system.

Figure 10A:
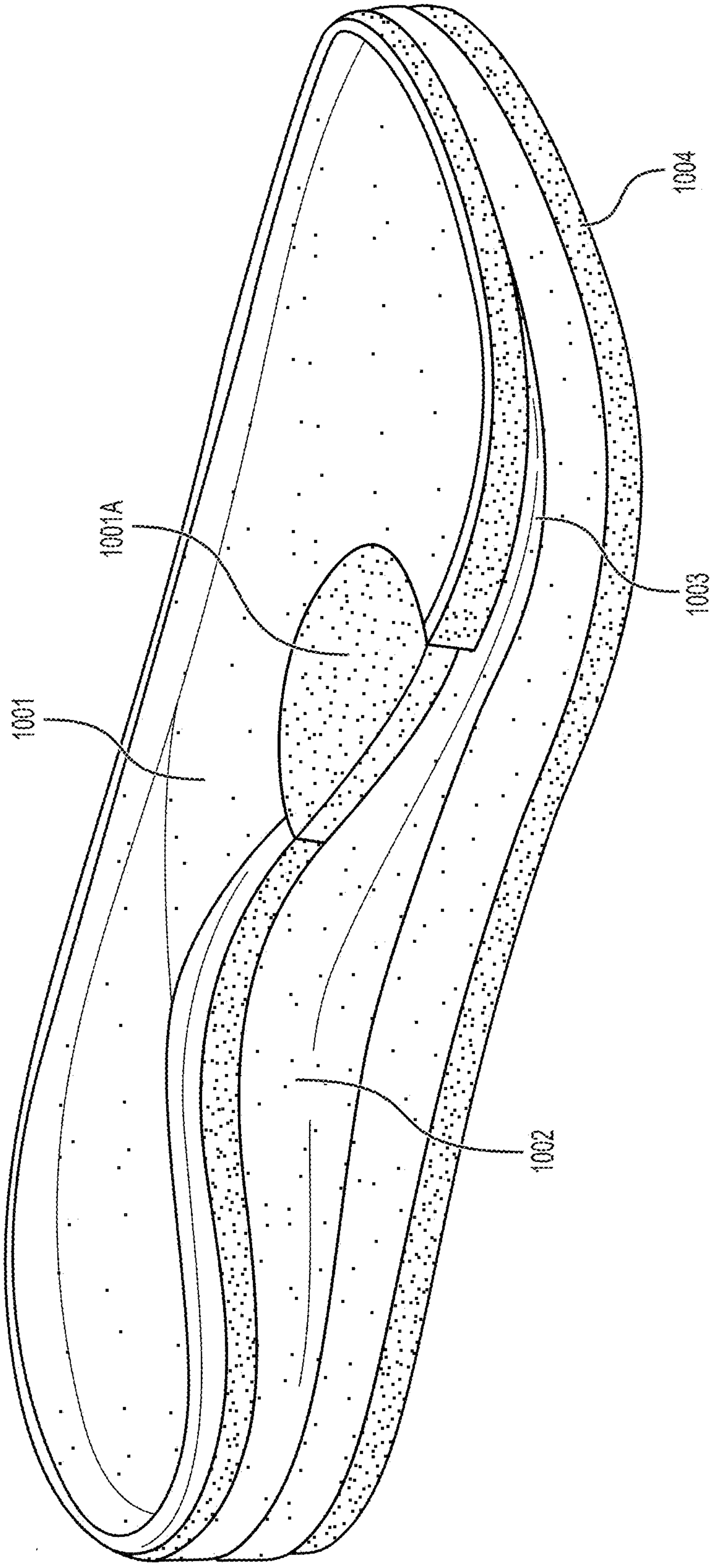
FIG. 10A illustrates a 3-D perspective view of a custom insole having a layered construction.

FIG. 10A illustrates an example insole produced the factory system 140 of FIG. 1 by either of the processes of FIG. 9 or 10. An insole having a custom geometry such as that of the example insole may be manufactured using digital data generated from the processed foot scan data using an additive manufacturing process in which the insole is formed layer by layer from a digital representation of the insole geometry. The digital representation is derived from the three-dimensional foot model and associated design parameters determined by the computing system 101 and defines successive cross-sectional layers corresponding to the intended insole shape. During fabrication, each layer is formed in a predetermined spatial relationship to previously formed layers so as to produce a unitary insole body that conforms to the prescribed geometry. Additive manufacturing processes suitable for such fabrication include photopolymer-based processes in which layers are selectively cured from a liquid material and powder-based processes in which layers are selectively fused from a particulate material, each under control of the same digital insole representation. In implementations employing a photopolymer-based additive manufacturing process, the insole geometry is produced by selectively solidifying regions of a liquid material in accordance with the digital insole representation. Each solidified layer corresponds to a cross-sectional portion of the insole and is formed in registration with adjacent layers to define the overall insole structure. The resulting insole exhibits material continuity across layers and preserves dimensional characteristics defined by the digital model, including thickness variation, contour, and localized support regions derived from the foot scan data. In implementations employing a powder-based additive manufacturing process, the insole geometry is produced by selectively fusing regions of a powder material according to the digital insole representation. Successive layers of powder are fused in a controlled sequence to form a consolidated insole structure corresponding to the three-dimensional insole model. Unfused material may provide temporary support during fabrication and may be removed after completion of the insole body. The fabricated insole maintains the geometric features specified by the digital model and integrates structural regions associated with support, cushioning, or load distribution as defined by the system.

FIG. 10A illustrates a 3-D perspective view of a custom insole 1000A having a layered construction. The custom insole 1000A includes an upper foam portion 1001 configured to interface with a foot of a patient and a lower base portion 1003 configured to interface with footwear or a ground supporting surface. The foam portion 1001 and the base portion 1003 extend along a longitudinal axis of the insole and are shaped according to a patient specific digital insole model derived from foot scan data and custom insole parameters. The illustrated construction represents one example of a base plus foam product type in which multiple structural and material regions cooperate to provide support, cushioning, and corrective function. The foam portion 1001 may include one or more localized zones 1001A having material properties that differ from surrounding regions of the foam portion. The localized zone 1001A may exhibit a different density, stiffness, thickness, or compliance than adjacent portions of the foam portion 1001. Such zones may be positioned in correspondence with anatomical regions of the foot identified from the foot scan data, including regions associated with pressure relief or corrective support. The localized zone 1001A may be formed as an integral part of the foam portion 1001 and need not be a separately inserted component. The custom insole 1000A may further include an intermediate support portion 1002 positioned between the foam portion 1001 and the base portion 1003. The intermediate support portion 1002 may provide a transition in material response between the foam portion and the base portion and may contribute to load distribution, energy return, or corrective force application. In some implementations, the intermediate support portion 1002 forms part of the foam portion 1001. In other implementations, the intermediate support portion 1002 forms part of the base portion 1003 or is formed as a distinct layer. The base portion 1003 may be fabricated from a resin material or a thermoplastic material and provides structural integrity to the custom insole 1000A. The base portion 1003 may extend partially or fully along the length of the foot and may include a ground facing surface region 1004 configured to contact footwear or a supporting surface. The base portion 1003 may be rigid or flexible depending on the selected material and the patient specific design parameters.

In one fabrication approach, the foam portion 1001 is produced by injecting a foam material into a mold having a cavity personalized for the patient. The mold cavity geometry is derived from the digital insole model and defines the outer shape of the foam portion 1001 and any localized zones 1001A. The mold may be a one part mold or a two part mold. The mold itself may be fabricated using additive manufacturing, including stereolithography, to achieve a smooth cavity surface and accurate reproduction of patient specific geometry. After foam formation, the foam portion 1001 may be removed from the mold and joined to the base portion 1003.

In another fabrication approach, the base portion 1003 is produced using additive manufacturing. The base portion 1003 may be fabricated using stereolithography or selective laser sintering based on the selected material and flexibility requirements. The digital insole model defines the geometry of the base portion 1003, including thickness variation and contour. The fabricated base portion 1003 may then be combined with the foam portion 1001 to form the custom insole 1000A. In yet another fabrication approach, both the foam portion 1001 and the base portion 1003 are produced using additive manufacturing. In such implementations, the foam portion 1001 may be produced as a compliant additively manufactured structure having effective density variation achieved through geometry or internal structure, and the base portion 1003 may be produced as a more rigid additively manufactured structure. The foam portion 1001 and the base portion 1003 may be fabricated as separate components and subsequently joined, or may be fabricated as a unitary structure in a single build process when supported by the selected additive manufacturing system.

In still another fabrication approach, the digital insole model is used to fabricate tooling used during manufacture of the custom insole 1000A. Such tooling may include molds defining cavities for foam formation, inserts defining localized zones within a foam portion, fixtures used to align and bond the foam portion 1001 to the base portion 1003, or cutting guides used to trim foam sheets to patient specific contours. The tooling may be fabricated using additive manufacturing to enable rapid production of patient specific tooling corresponding to individual insole designs.

In all fabrication approaches, the geometry of the foam portion 1001, the localized zone 1001A, the intermediate support portion 1002, and the base portion 1003 is derived from the same digital insole model generated by the computing system. The use of additive manufacturing, molding, or combinations thereof enables production of fully customized insoles tailored to individual patients while maintaining consistency between digital design data and the physical insole produced.

FIG. 11 illustrates an example insole template 1100 with numbered zones of adjustment for customization.

Figure 12A:
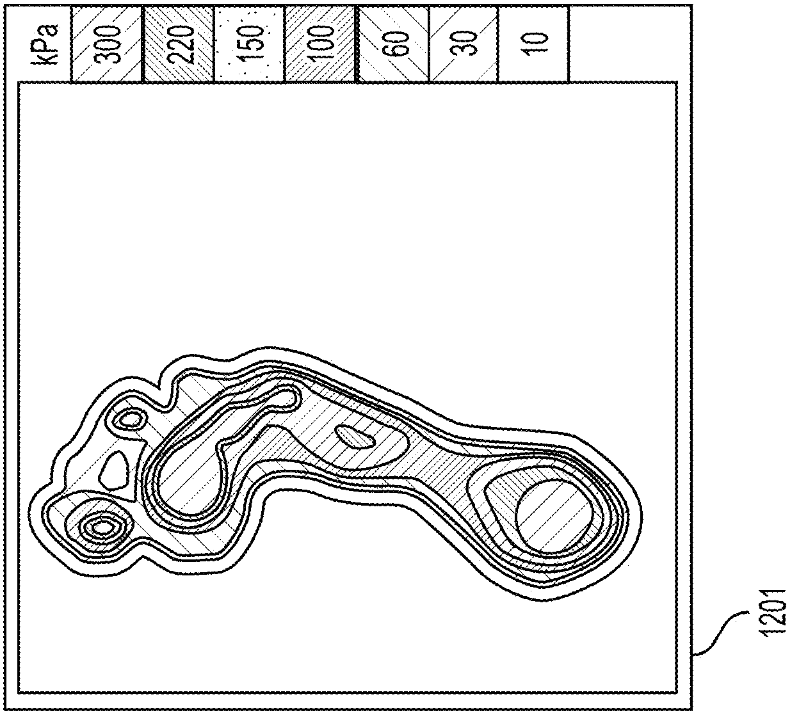
FIG. 12A is an example 2D pressure scan of a patient's foot and FIG. 12B is a corresponding 3D rendition of the 2D pressure scan.
Figure 12B:
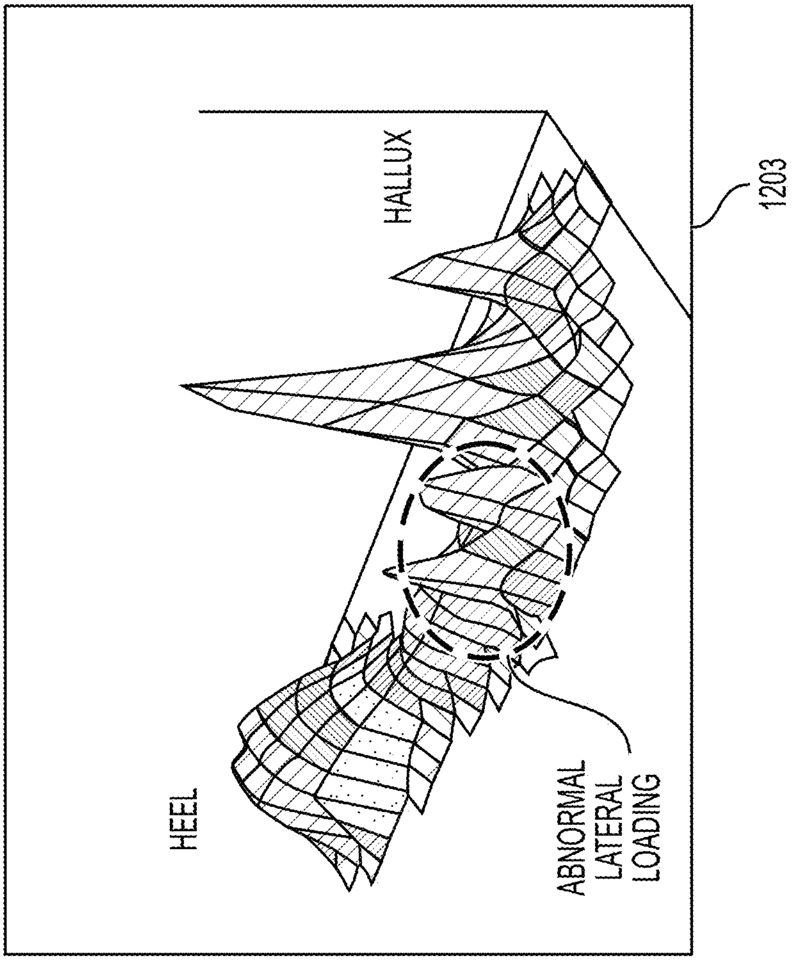

FIG. 12A is an example 2D pressure scan 1201, and FIG. 12B is a corresponding 3D-rendition 1203, derived from the pressure scan 1201, of a patient's foot.

Figure 13:
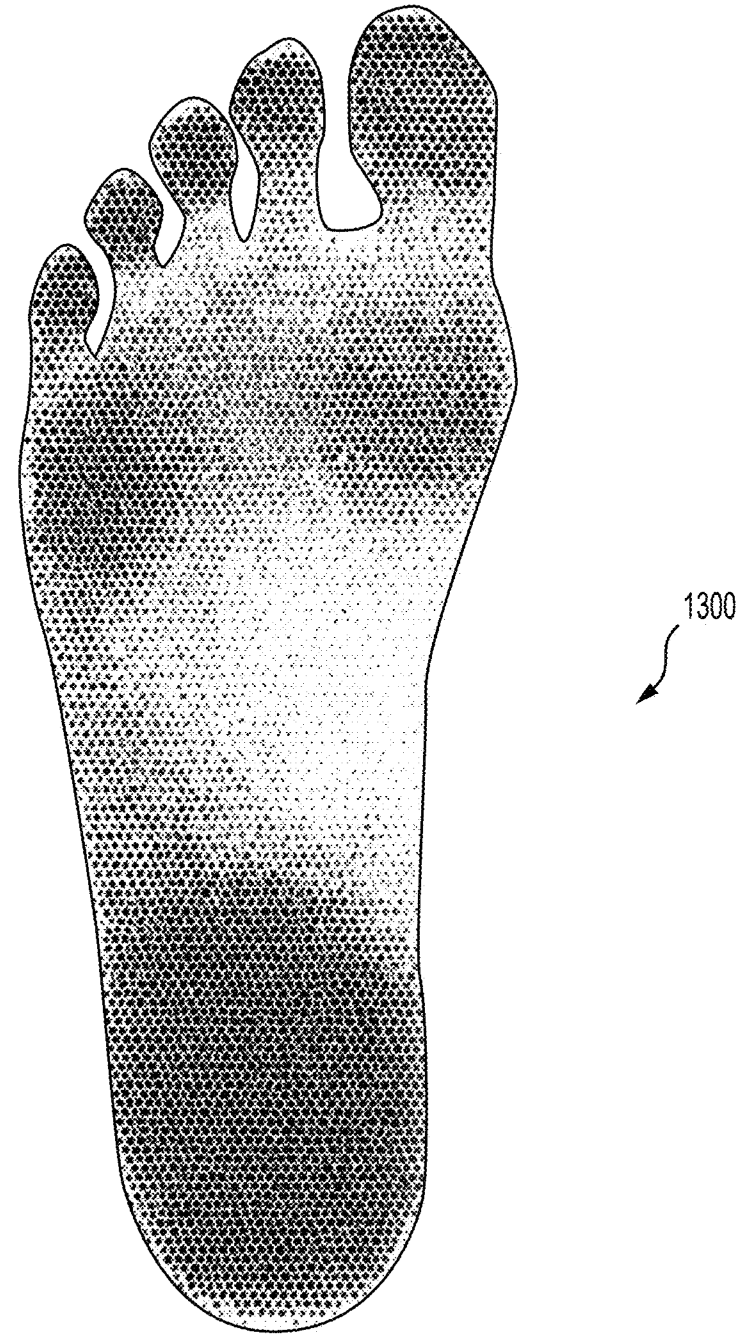
FIG. 13 is an example 3D point cloud representing a patient's foot.

FIG. 13 is an example 3D point cloud 1300 representing a patient's foot.

Figure 14:
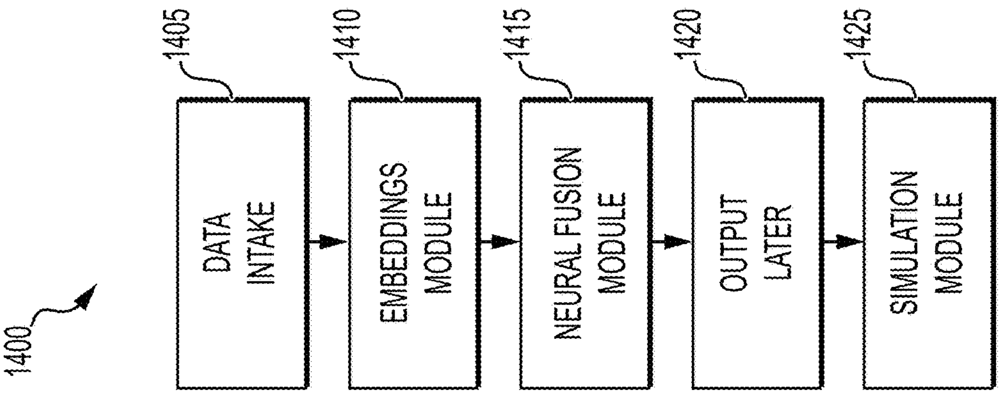
FIG. 14 is a block diagram of an example, alternative multi-modal artificial intelligence system.

FIG. 14 is a block diagram of an example, alternative, multi-modal artificial intelligence system, and related components, that combines 2D or 3D image data, pressure data, and text data, and other data to generate insole designs, design parameters, and machine code to produce a custom insole. In FIG. 14, multi-modal artificial intelligence system 1400 ingests, through data intake 1405, heterogeneous patient data, including two-dimensional and three-dimensional image data, plantar pressure data, shoe geometry data, gait analytics, point cloud data, and text or numerical clinical data such as survey responses, clinician notes, or external knowledge articles. Embeddings module 1410 converts each data modality into a standardized feature representation, such as a fixed-dimension embedding. Structured data, including numerical survey responses or shoe dimensions, may be normalized directly. Unstructured text, including free-text survey responses or external literature, may be processed by a natural language processor to generate semantic embeddings. Image data and three-dimensional reconstructions may be encoded by convolutional neural networks (CNNs) or vision transformers to produce geometry embeddings. Plantar pressure sequences and gait time-series may be encoded by temporal convolutional or recurrent neural networks, and three-dimensional point clouds may be encoded by point-based neural networks or implicit surface encoders. Modality-specific embeddings. including survey-derived vectors (SLM output), image-derived geometry embeddings (CNN output), and plantar pressure embeddings, are provided to a neural fusion module 1415. In an aspect, the neural fusion module 1415 includes a transformer or multilayer perceptron (MLP) configured with attention layers that automatically assign feature weights to the modalities during training. In this way, the neural fusion module 1415 learns the relative importance of geometry, pressure, and survey features in predicting insole design parameters, without requiring explicit construction of similarity matrices M, Q, or P. An output layer 1420 of the neural fusion module 1415 directly predicts per-zone design parameters, including height or relief adjustments, posting angles, heel cup depth, and local hardness values. These parameter values are subsequently validated by a simulation module 1425 that validates the predicted design by estimating plantar pressure distribution under load using a surrogate model or finite element analysis, and iteratively refines the design until safety and performance criteria are satisfied. Resulting per-zone design parameters are used to generate a parametric computer-aided design (CAD) model of the insole, which is processed by a slicer engine to produce machine instructions such as G-code. A multi-material additive manufacturing device or CNC milling system fabricates the insole.

Figure 15:
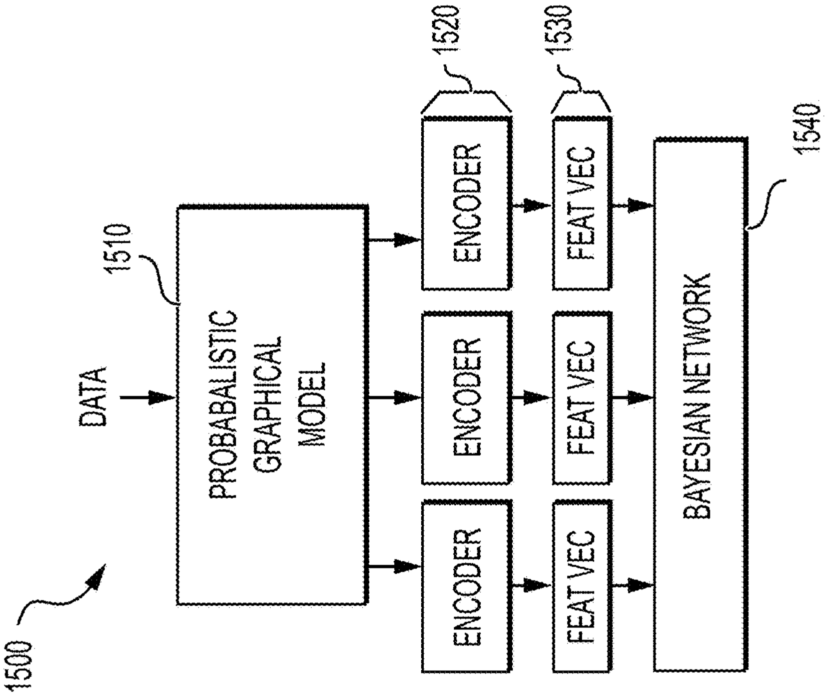
FIG. 15 is a block diagram of another alternative multi-modal artificial intelligence system.

FIG. 15 illustrates yet another alternative multi-modal artificial intelligence system that may be implemented by the computing system 101. In FIG. 15, probabilistic graphical model fusion system 1500 applies a probabilistic graphical model (PGM) 1510 to fuse patient data from heterogeneous modalities. Each of several data encoders 1520 outputs feature vectors 1530, and the feature vectors 1530 are modeled as nodes in a Bayesian network 1540. Conditional probability distributions are defined to represent clinical relationships, such as the probability of overpronation given image-derived arch curvature, plantar pressure distribution, and survey responses regarding gait discomfort. The Bayesian network 1540 combines these distributions according to Bayes' theorem to compute a joint posterior distribution over insole design parameters. From the posterior, the system 1500 selects the most probable design configuration or computes expected values for zone-specific adjustments. The resulting per-zone parameters, including posting angles, arch height adjustments, and material hardness targets, are validated and passed to the CAD/CAM module for manufacturing. The system 1500 uses a statistical inference framework to produce insole design outputs.

Figure 16:
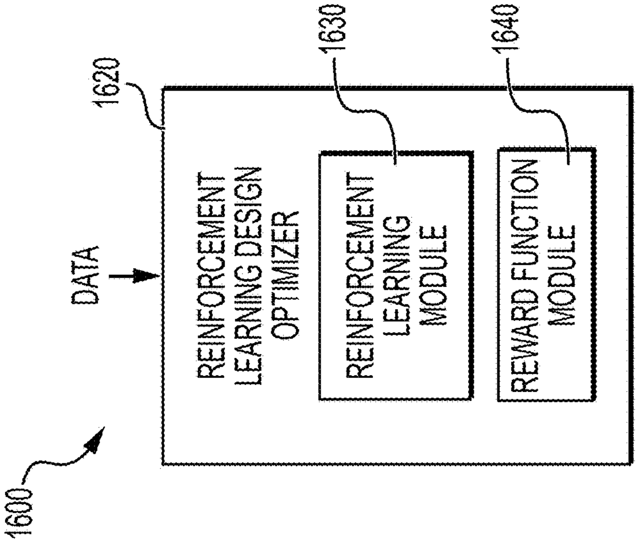
FIG. 16 is a block diagram of another alternative multi-modal artificial intelligence system.

FIG. 16 illustrates still another alternative multi-modal artificial intelligence system that may be implemented by the computing system 101. In FIG. 16, multi-modal artificial intelligence system 1600 employs a reinforcement learning design optimizer 1620 that optimizes insole design parameters by applying a reinforcement learning module 1630 to receive as inputs, embedding vectors generated by the text, image, pressure, and point cloud encoders, and proposes candidate insole designs. A reward function 1640 evaluates each candidate design according to predicted plantar pressure reduction, comfort estimates, and adherence to podiatrist-defined safety constraints. Using iterative simulation and reward feedback, the RL agent adjusts its policy parameters until it converges on an insole design that maximizes clinical benefit. The final design parameters are output directly to the CAD/CAM generator for fabrication. This reinforcement learning-based multi-modal artificial intelligence system 1600 bypasses explicit similarity or weighting matrices and instead uses iterative trial-and-error optimization guided by biomechanical reward signals.

Figure 17A:
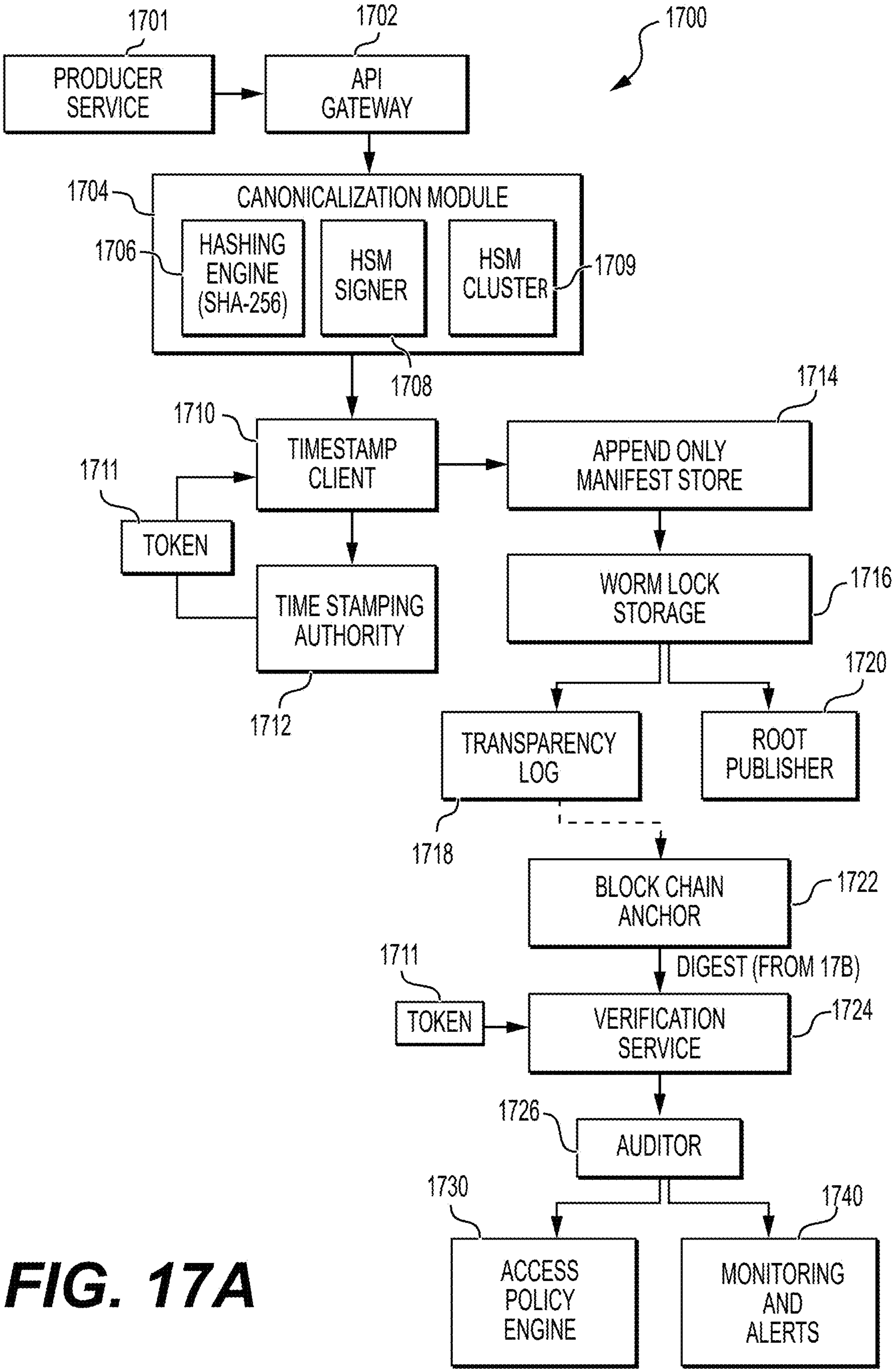
FIG. 17A is a diagram of an example file and data management architecture showing repositories linked for provenance and traceability.

FIG. 17A illustrates example immutability system 1700, which includes a producer service 1701 that assembles manifest content and submits a publication request through an authenticated API gateway 1702. The system 1700 applies a deterministic canonicalization module 1704 to serialize the manifest into a byte sequence with fixed ordering and stable whitespace rules. A hashing engine 1706 computes a collision-resistant content digest over the canonical bytes, for example a SHA-256 digest, and forwards the digest to an HSM signer 1708. The HSM signer 1708 receives signing requests only from authorized clients and generates a digital signature over the digest using a private key stored and protected within a key-management and HSM cluster 1709. A timestamp client 1710 submits the digest to a time stamping authority 1712 and receives a standardized time-stamp token 1711 that binds the digest to a trusted time of existence.

The system 1700 persists the manifest (see the example manifest 1750 of FIG. 17B) and the associated signature and time-stamp token in an append-only manifest store 1714 that enforces write-once semantics. A storage subsystem 1716 provides write once read many capability or object-lock retention so that neither the manifest content nor the stored signature or time-stamp token can be overwritten during the retention period. The system 1700 records the digest in a transparency log 1718 as a leaf of a Merkle tree and publishes the evolving root through a root publisher 1720 to create a verifiable, append-only audit feed. An optional blockchain anchor 1722 accepts the digest or Merkle root and records the value on a consensus network to provide independent anchoring. A verification service 1724 retrieves the manifest, recomputes the digest, validates the signature with the corresponding public key, verifies the time-stamp token, and proves inclusion within the transparency log. An auditor console 1726 exposes verification status and supporting proofs for inspection. An access control policy engine 1730 governs authenticated use of each module. A monitoring and alerts component 1740 tracks health and policy events. The API gateway 1702, canonicalization module 1704, hashing engine 1706, timestamp client 1710, transparency log 1718, root publisher 1720, verification service 1724, auditor console 1726, access control policy engine 1730, and monitoring and alerts component 1740 execute as software. The HSM signer 1708 and the key-management and HSM cluster 1709 provide hardware security modules with tamper-resistance. The storage subsystem 1716 includes hardware storage devices or cloud object storage configured for object-lock retention. The time stamping authority 1712 and the optional blockchain anchor 1722 operate as network services and may execute on dedicated hardware. The various modules of system 1700 interact in a linear and verifiable publication flow that prevents undetected alteration. The producer service 1701 emits manifest content to the API gateway 1702, which authorizes the request and dispatches the content to the canonicalization module 1704. The hashing engine 1706 computes the digest over the canonical bytes. The HSM signer 1708 signs the digest while the key-management and HSM cluster 1709 retains control of private keys and enforces key-use policy. The timestamp client 1710 obtains a time-stamp token for the digest from the time stamping authority 1712. The append-only manifest store 1714 persists the manifest, the signature, and the time-stamp token on the storage subsystem 1716 with write-once guarantees. The transparency log 1718 records the digest and enables public verification of inclusion through the root publisher 1720. The optional blockchain anchor 1722 records the digest or the published root on an external consensus network. The verification service 1724 and the auditor console 1726 perform independent verification by recomputing the digest, validating the signature and the time-stamp token, and proving inclusion within the transparency log.

Thus, the manifest 1750 (see FIG. 17B) attains immutability through cryptographic binding of content, canonical serialization, and write-once publication. The system 1700 serializes the manifest 1750 into a canonical byte sequence so that identical fields always produce the same ordering and whitespace. The system 1700 computes a content digest over the canonical bytes using a collision-resistant hash function such as SHA-256 and records that digest as the manifest's identity. A signing service running inside a hardware security module signs the digest with a private key whose export remains disabled and whose use policy permits only signing of new manifests. The signature and the corresponding public-key identifier appear in the manifest 1750, which enables any verifier to recompute the digest from the canonical bytes and validate the signature. Any post-hoc alteration of any field changes the digest and causes signature verification to fail, which exposes tampering. The system 1700 also obtains a trusted timestamp for the digest from a time-stamping authority and records the token with the manifest, which establishes a verifiable time of existence and prevents undetected backdating. In addition, storage and governance controls reinforce immutability after publication. The repository accepts manifests only as append operations and rejects overwrite requests, which produces a write-once, append-only history. The storage layer places published manifests on media that enforce write-once semantics or enable immutable object locking for a retention period aligned with quality-system requirements. A transparency log records each digest in a Merkle tree and publishes the evolving root, which allows independent auditors to prove inclusion of any manifest and to detect omission or replacement. In an optional example that uses on-chain anchoring, the system 1700 submits the digest to a smart contract so that an external consensus network preserves an immutable reference independent of the primary repository. Any revision to manifest content creates a new manifest with a new digest and a new signature while preserving the earlier manifest in the append-only history. This combination of canonical encoding, signed digests, trusted time, append-only storage, and independent anchoring prevents undetected alteration and provides reliable proof that the manifest content remains identical to the version created at publication. Thus, the system 1700 produces a durable, independently verifiable chain of evidence that the published manifest remains identical to the content created at publication.

FIG. 17B illustrates an example of a small, signed, machine-readable manifest 1750 that may be stored alongside each artifact. The manifest 1750 declares a unique "manifest_id" and a "timestamp" encoded in UTC ISO-8601, and records a "producer" block that identifies the generating service and the execution node, thereby anchoring provenance to a specific software build and physical site. This arrangement defines a compact envelope that binds every downstream file or dataset to a verifiable creation event and a responsible runtime context.

FIG. 17B further illustrates lineage, configuration, integrity, authenticity, and policy controls expressed as first-class fields. The "inputs" array lists the exact source artifacts by repository and identifier, and the "outputs" array lists the produced artifact identifiers, which together establish a directed acyclic build history suitable for audit and reproduction. The "parameters" object captures the model designation and a configuration hash, which enables deterministic re-execution under the same algorithm and settings. The "checksums" object supplies content hashes for produced files, which supports end-to-end integrity verification independent of storage location. The "signatures" array contains a hardware-secured key identifier and a detached signature, which enables authenticity validation and non-repudiation for the manifest and the named artifacts. The "policy" object declares a retention period and a reference to protected information storage, which provides lifecycle governance and controlled linkage to regulated personal data. Thus, in the context of custom insole design and manufacturing, FIG. 17B illustrates a manifest 1750 that attaches to calibration inputs, embeddings, intermediate meshes, and final meshes generated for an orthosis case. The "inputs" entries can reference archival calibration data and the working embedding for a specific case, while the "outputs" entry can reference a generated insole mesh, which together document the precise derivation path from clinical capture to manufacturable geometry. The "parameters" fields record the model version and configuration used during mesh generation, which enables reproducible toolpath planning and consistent material assignment when reprocessing a case or validating a change. The "checksums" entry enables verification that a mesh delivered to computer-aided manufacturing matches the mesh reviewed during sign-off. The "signatures" entry enables quality management personnel to validate manifest authenticity before release. The "policy" entry enforces retention periods aligned with clinical and manufacturing obligations and provides a vault reference for any protected personal information that must remain segregated from production stores. The manifest 1750 therefore operates as an immutable, verifiable bill of materials and processing record that ties each produced orthosis to its inputs, parameters, and integrity checks, and supports traceability, audit, and controlled reuse across clinics and fabrication sites.

The processing operations described in connection with the foregoing systems and methods can be performed by computing systems such as a personal computer, a desktop computer, a computer server, or cloud computing systems. Certain operations can be performed by a combination of computing systems. The operations disclosed herein can be performed based on machine instructions, stored in non-transitory computer-readable media, that are executed by one of the foregoing computing systems or processors.

The computing systems used in the foregoing examples can include typical components such as one or more processors, memories, input/output devices, and storage devices. The components of the computing systems can be interconnected, for example, by a system bus or by communication links. The components of the previously described computing systems are not exhaustive.

The one or more processors can be one or more hardware processors and can execute computer-readable instructions, such as instructions stored in a memory. The processor can be an integrated circuit, a central processing unit, a graphics processing unit, a multi-core processing chip, an SoC, a multi-chip module including multiple multi-core processing chips, or other hardware processor in one or more example examples. The hardware processor is known by other names, including but not limited to a computer processor, a microprocessor, and a multi-core processor.

A memory can store information including computer-readable instructions and data. The memory can be cache memory, a main memory, and/or any other suitable type of memory. The memory is a non-transitory computer-readable medium. In some cases, the memory can be a volatile memory device, while in other cases the memory can be a non-volatile memory device.

The storage device can be a non-transitory computer-readable medium that provides large capacity storage for a computing system. The storage device can be a disk drive, a flash drive, a solid-state device, or some other type of storage device. In some cases, the storage device can be a database that is remote from the computing system. The storage device can store operating system data, file data, database data, algorithms, and software modules, as examples.

For any figure shown and described herein, one or more of the components may be omitted, added, repeated, and/or substituted. Accordingly, examples shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate examples, certain operations of the methods may be performed in a different order, may be performed in parallel, or may be omitted. Moreover, in alternate examples additional steps may be added to the example methods described herein. Accordingly, the example methods provided herein should be viewed as illustrative and not limiting of the disclosure.

In the example examples described herein, numerous specific details are set forth in order to provide a more thorough understanding. However, it will be apparent to one of ordinary skill in the art that the examples may be practiced without these specific details. In other instances, well-known features have not been described in detail to avoid unnecessarily complicating the description.

Trademark Acknowledgments: Microsoft, Windows, and Azure are registered trademarks of Microsoft Corporation. Amazon Web Services (AWS), Elastic Compute Cloud (EC2), Simple Storage Service (S3), OpenSearch, and Lambda are trademarks of Amazon Technologies, Inc. TensorFlow is a trademark of Google LLC. PyTorch is a registered trademark of the Linux Foundation. CUDA is a trademark of NVIDIA Corporation. AutoCAD is a registered trademark of Autodesk, Inc. CorelDRAW is a trademark of Corel Corporation. Adobe Illustrator is a registered trademark of Adobe Inc. Onshape is a registered trademark of PTC Inc. DraftSight is a trademark of Dassault Systèmes. Cura is a trademark of UltiMaker B.V. PrusaSlicer is a trademark of Prusa Research a.s. PolyJet and FDM are trademarks of Stratasys Ltd. MultiJet Fusion is a trademark of HP Inc. DLP is a trademark of Texas Instruments. Procreate is a trademark of Savage Interactive Pty Ltd. Clip Studio Paint is a trademark of Celsys, Inc. All other product names, service names, and company names mentioned herein are the property of their respective owners. The use of such names in this disclosure is for identification and illustrative purposes only, and no association, sponsorship, or endorsement is intended or implied.

The terms "a," "an," and "the" are intended to include plural alternatives, e.g., at least one. The terms "including", "with", and "having", as used herein, are defined as comprising (i.e., open language), unless specified otherwise.

Although examples are described with specific details, it should be appreciated by those skilled in the art that various modifications are well within the scope of this disclosure. Those skilled in the art will appreciate that the examples described herein are not limited to any specifically discussed application and that the examples described herein are illustrative and not restrictive. From the descriptions of the examples, equivalents of the elements shown therein will suggest themselves to those skilled in the art, and ways of constructing other examples using the present disclosure will suggest themselves to practitioners of the art. Therefore, the scope of the examples is not limited herein.

What is claimed is:

1. A computer-implemented method for to support manufacturing a custom shoe insole, comprising:

a processor receiving foot images and survey responses of a patient;

generating, using a convolutional neural network, a three-dimensional model of a patient's foot from the foot images, wherein generating the three-dimensional model comprises correcting lens distortion and segmenting anatomical landmarks using a convolutional neural network, wherein a multimodal vector representation fuses geometry embeddings, survey response embeddings, and insole template embeddings into a shared latent space, wherein manufacturing comprises producing an insole matched to the custom insole parameters;

embedding the three-dimensional model and the survey responses into a multimodal vector representation;

retrieving, from a vector database, insole template embeddings; generating, using a generative artificial intelligence model, similarity scores between the multimodal vector representation and the insole template embeddings;

selecting an insole template based on the similarity scores; adjusting the insole template within predefined customization zones using podiatrist inputs to form custom insole parameters;

generating, with a factory three-dimensional modeler, a computer-aided design (CAD) model of a custom insole from the custom insole parameters and the three-dimensional model of the foot; and controlling a factory system to manufacture the custom insole in accordance with the CAD model, wherein generating the three-dimensional model includes correcting lens distortion and segmenting anatomical landmarks using a convolutional neural network, wherein the multimodal vector representation fuses geometry embeddings, survey response embeddings, and insole template embeddings into a shared latent space, wherein manufacturing comprises producing an insole matched to the custom insole parameters.

2. The computer-implemented method of claim 1, wherein the factory system comprises an additive manufacturing system, comprising.

3. The computer-implemented method of claim 2, further comprising:

the processor executing a recommendation system to extract foot features from the foot images;

converting the foot features to a numeric values; and improving accuracy of the similarity scores generated by a generative artificial intelligence algorithm by inputting the numeric values into the generative artificial intelligence algorithm.

4. The computer-implemented method of claim 3, further comprising:

converting, by executing the generative artificial intelligence algorithm, the patient responses and insole template descriptions to vectors; and generating, by executing the generative artificial intelligence algorithm, the vectors into a matrix of the similarity scores.

5. The computer-implemented method of claim 1, wherein a podiatrist interface module receives the three-dimensional model of the foot, a recommended insole template, and the patient responses, the computer-implemented method further comprising:

transmitting the three-dimensional model of the custom insole to the podiatrist interface module;

controlling the podiatrist interface module to render the three-dimensional model of the foot on the three-dimensional model of the custom insole in an augmented reality application to assess a fit; and updating, the custom insole parameters based upon the fit to generate updated custom insole parameters.

6. The computer-implemented method of claim 5, further comprising the processor modifying, using the factory three-dimensional modeler, the three-dimensional model of the custom insole using the updated custom insole parameters.

7. A system for supporting manufacture of custom insoles for shoes, comprising:

a processor system, comprising:

a processor, a memory, and a data store comprising:

a vector database configured to store embeddings of insole templates and patient data; and a non-transitory computer-readable storage medium having encoded thereon, programs of machine instructions executable by the processor, wherein the processor executes the programs of machine instructions to:

transfer a patient application to a computing device of a patient, execute a three-dimensional modeler to generate a three-dimensional model of a patient's foot from received patient foot images, wherein generate the three-dimensional model comprises correcting lens distortion and segmenting anatomical landmarks using a convolutional neural network, wherein a multimodal vector representation fuses geometry embeddings, survey response embeddings, and insole template embeddings into a shared latent space, wherein manufacturing comprises producing an insole matched to the custom insole parameters, control a survey module to:

present survey questions to a patient via a graphical user interface; and receive patient responses, execute a generative artificial intelligence model to compute similarity scores between multimodal vector representations of the patient data and the insole template embeddings, execute a recommendation engine to select an insole template based on the similarity scores, and execute a podiatrist treatment module to display the selected insole template, receive podiatrist inputs within predefined customization zones, and generate custom insole parameters; and a factory system, in communication with the processor, comprising:

a factory processor, a factory data store comprising a non-transitory computer-readable storage medium having encoded thereon programs of machine instructions executable by the factory processor, wherein the programs of machine instructions comprise a factory three-dimensional modeler executable by a processor and configured to generate a computer-aided design (CAD) model of a custom insole from the custom insole parameters and the three-dimensional model of the patient's foot, and an additive manufacturing system configured to produce the custom insole in accordance with the CAD model.

8. The system of claim 7, wherein the images of the foot comprise one or more of still images and video images of the foot.

9. The system of claim 7, wherein the recommendation engine selects the recommended insole template based upon the similarity scores and relevance weightings applied to the patient responses.

10. The system of claim 7, further comprising the processor:

extracting, by the recommendation engine, a features from the images of the foot;

converting, by the recommendation engine, the foot features to corresponding numeric values; and improving accuracy of the similarity scores generated by a generative artificial intelligence algorithm by inputting the corresponding numeric values into the generative artificial intelligence algorithm.

11. The system of claim 10, further comprising the processor:

converting, by executing the generative artificial intelligence algorithm, the patient responses and insole template descriptions to vectors; and generating, by executing the generative artificial intelligence algorithm, from the vectors, a matrix of the similarity scores.

12. The system of claim 7, wherein the podiatrist interface module receives the three-dimensional model of the foot, the recommended insole template, and the patient responses.

13. The system of claim 12, wherein adjusted dimensions of the recommended insole template are selected from among adjustment zones located on areas of the recommended insole template.

14. The system of claim 12, wherein the three-dimensional model of the custom insole comprises a custom insole base and a custom insole foam.

15. The system of claim 12, further comprising:

a podiatrist treatment module configured to receive from the factory system, the three-dimensional model of the custom insole;

the podiatrist treatment module further configured to assess a fit of the three-dimensional model of the foot on the three-dimensional model of the custom insole by implementing an augmented reality application; and the podiatrist treatment module further configured to update the custom insole parameters based an assessed fit to generate updated custom insole parameters.

16. The system of claim 7, further comprising a shoe geometry acquisition module configured to obtain shoe geometry data corresponding to a shoe in which the custom insole will be placed.

17. The system of claim 16, wherein the shoe geometry acquisition module is configured to obtain the shoe geometry data from a database, a three-dimensional scanner, or manual input.

18. The system of claim 16, wherein the podiatrist treatment module is further configured to adjust the custom insole parameters based on the shoe geometry data to ensure proper fit and function of the custom insole within the shoe.

19. A system for producing a custom shoe insole for a patient, comprising:

a processor executing machine instructions stored on a non-transitory computer-readable storage medium, the non-transitory computer-readable storage medium comprising a database of insole templates, the processor configured to:

receive patient foot image data and patient survey responses, control a three dimensional modeler to produce a three-dimensional model of a patient's foot from the foot images, wherein producing the three-dimensional model comprises correcting lens distortion and segmenting anatomical landmarks using a convolutional neural network, wherein a multimodal vector representation fuses geometry embeddings, survey response embeddings, and insole template embeddings into a shared latent space, and producing an insole matched to the custom insole parameters, and control a recommendation engine configured to select an insole template based on multimodal data integration and fusion among the three-dimensional model, the survey responses, and the insole templates;

a customization interface configured to receive podiatrist inputs adjusting the selected insole template to produce custom insole parameters; and a manufacturing system configured to generate a computer-aided design (CAD) model from the custom insole parameters and to produce the custom shoe insole from the CAD model.

20. The system of claim 19, further comprising a traceability server node configured to compute a cryptographic hash of at least one of the three-dimensional foot model, the patient survey responses, the custom insole parameters, the computer-aided design (CAD) model, and manufacturing control instructions.

21. The system of claim 20, wherein the traceability server node is further configured to transmit the cryptographic hash to a distributed ledger for recording.

22. The system of claim 21, wherein the distributed ledger comprises a plurality of ledger nodes each maintaining an append-only log of cryptographically linked records.

23. A system for designing and producing a custom shoe insole, comprising: one or more design processors;

a non-transitory, computer-readable storage medium having encoded thereon machine instruction executable by the one or more design processors, wherein a design processor:

executes a three-dimensional modeler configured to generate a three-dimensional model of a foot from images captured on a calibration mat bearing fiducial markers, wherein generating the three-dimensional model comprises correcting lens distortion and segmenting anatomical landmarks using a convolutional neural network, wherein a multimodal vector representation fuses geometry embeddings, survey response embeddings, and insole template embeddings into a shared latent space, and producing an insole matched to the custom insole parameters, executes a survey module configured to acquire patient responses, populates and queries a vector database configured to store embeddings of patient data and insole templates and to compute similarity using cosine similarity, executes a recommendation system configured to form a multimodal vector representation from the three-dimensional model and the survey responses and to select a template based on similarity, and implements a podiatrist treatment module configured to receive inputs within predefined customization zones and to output custom insole parameters; and a custom insole manufacturing system comprising:

a factory processor, and a factory non-transitory, computer-readable storage medium having encoded thereon machine instructions that the factory processor executes to:

control a factory three-dimensional modeler to generate a computer-aided design model from the custom insole parameters and the three-dimensional model;

control a slicer to generate G-code and a toolpath; and control an additive manufacturing system to fabricate the custom shoe insole in accordance with the G-code and the toolpath.

24. The system of claim 23, wherein the calibration mat includes fiducial markers that provide metric scale and pose for the images.

25. The system of claim 23, wherein the three-dimensional modeler executes to correct lens distortion, detect anatomical landmarks, and output a watertight mesh.

26. The system of claim 23, wherein the vector database employs an approximate-nearest-neighbor index selected from HNSW and IVF-PQ.

27. The system of claim 23, wherein the system ingests shoe geometry data and verifies that the computer-aided design model conforms to a shoe interior.

28. The system of claim 23, further comprising an augmented reality application configured to render the foot model and insole model in a shared coordinate system.

29. The system of claim 23, wherein the additive manufacturing system produces graded density or multi-material structures across predefined zones.

* * * * *